US010694392B2

(12) United States Patent
Ouchi et al.

(10) Patent No.: US 10,694,392 B2
(45) Date of Patent: Jun. 23, 2020

(54) TERMINAL DEVICE, BASE STATION DEVICE, AND METHOD

(71) Applicant: Sharp Kabushiki Kaisha, Osaka (JP)

(72) Inventors: Wataru Ouchi, Osaka (JP); Kazuyuki Shimezawa, Osaka (JP); Naoki Kusashima, Osaka (JP); Takashi Hayashi, Osaka (JP); Alvaro Ruiz Delgado, Osaka (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/523,230

(22) PCT Filed: Nov. 6, 2015

(86) PCT No.: PCT/JP2015/081334
§ 371 (c)(1),
(2) Date: Apr. 28, 2017

(87) PCT Pub. No.: WO2016/072495
PCT Pub. Date: May 12, 2016

(65) Prior Publication Data
US 2017/0347270 A1 Nov. 30, 2017

(30) Foreign Application Priority Data
Nov. 6, 2014 (JP) .................. 2014-225693

(51) Int. Cl.
*H04W 16/14* (2009.01)
*H04W 88/06* (2009.01)
(Continued)

(52) U.S. Cl.
CPC ........... *H04W 16/14* (2013.01); *H04L 5/0098* (2013.01); *H04W 72/04* (2013.01);
(Continued)

(58) Field of Classification Search
CPC ............... H04W 16/14; H04W 72/085; H04W 72/0446; H04W 72/0406
See application file for complete search history.

(56) References Cited

U.S. PATENT DOCUMENTS

2012/0257601 A1* 10/2012 Kim ...................... H04W 76/19
370/336
2013/0114576 A1* 5/2013 Kwon ............... H04W 56/0045
370/336
(Continued)

FOREIGN PATENT DOCUMENTS

KR  10-2014-0102112 A    8/2014
WO      2014/007593 A1    1/2014
WO      2014/112783 A1    7/2014

OTHER PUBLICATIONS

3GPP TS 36.211 V11.5.0, Evolved Universal Terrestrial Radio Access (E-UTRA); Physical channels and modulation (Release 11), Jan. 2014.
(Continued)

*Primary Examiner* — Phong La
(74) *Attorney, Agent, or Firm* — ScienBiziP, P.C.

(57) ABSTRACT

Provided are a terminal device, a base station device, and a method that make it possible to communicate efficiently in a communication system in which a base station device and a terminal device communicate.

The terminal device communicates with the base station device and is provided with a higher layer processing unit that expands a Ci field based on a MAC CE when a secondary cell list is expanded via RRC signalling.

2 Claims, 14 Drawing Sheets

(51) Int. Cl.
 *H04W 72/04* (2009.01)
 *H04L 5/00* (2006.01)
 *H04W 72/08* (2009.01)
(52) U.S. Cl.
 CPC ... *H04W 72/0406* (2013.01); *H04W 72/0446* (2013.01); *H04W 72/085* (2013.01); *H04W 88/06* (2013.01)

(56) References Cited

U.S. PATENT DOCUMENTS

| | | | | |
|---|---|---|---|---|
| 2013/0121297 | A1* | 5/2013 | Kim | H04L 5/001 370/329 |
| 2013/0250911 | A1* | 9/2013 | Kwon | H04W 56/00 370/331 |
| 2014/0199992 | A1 | 7/2014 | Chincholi et al. | |
| 2015/0189627 | A1 | 7/2015 | Yang et al. | |
| 2015/0271854 | A1* | 9/2015 | Pelletier | H04W 56/0005 370/329 |
| 2015/0304925 | A1* | 10/2015 | Hwang | H04L 5/00 370/331 |
| 2015/0373559 | A1* | 12/2015 | Hong | H04W 52/0206 370/329 |
| 2016/0242193 | A1* | 8/2016 | Hong | H04W 76/10 |
| 2016/0301513 | A1* | 10/2016 | He | H04L 5/001 |
| 2016/0302184 | A1* | 10/2016 | Belleschi | H04L 5/0053 |
| 2017/0317740 | A1* | 11/2017 | Basu Mallick | H04B 7/15557 |

OTHER PUBLICATIONS

3GPP TR 36.872 V12.1.0, Small cell enhancements for E-UTRA and E-UTRAN-Physical layer aspects (Release 12), Dec. 2013.

3GPP TSG-RAN Meeting #65 (Edinburgh, Scotland), Ericsson et al., Study on Licensed-Assisted Access using LTE, RP-141646, Sep. 9-12, 2014.

* cited by examiner

| DRS configuration | (k',l') | n$_s$mod2 |
|---|---|---|
| 0 | (9,5) | 0 |
| 1 | (11,2) | 1 |
| 2 | (9,2) | 1 |
| 3 | (7,2) | 1 |
| 4 | (9,5) | 1 |
| 5 | (8,5) | 0 |
| 6 | (10,2) | 1 |
| 7 | (8,2) | 1 |
| 8 | (6,2) | 1 |
| 9 | (8,5) | 1 |
| 10 | (3,5) | 0 |
| 11 | (2,5) | 0 |
| 12 | (5,2) | 1 |
| 13 | (4,2) | 1 |
| 14 | (3,2) | 1 |
| 15 | (2,2) | 1 |
| 16 | (1,2) | 1 |
| 17 | (0,2) | 1 |
| 18 | (3,5) | 1 |
| 19 | (2,5) | 1 |
| 20 | (11,1) | 1 |
| 21 | (9,1) | 1 |
| 22 | (7,1) | 1 |
| 23 | (10,1) | 1 |
| 24 | (8,1) | 1 |
| 25 | (6,1) | 1 |
| 26 | (5,1) | 1 |
| 27 | (4,1) | 1 |
| 28 | (3,1) | 1 |
| 29 | (2,1) | 1 |
| 30 | (1,1) | 1 |
| 31 | (0,1) | 1 |

FIG. 12

$$L\{(Y_k + m') \bmod \lfloor N_{CCE,k}/L \rfloor\} + i \qquad \cdots \text{EXPRESSION (1)}$$

$$L\left\{\left[Y_{p,k} + \left\lfloor \frac{m \cdot N_{ECCE,p,k}}{L \cdot M_p^{(L)}} \right\rfloor + b\right] \bmod \lfloor N_{ECCE,p,k}/L \rfloor\right\} + i \qquad \cdots \text{EXPRESSION (2)}$$

FIG. 14

TERMINAL DEVICE, BASE STATION DEVICE, AND METHOD

TECHNICAL FIELD

The present invention relates to a terminal device, a base station device, and a method.

BACKGROUND ART

In the 3rd Generation Partnership Project (3GPP) (registered trademark), a radio access method and a radio network for cellular mobile communications (hereinafter referred to as "long term evolution (LTE)" or "evolved universal terrestrial radio access (EUTRA)") have been considered.

LTE supports a frequency division duplex (FDD) and a time division duplex (TDD). LTE that employs an FDD scheme is also referred to as FD-LTE or LTE FDD. TDD is a technique that enables full duplex communication in at least two frequency bands by performing frequency division multiplexing on an uplink signal and a downlink signal. LTE that employs a TDD scheme is also referred to as TD-LTE or LTE TDD. TDD is a technique that enables full duplex communication in a single frequency band by performing time division multiplexing on an uplink signal and a downlink signal. Details of FD-LTE and TD-LTE are disclosed in NPL 1.

Furthermore, the base station device is able to transmit to the terminal device a reference signal (also referred to as RS) that is a known signal between the base station device and the terminal device. The reference signal is used for various purposes such as signal or channel demodulation, a channel state report, or the like, and it is possible to transmit a plurality of reference signals. For example, a cell-specific reference signal is transmitted in all downlink subframes as a reference signal specific to a cell. In addition, for example, a terminal-specific reference signal is transmitted in a resource in which a data signal that relates to the terminal device is mapped as a reference signal that is specific to the terminal device. Details of the reference signal are disclosed in NPL 1.

Small cell introduction is investigated in 3GPP. Small cell is a generic term for a cell having small coverage in which the transmit power of the base station device that constitutes the cell is small compared with a conventional cell (macro cell). For example, it is possible to locate small cells with high density and achieve an improvement of frequency efficiency per area by applying the small cells in a high frequency band. In the introduction investigation of the small cells, a technique in which the base station device is switched to a stopping state is investigated in order to achieve low power consumption, an inter-cell interference reduction, and the like. Details are disclosed in NPL 2.

In the 3GPP, since radio resources (communication resources) are scarce in a licensed band that is a frequency band that has been used up to now for mobile phones and the like, due to an increase of communication volume, providing LTE communication/LTE service on an unlicensed band that is an unlicensed frequency band (for example, 5 GHz) that is used for wireless LAN, Bluetooth (BT) (registered trademark), or the like has been investigated. Here, LTE communication/LTE service in an unlicensed band is referred to as LAA (licensed assisted access using LTE, LTE-advanced in unlicensed spectrum, licensed assisted access to unlicensed spectrum). A technical problem and a solution therefor are investigated in order for coexistence of a wireless LAN (WLAN: wireless local area network, Wi-Fi (registered trademark): wireless fidelity) and an LAA. Details are disclosed in NPL 3.

CITATION LIST

Non-Patent Literature

NPL 1: 3rd Generation Partnership Project; Technical Specification Group Radio Access Network; Evolved Universal Terrestrial Radio Access (E-UTRA); Physical Channels and Modulation (Release 11), 3GPPTS 36.211 V11.5.0 (2014-01).

NPL 2: 3rd Generation Partnership Project; Technical Specification Group Radio Access Network; Small cell enhancements for E-UTRA and E-UTRAN—Physical layer aspects (Release 12), 3GPP TR 36.872 V12.1.0 (2013-12).

NPL 3: "Study on Licensed-Assisted Access using LTE", RP-141646, 3GPP TSG-RAN Meeting #65, Edinburgh, Scotland, 9th-12th Sep. 2014.

DISCLOSURE OF THE INVENTION

Problems to be Solved by the Invention

However, since the communication method and communication standard are different in the LAA and wireless LAN, using the same method and the same standard as LTE causes interference with each other and transmission efficiency to substantially deteriorate.

The present invention is carried out in consideration of the above problem, and an advantage thereof is to provide a terminal device, a base station device, and a method that make it possible to improve transmission efficiency in a communication system in which a base station device and a terminal device communicate.

Means for Solving the Problems (1) In order to accomplish the object described above, the present invention is contrived to provide the following means. That is, a terminal device according to an aspect of the present invention is a terminal device communicating with a base station device, the terminal device including: a higher layer processing unit configured to expand a Ci field based on a medium access control layer control element (MAC CE) upon expansion of a secondary cell list via radio resource control (RRC) signalling.

(2) A base station device according to an aspect of the present invention is a base station device communicating with a terminal device, the base station device including: a higher layer processing unit configured to expand a Ci field based on a medium access control layer control element (MAC CE) and configure activation or deactivation upon expansion of a secondary cell list via radio resource control (RRC) signalling.

(3) A method according to an aspect of the present invention is a method in a terminal device communicating with a base station device, the method including the step of: expanding a Ci field based on a medium access control layer control element (MAC CE) upon expansion of a secondary cell list via radio resource control (RRC) signalling.

(4) A method according to an aspect of the present invention is a method in a base station device communicating with a terminal device, the method including the step of: expanding a Ci field based on a medium access control layer control element (MAC CE) and configuring activation or deactivation upon expansion of a secondary cell list via radio resource control (RRC) signalling.

Effects of the Invention

According to the present invention, it is possible to improve transmission efficiency in a communication system in which a base station device and a terminal device communicate.

BRIEF DESCRIPTION OF THE DRAWINGS

FIG. 12 is a diagram illustrating an example of designation of a resource element with respect to the configuration of the DS.

FIG. 14 is a diagram illustrating expressions of a search space of PDCCH and EPDCCH.

MODE FOR CARRYING OUT THE INVENTION

Figure 1:
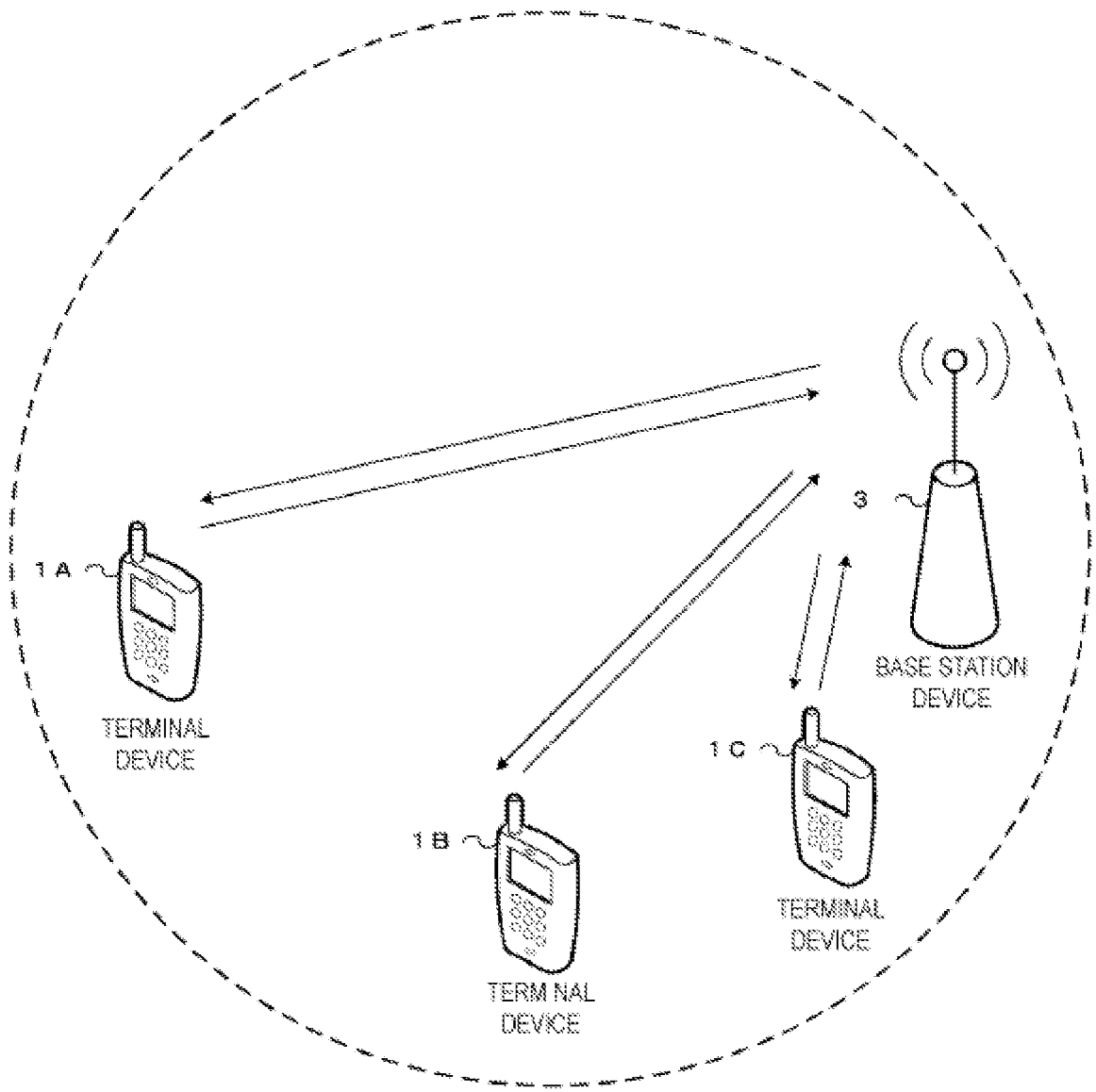
FIG. 1 is a conceptual diagram of a communication system according to the present embodiment.

An embodiment of the present invention will be described below.

In the present embodiment, a base station device 3 may also be referred to as an evolved NodeB (eNodeB), and a terminal device 1 (mobile station device) may also be referred to as user equipment (UE). LTE is a cellular communication system in which an area is divided into a plurality of cells to form a cellular pattern, each of the cells being served by a base station device. A single base station device 3 may manage a plurality of cells. Furthermore, the plurality of cells may be configured for the terminal device 1. Here, a technology in which the terminal device 1 performs communication by using the plurality of cells is referred to as cell aggregation, carrier aggregation (CA), or dual connectivity (DC). The present invention may be applied to each of the plurality of cells configured for the terminal device 1. Furthermore, the present invention may be applied to some of the configured plurality of cells. Cells configured for the terminal device 1 are also referred to as serving cells.

In the present embodiment, LTE includes communication/service/signal/method/technology/process/resource and the like in LTE. Furthermore, LAA includes communication/service/signal/method/technology/pnx: eWresource and the like in LAA. Furthermore, a global system for mobile communications (GSM (registered trademark))/EDGE includes commication/service/signal/method/technology/process/resource and the like in GSM/EDGE. Furthermore, the global navigation satellite system (GNSS) includes communication/service/signal/method/technology/process/resource and the like in GNSS. Furthermore, CDMA 2000 includes commication/service/signal/method/technology/process/resource and the like in CDMA 2000. Furthermore, WLAN and Wi-Fi (registered trademark) include communication/service/signal/method/technology/process/resource and the like in WLAN and Wi-Fi. Furthermore, a personal handy phone system (PHS) includes communication/service/signal/method/technology/process/resource and the like in PHS. Furthermore, Bluetooth (registered trademark) (BT) includes communication/service/signal/method/technology/process/resource and the like in BT. These communication technologies are referred to as radio access technology (RAT). Furthermore, RAT other than LTE/LAA is referred to as inter-RAT.

The terminal device 1 and the base station device 3 communicate using a component carrier that corresponds to the cells. Furthermore, the corresponding carrier frequencies configure the cells. The cell carrier frequency cell that is used in communication is chosen based on an E-UTRA operating band that supports each of the terminal device 1 and the base station device 3.

In carrier aggregation (CA), a plurality of configured serving cells include one primary cell (PCell) and one or a plurality of secondary cells (SCell). The carrier frequency that is used to perform carrier aggregation is chosen based on combination (band combination) of carrier frequencies (E-UTRA operating bands). That is, in the terminal device 1 and the base station device 3 between which RRC connection is established, carrier aggregation is not performed between the terminal device 1 and the base station device 3 if the same band combination is not supported.

The primary cell is a serving cell in which an initial connection establishment procedure has been performed, a serving cell in which a connection re-establishment procedure has been started, or a cell indicated as a primary cell during a handover procedure. The primary cell operates at a primary frequency. At the point of time when a connection is (re)established, or later, a secondary cell may be configured. Each secondary cell operates at a secondary frequency. The connection may be referred to as RRC connection.

For the terminal device 1 supporting CA, a single primary cell and one or more secondary cells are aggregated.

Dual connectivity (DC) is an operation whereby a prescribed terminal device 1 is configured to utilize radio resources provided from at least two different network points (master base station device (MeNB: Master eNB) and secondary base station device (SeNB: Secondary eNB)). In other words, in dual connectivity, a terminal device 1 is configured to establish an RRC connection to at least two network points. In dual connectivity, the terminal device 1 may be connected via a non-ideal backhaul in an RRC connected (RRC_CONNECTED) state.

In dual connectivity, a base station device 3 that is connected to at least the S1-mobility management entity (MME) and acts as the mobility anchor of the core network is referred to as a master base station device. Additionally, a base station device 3 that is not the master base station device and provides supplemental radio resources to the terminal device 1 is referred to as a secondary base station device. A group of serving cells that is associated with the master base station device may be referred to as a master cell group (MCG), and a group of serving cells that is associated with the secondary base station device may be referred to as a secondary cell group (SCG).

In dual connectivity, the primary cell belongs to the MCG. In addition, in the SCQ the secondary cell corresponding to the primary cell is referred to as a primary secondary cell (PSCell). Note that the PSCell may be referred to as a special cell (SpCell) or a special secondary cell (Special SCell). The same functions (capability and performance) as the PCell (the base station device constituting the PCell) may be supported by the PSCell (the base station device constituting the PSCell). Additionally, some of the functions of the PCell may be supported in the PSCell. For example, the function for transmitting a PDCCH may be supported by the PSCell. In addition, the function for performing a PDCCH transmission using a search space different from a CSS or USS may be supported in the PSCell. For example, search spaces that are different from USS are search spaces that are determined based on a value that is specified by the specifications, search spaces that are determined based on RNTI that is different from cell-radio network temporary identifiers (C-RNTI), or the like. Moreover, the PSCell may constantly be in a starting state. Moreover, the PSCell is a cell capable of receiving the PUCCH.

In dual connectivity, the radio bearer (data radio bearer (DRB) and/or signalling radio bearer (SRB)) may be individually allocated to the MeNB and the SeNB.

In dual connectivity, a duplex mode may be configured individually for the MCG and the SCG or the PCell and the PSCell.

In dual connectivity, the MCG and the SCG or the PCell and the PSCell need not necessarily be synchronized with each other.

In dual connectivity, a plurality of parameters for timing adjustment (TAG or timing advance group) may be configured for each of the MCG and the SCG (or PCell and PSCell). That is, the MCG and the SCG may not be synchronized with each other. In other words, the PCell and the PSCell are individually configured by the TAG The TAG that is configured in the PCell and the PSCell may be configured as a PTAG in the MCG and the SCG In dual connectivity, the terminal device 1 transmits UCI corresponding to the cells in the MCG only to the MeNB (PCell) and transmits UCI corresponding to the cells in the SCG to SeNB (PSCell) only. For example, the UCI is an SR, HARQ-ACK, and/or CSI. Additionally, in each UCI transmission, a transmission method using the PUCCH and/or the PUSCH is applied to each cell group.

All signals can be transmitted and received in the primary cell, but some signals cannot be transmitted and received in the secondary cell. For example, the physical uplink control channel (PUCCH) is transmitted only in the primary cell. Additionally, unless a plurality of timing advance groups (TAG) are configured between the cells, the physical random access channel (PRACH) is transmitted only in the primary cell. Additionally, the physical broadcast channel (PBCH) is transmitted only in the primary cell. Additionally, the master information block (MIB) is transmitted only in the primary cell.

Signals that can be transmitted and received in the primary cell are transmitted and received in the primary secondary cell. For example, the PUCCH may be transmitted in the primary secondary cell. Additionally, the PRACH may be transmitted in the primary secondary cell, regardless of whether a plurality of TAGs are configured. Additionally, the PBCH and the MIB may be transmitted in the primary secondary cell.

Radio link failure (RLF) is detected in the primary cell. In addition, even if conditions for the detection of an RLF are in place in the secondary cell, the detection of the RLF need not necessarily be recognized. In addition, in the primary secondary cell, the RLF is detected if the conditions are in place. When an RLF is detected in the primary secondary cell, the higher layer of the primary secondary cell notifies the higher layer of the primary cell that the RLF has been detected.

Semi-persistent scheduling (SPS) or discontinuous transmission (DRX) may be used in the primary cell and/or the primary secondary cell. The total number of SPS configurations and DRX configurations may be determined using the total number of primary cells and primary secondary cells. The same DRX as in the primary cell or the primary secondary cell of the same cell group may be used in the secondary cell.

Fundamentally, in the secondary cell, the MAC configuration information/parameters are shared with the primary cell/primary secondary cell of the same group. Some of the parameters (for example, sTAG-Id) may be configured for each secondary cell.

Some of the timers or counters may be applied only to the primary cell and/or the primary secondary cell. A timer or counter applied only to the secondary cell may be configured.

In the communication system of the present embodiment, a frame structure type of the frequency division duplex (FDD) or the time division duplex (TDD) scheme is applied. Note that the frame structure type may be referred to as a duplex mode. In a case of carrier aggregation, the TDD scheme may be applied to all of the plurality of cells. Furthermore, in the case of carrier aggregation, a cell to which the TDD scheme is applied and a cell to which an FDD scheme is applied may be aggregated. In a case where the cell to which the TDD is applied and the cell to which the FDD is applied are aggregated, the present invention can be applied to the cell to which the TDD is applied.

In the cells to which the FDD is applied, a half duplex FDD (HD-FDD) scheme or full duplex FDD (FD-FDD) scheme may be applied.

When the plurality of cells to which the TDD is applied are aggregated, a half duplex TDD (HD-TDD) scheme or full duplex TDD (FD-TDD) scheme my be applied.

The terminal device 1 may transmit information (band combination), indicating a combination of bands in which carrier aggregation is supported by the terminal device 1, to the base station device 3. Furthermore, for each combination of the bands, the terminal device 1 may transmit information, instructing whether or not simultaneous transmission and reception by the plurality of serving cells in the plurality of different bands are supported, to the base station device 3. The base station device 3 performs configuration/selection of the serving cells based on the information.

It is possible to use an LAA carrier (or an LAA cell) of a licensed band/unlicensed band in communication by performing carrier aggregation on the LTE carrier (LTE cell) of the licensed band. Note that the LAA cell may not be configured as a PCell. In addition, carrier aggregation between the LAA cell and the LTE secondary cell may be carried out. At that time, band combination may not be supported between the LTE primary cell and the LAA cell. However, band combination is supported respectively between the LTE primary cell and the LTE secondary cell and between the LTE secondary cell and the LAA cell. In addition, the LTE primary cell and the LTE secondary cell may be connected in dual connectivity. Here, the LAA cell is a cell in which the carrier frequency that is included in the unlicensed band that is the LAA band is used. In addition, the LTE cell is a cell in which the carrier frequency that is included in the E-UTRA operating band that is the LTE band (licensed band) is configured. For example, the LAA cell is a cell in which the carrier frequency of a 5 GHz band is used, and the LTE cell is a cell in which the carrier frequency of a 2.4 GHz band is configured.

Furthermore, the LAA cell may be configured by the base station device and/or the terminal device that support a specific function/service. That is, the LAA cell may not be the serving cell in the specific earner frequency, and may be a cell in which the specific function/service is supported. The LAA cell may be configured independently from the carrier frequency.

According to the present embodiment, "X/Y" includes the meaning of "X or Y". According to the present embodiment, "X/Y" includes the meaning of "X and Y". According to the present embodiment, "X/Y" includes the meaning of "X and/or Y".

FIG. 1 is a conceptual diagram of a communication system according to the present embodiment. In FIG. 1, the communication system is equipped with terminal devices 1A to 1C and the base station device 3. The terminal devices 1A to 1C are referred to as the terminal device 1.

A physical channel and a physical signal according to the present embodiment are described.

In FIG. 1, in uplink radio communication from the terminal device 1 to the base station device 3, uplink physical channels are used. It is possible to use the uplink physical channel to transmit information output from a higher layer. The uplink physical channel includes a physical uplink control channel (PUCCH), a physical uplink shared channel (PUSCH), a physical random access channel (PRACH), and the like.

The PUCCH is a physical channel that is used to transmit uplink control information (UCI). The pieces of uplink control information include downlink channel state information (CSI), a scheduling request (SR) indicating a request for a PUSCH resource, and an acknowledgment (ACK)/negative-acknowledgment (NACK) for downlink shared channel (DL-SCH) data (a transport block (TB) or a downlink-shared channel (DL-SCH)). The ACK/NACK is also referred to as an HARQ-ACK, HARQ feedback, or response information. The DL-SCH data may refer to the DL transport block, the DL-SCH transport block, or the downlink data.

The PUSCH is a physical channel that is used to transmit uplink-shared channel (UL-SCH) data (uplink-shared channel (UL-SCH)). Furthermore, the PUSCH may be used to transmit the HARQ-ACK and/or channel state information along with the UL-SCH data. Furthermore, the PUSCH may be used to transmit only the CSI or to transmit only HARQ-ACK and the CSI. Note that the UL-SCH data may refer to the UL transport block, the UL-SCH transport block, or the uplink data.

The PRACH is a physical channel that is used to transmit a random access preamble. A main object of the PRACH is to synchronize the terminal device 1 to the base station device 3 in terms of a time domain. In addition, the PRACH is also used for the initial connection establishment procedure, the handover procedure, the connection re-establishment procedure, synchronization (timing adjustment) for uplink transmission, and the request for the PUSCH resource.

In FIG. 1, the uplink physical signal is used for the uplink radio communication. The uplink physical signal includes the uplink reference signal (UL RS) and the like. A demodulation reference signal (DMRS), a sounding reference signal (SRS), and the like are used as the uplink reference signal. The DMRS relates to transmission of the PUSCH or the PUCCH. The DMRS is time-multiplexed with the PUSCH or the PUCCH. The base station device 3 uses the DMRS in order to perform channel compensation of the PUSCH or the PUCCH. Transmission of both the PUSCH and the DMRS is hereinafter referred to simply as transmission of the PUSCH. Transmission of both the PUCCH and the DMRS is hereinafter referred to simply as transmission of the PUCCH. Note that the uplink DMRS is also referred to as an UL-DMRS. The SRS has no relationship with the transmission of the PUSCH or the PUCCH. The base station device 3 uses the SRS in order to measure an uplink channel state.

The SRS are SRS of two trigger types (trigger type 0 SRS and trigger type 1 SRS). The trigger type 0 SRS is transmitted by higher layer signalling when a parameter which relates to the trigger type 0 SRS is configured. The trigger type 1 SRS is transmittal by higher layer signalling when a parameter related to the trigger type 1 SRS is configured, and transmission is requested by the SRS request that is included in DCI formats 0/1A/2B/2C/2D/4. Note that in the SRS request, DCI formats 0/1A/4 are included in both of FDD and TDD, and DCI formats 2B/2C/2D are included in only TDD. Transmission of the trigger type 1 SRS is prioritized when transmission of the trigger type 0 SRS and transmission of the trigger type 1 SRS are generated in the same subframe of the same serving cell.

In FIG. 1, the downlink physical channels are used for downlink radio communication from the base station device 3 to the terminal device 1. The downlink physical channel is used to transmit the information output from the higher layer. The downlink physical channel includes a physical broadcast channel (PBCH), a physical control format indicator channel (PCFICH), a physical hybrid automatic repeat request indicator channel (PHICH), a physical downlink control channel (PDCCH), an enhanced physical downlink control channel (EPDCCH), a physical downlink shared channel (PDSCH), a physical multicast channel (PMCH), and the like.

The PBCH is used to broadcast a master information block (MIB), or a broadcast channel (BCH), that is shared by the terminal devices 1. It is possible to update the MIB at a 40 ms gap. The PBCH is repeatedly transmitted every 10 ms. Specifically, initial transmission of the MIB is performed in a subframe 0 in a radio frame that satisfies SFN mod 4=0, and re-transmission (repetition) of the MIB is performed in subframes 0 in all the other radio frames. A system frame number (SFN) is a radio frame number. Furthermore, the MIB is one type of system information. For example, the MIB includes information indicating the SFN.

The PCFICH is used to transmit information indicating a region (orthogonal frequency division multiplexing (OFDM) symbols) to be used for transmission of the PDCCH.

The PHICH is used to transmit an HARQ indicator (HARQ feedback or response information) indicating an acknowledgment (ACK) or a negative acknowledgment (NACK) with respect to the uplink shared channel (UL-SCH) data received by the base station device 3. For example, in a case where the terminal device 1 receives the HARQ indicator indicating the ACK, the corresponding uplink data is not re-transmitted. For example, in a case where the terminal device 1 receives the HARQ indicator indicating the NACK, the corresponding uplink data is re-transmitted. The HARQ indicator for a single piece of UL-SCH data is transmitted on a single PHICH. The base station device 3 transmits HARQ indicators for a plurality of pieces of UL-SCH data included in the same PUSCH, on a plurality of respective PHICH.

The PDCCH and the EPDCCH are used to transmit downlink control information (DCI). The downlink control information is also referred to as a DCI format. The downlink control information includes a downlink grant and an uplink grant. The downlink grant is also referred to as downlink assignment or downlink allocation.

The PDCCH is transmitted by aggregating one or a plurality of continuous control channel elements (CCE). The CCE is constituted by nine resource element groups (REG). The REG is constituted by four resource elements. The PDCCH that is constituted by n continuous CCEs starts from CCE that satisfies i mod n=0. Here, i is the CCE number.

The EPDCCH is transmitted by aggregating one or a plurality of continuous enhanced control channel elements (ECCE). The ECCE is constituted by a plurality of enhanced resource element groups (EREG).

The downlink grant is used for the scheduling of a single PDSCH within a single cell. The downlink grant is used for the scheduling of the PDSCH within the same subframe as the subframe in which the downlink grant is transmitted. The uplink grant is used for the scheduling of a single PUSCH within a single cell. The uplink grant is used for the scheduling of a single PUSCH within the fourth or later sub frame after the subframe in which the uplink grant is transmitted.

Cyclic redundancy check (CRC) parity bits are attached to the DCI format. The CRC parity bits are scrambled with a radio network temporary identifier (RNTI). The RNTI are identifiers that are able to specify or configure according to an object and the like of the DCI. The RNTI are identifiers that are specified in advance by the specifications, identifiers that are configured as cell-specific information, identifiers that are configured as information specific to the terminal device 1, or identifiers that are configured as group-specific information that belongs to the terminal device 1. For example, the CRC parity bits are scrambled with a cell-radio network temporary identifier (C-RNTI) or a semi-persistent scheduling cell-radio network temporary identifier (SPS C-RNTI). The C-RNTI and the SPS C-RNTI are identifiers for identifying the terminal device 1 within a cell. The C-RNTI is used to control the PDSCH or the PUSCH in a single subframe. The SPS C-RNTI is used to periodically allocate a resource for the PDSCH or the PUSCH.

The PDSCH is used to transmit downlink shared channel (DL-SCH) data. Furthermore, the PDSCH is also used for transmission of higher layer control information.

The PMCH is used to transmit multicast data (multicast channel (MCH)).

In FIG. 1, in the downlink radio communication, the following downlink physical signals are used. The downlink physical signal includes a synchronization signal (SS), a downlink reference signal (DL RS), and the like.

The synchronization signal is used in order for the terminal device 1 to be synchronized in terms of frequency and time domains for downlink. The synchronization signal is mapped to prescribed subframes within a radio frame. For example, in the TDD scheme, the synchronization signal is mapped to subframes 0, 1, 5, and 6 within a radio frame. In the FDD scheme, the synchronization signal is mapped to subframes 0 and 5 within the radio frame.

The synchronization signal includes a primary synchronization signal (PSS) and a secondary synchronization signal (SSS). The PSS is used in a rough frame/symbol timing synchronization (time domain synchronization) or in identification of the cell group. The SSS is used in further accurate frame timing synchronization or in identification of the cell. That is, it is possible to perform frame timing synchronization and cell identification by using the PSS and the SSS.

The downlink reference signal is used in order for the terminal device 1 to perform the channel compensation of the downlink physical channel. The downlink reference signal is used in order for the terminal device 1 to calculate the downlink channel state information. The downlink reference signal is used in order for the terminal device 1 to measure a geographical location of the terminal device 1 itself.

The downlink reference signal includes a cell-specific reference signal (CRS), a UE-specific reference signal (URS) related to PDSCH, a demodulation reference signal (DMRS) related to EPDCCH, a non-zero power channel state information-reference signal (NZP CSI-RS), a multimedia broadcast and multicast service over single frequency network reference signal (MBSFN RS), a positioning reference signal (PRS), a new carrier type cell-specific reference signal (NCT CRS), a discovery signal (DS), and the like. Furthermore, the downlink resources include a zero power channel state information-reference signal (ZP CSI-RS), channel state information-interference measurement (CSI-IM), and the like.

The CRS is transmitted in the entire band of a subframe. The CRS may be transmitted in all subframes when a restricted subframe pattern is not configured. The CRS is used to perform demodulation of the PBCH/PDCCH/PHICH/PCFICH/PDSCH. The CRS may be used in order for the terminal device 1 to calculate the downlink channel state information. The PBCH/PDCCH/PHICH/PCFICH is transmitted on an antenna port used for transmission of the CRS.

The URS relating to the PDSCH is transmitted in a subframe and in a band that axe used far transmission of the PDSCH to which the URS relates. The URS is used to demodulate the PDSCH to which the URS relates.

The PDSCH is transmitted on an antenna port used for transmission of the CRS or the URS based on the transmission mode and the DCI format. A DCI format 1A is used to schedule the PDSCH transmitted on the antenna port used for the transmission of the CRS. A DCI format 2D is used to schedule the PDSCH transmitted on the antenna port used for the transmission of the URS.

The DMRS relating to the EPDCCH is transmitted in a sub frame and in a band that are used for transmission of the EPDCCH to which the DMRS relates. The DMRS is used to demodulate the EPDCCH to which the DMRS relates. The EPDCCH is transmitted on an antenna port used for transmission of the DMRS.

The NZP CSI-RS is transmitted in a subframe that is configured. A resource in which the NZP CSI-RS is transmitted is configured by the base station device 3. The NZP CSI-RS is used in order for the terminal device 1 to calculate the downlink channel state information. The terminal device 1 performs signal measurement (channel measurement), using the NZP CSI-RS.

A resource for the ZP CSI-RS is configured by the base station device 3. With zero output, the base station device 3 transmits the ZP CSI-RS. To be more precise, the base station device 3 does not transmit the ZP CSI-RS. The base station device 3 transmits neither the PDSCH nor the EPDCCH in a resource for the ZP CSI-RS configured by the base station device 3 itself. Furthermore, from other base station devices, the PDSCH, EPDCCH, or CSI-RS may be transmitted using the resource.

A resource for the CSI-IM is configured by the base station device 3. A resource for the CSI-IM is configured to overlap a part of the resource of the ZP CSI-RS. That is, the resource of the CSI-IM has the same characteristic as the ZP CSI-RS, and the base station device 3 is transmitted with zero output using a resource that is configured as the CSI-IM. That is, the base station device 3 does not transmit the CSI-IM. The base station device 3 transmits neither the PDSCH nor the EPDCCH in a resource configured for the CSI-IM. In a certain cell, the terminal device 1 is able to measure interference in a resource that is configured as the CSI-IM in a resource to which the NZP CSI-RS corresponds.

The channel state information (CSI) includes a channel quality indicator (CQI), a preceding matrix indicator (PMI), a rank indicator (RI) and a precoding type indicator (PTI), and is measured using CSI-RS or CRS.

The MBSFN RS is transmitted in the entire band of a subframe used for transmission of the PMCH. The MBSFN RS is used to demodulate the PMCH. The PMCH is transmitted on the antenna port used for transmission of the MBSFN RS.

The PRS is used in order for the terminal device 1 to measure a geographical location of the terminal device 1 itself. Furthermore, the PRS is used with respect to observed time difference of arrival (OTDOA) positioning. Furthermore, PRS is used to measure a reference signal time difference (RSTD) between frequencies.

It is possible to map the NOT CRS to a prescribed subframe. For example, it is possible to map the NCT CRS to subframes 0 and 5. Furthermore, it is possible to use the same structure as apart of the CRS in the NCT CRS. For example, in each of the resource blocks, a position of the resource element to which the NCT CRS is mapped may be the same as a position of the resource element to which the CRS of an antenna port 0 is mapped. Furthermore, it is possible to determine a sequence (value) that is used in the NCT CRS based on information that is configured through the PBCH, PDCCH, EPDCCH, or PDSCH (RRC signalling). It is possible to determine the sequence (value) that is used in the NCT CRS based on a parameter such as a cell ID (for example, physical layer cell identifier) and a slot number. It is possible to determine the sequence (value) that is used in the NCT CRS using a method (expression) that is different from the sequence (value) that is used in the CRS of the antenna port 0. Note that the NCT CRS may also be referred to as a tracking reference signal (IRS).

The downlink physical channel and the downlink physical signal are collectively referred to as a downlink signal. The uplink physical channel and the uplink physical signal are collectively referred to as an uplink signal. The downlink physical channel and the uplink physical channel are collectively referred to as a physical channel. The downlink physical signal and the uplink physical signal are collectively referred to as a physical signal.

The BCH, the MCH, the UL-SCH, and the DL-SCH are transport channels. A channel used in a MAC layer is referred to as a transport channel. The unit of the transport channel used in the MAC layer is also referred to as a transport block (TB) or a MAC protocol data unit (PDU). Control of a hybrid automatic repeat request (HARQ) is performed for each transport block in the MAC layer. The transport block is a unit of data that the MAC layer delivers to the physical layer. In the physical layer, the transport block is mapped to a codeword, and coding processing is performed on a codeword-by-codeword basis.

PDCCH signalling that is signalling through the PDCCH, RRC signalling that is signalling through an RRC layer, MAC signalling that is signalling through the MAC layer, and the like are used in a method for signalling (notification, transmission, or broadcast) of control information from the base station device 3 to the terminal device 1. Furthermore, the RRC signalling is dedicated RRC signalling that is used for notifying control information specific to the terminal device 1 and common RRC signalling that is used for notifying control information specific to the base station device 3. Note that in the following explanation, when simply describing RRC signalling, the RRC signalling is dedicated RRC signalling and/or common RRC signalling. Signalling using a higher layer viewed from a physical lays such as the RRC signalling or MA CE may be referred to as higher layer signalling. Note that PDCCH/EPDCCH signalling may be referred to as L1 signalling, MAC CE signalling may be referred to as L2 signalling, and RRC signalling may be referred to as L3 signalling.

Nest, a structure of the radio frame according to the present embodiment will be described below.

Figure 2:
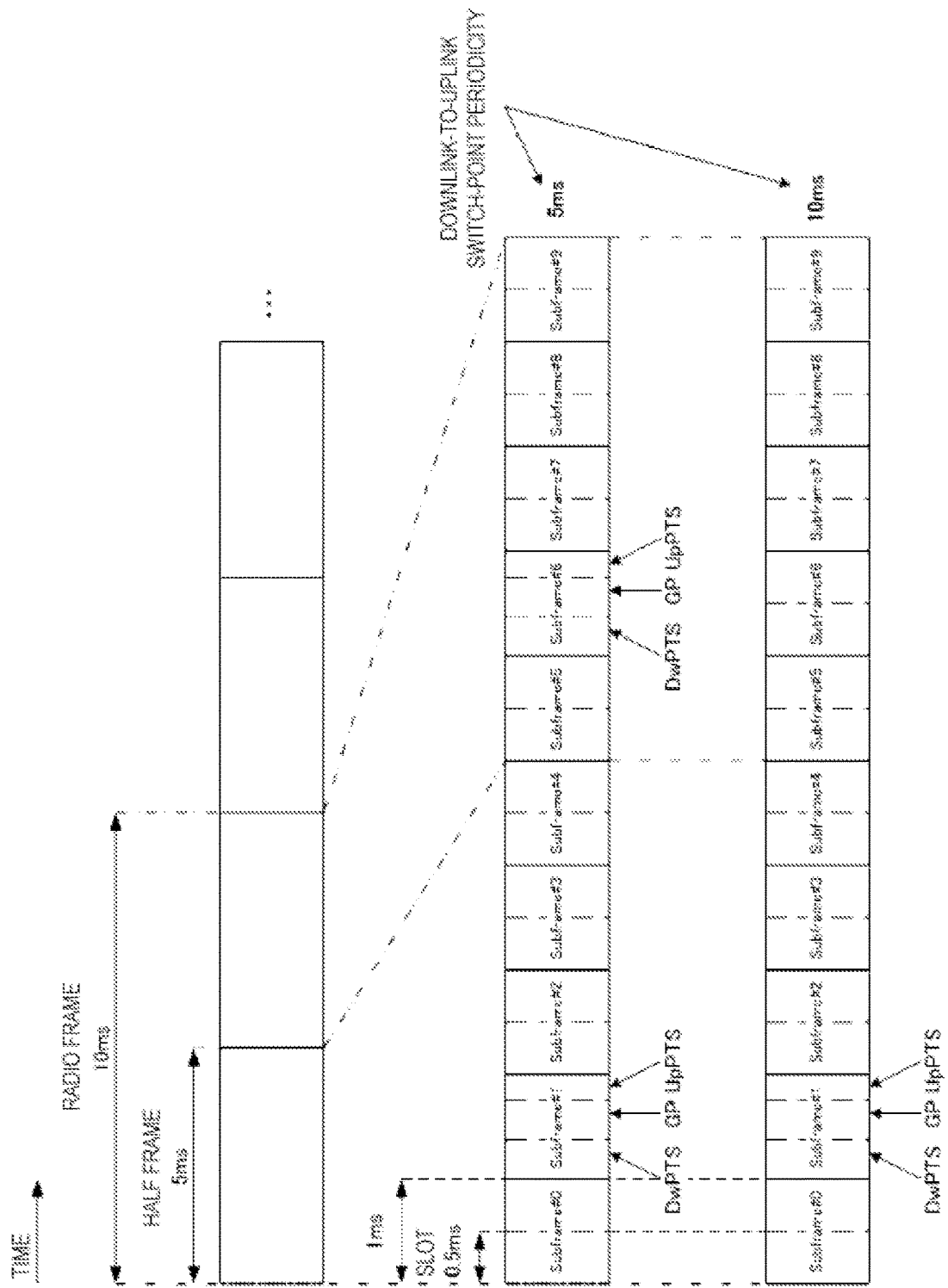
FIG. 2 is a diagram illustrating a schematic structure of a radio frame according to the present embodiment.

FIG. 2 is a diagram illustrating a schematic structure of the radio frame according to the present embodiment. Each of the radio frames is 10 ms in length. Furthermore, each of the radio frames is constituted of two half frames. Each of the half frames is 5 ms in length. Each of the half frames is constituted of five subframes. Each of the subframes is 1 ms in length and is defined by two consecutive slots. Each of the slots is 0.5 ms in length. The i-th subframe within a radio frame is constituted of the (2×i)-th slot and the (2×i+1)-th slot. That is, ten subframes are defined in each of the radio frames.

The subframes include a downlink subframe (first subframe), an uplink subframe (second subframe), a special subframe (third subframe), and the like.

The downlink subframe is a subframe reserved for downlink transmission. The uplink subframe is a subframe reserved for uplink transmission. The special subframe is constituted of three fields. The three fields are a downlink pilot time slot (DwPTS), a guard period (GP), and an uplink pilot time slot (UpPTS). The sum of lengths of the DwPTS, the GP, and the UpPTS is 1 ms. The DwPTS is a field reserved for the downlink transmission. The UpPTS is a field reserved for the uplink transmission. The GP is a field in which neither the downlink transmission nor the uplink transmission is performed. Moreover, the special subframe may be constituted only of the DwPTS and the GP, or may be constituted only of the GP and the UpPTS. The special subframe is located between the downlink subframe and the uplink subframe in the TDD, and is used for switching from the downlink subframe to the uplink subframe.

A single radio frame is constituted of the downlink subframe, the uplink subframe, and/or the special subframe.

That is, the radio frame may be constituted by only the downlink subframe. In addition, the radio frame may be constituted by only the uplink subframe.

The radio communication system according to the present embodiment may support 5 ms downlink-to-uplink switch-point periodicity and 10 ms downlink-to-uplink switch-point periodicity. In a case where the downlink-to-uplink switch-point periodicity is 5 ms, both of the half frames within the radio frame include the special subframe. In another case where the downlink-to-uplink switch-point periodicity is 10 ms, only the first half frame within the radio frame includes the special subframe.

Next, a structure of a slot according to the present embodiment will be described below.

Figure 3:
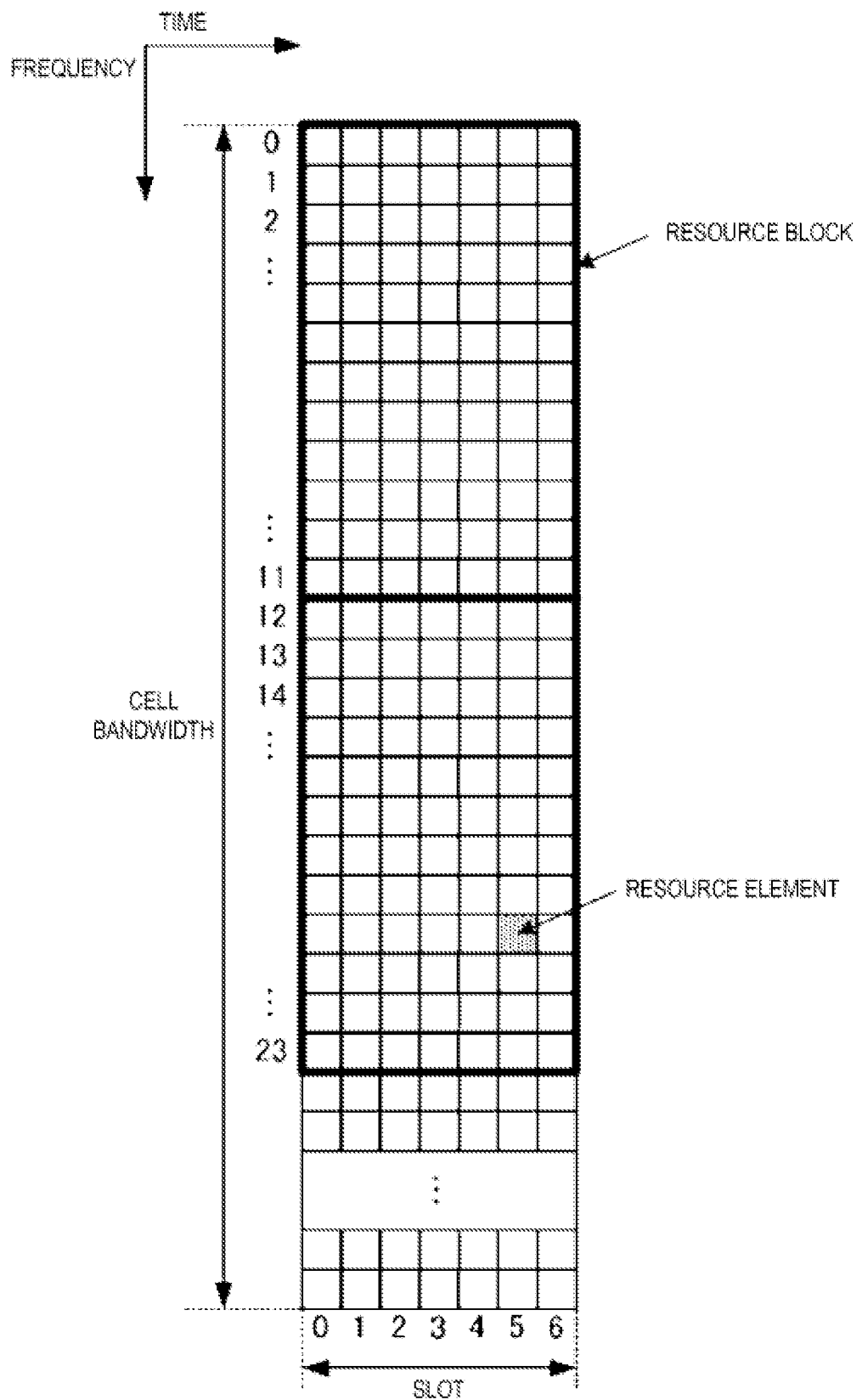
FIG. 3 is a diagram illustrating the structure of the slot according to the present embodiment.

FIG. 3 is a diagram illustrating the structure of the slot according to the present embodiment. According to the present embodiment, a normal cyclic prefix (CP) is applied to the OFDM symbol. Moreover, an extended cyclic prefix (CP) may be applied to the OFDM symbol. The physical signal or the physical channel transmitted in each of the slots is expressed by a resource grid. In downlink, the resource grid is defined by a plurality of sub carriers with respect to a frequency domain and a plurality of OFDM symbols with respect to a time domain. In uplink, the resource grid is defined by a plurality of sub carriers with respect to the frequency domain and a plurality of single carrier-frequency division multiple access (SC-FDMA) symbols with respect to the time domain. The number of subcarriers or resource blocks is dependent on a cell bandwidth. The number of OFDM symbols or SC-FDMA symbols constituting one slot is seven in a case of a normal cyclic prefix and is six in a case of an extended cyclic prefix. Each element within the resource grid is referred to as a resource element. The resource element is identified by a subcarrier number, and an OFDM symbol or SC-FDMA symbol number.

A resource block is used for mapping a certain physical channel (the PDSCH, the PUSCH, or the like) to resource elements. The resource block is defined by a virtual resource block and a physical resource block. A certain physical channel is first mapped to the virtual resource block. Thereafter, the virtual resource block is mapped to the physical resource block. One physical resource block is defined by seven consecutive OFDM symbols or SC-FDMA symbols in a time domain and by 12 consecutive subcarriers in a frequency domain. Therefore, one physical resource block is constituted of (7×12) resource elements. Furthermore, one physical resource block corresponds to one slot in the time domain and corresponds to 180 kHz in the frequency domain. The physical resource blocks are numbered from 0 in the frequency domain. Furthermore, two resource blocks in one subframe corresponding to the same physical resource block number are defined as a physical resource block pair (PRB pair and RB pair).

Next, the physical channel and the physical signal that are transmitted in each of the subframes will be described.

Figure 4:
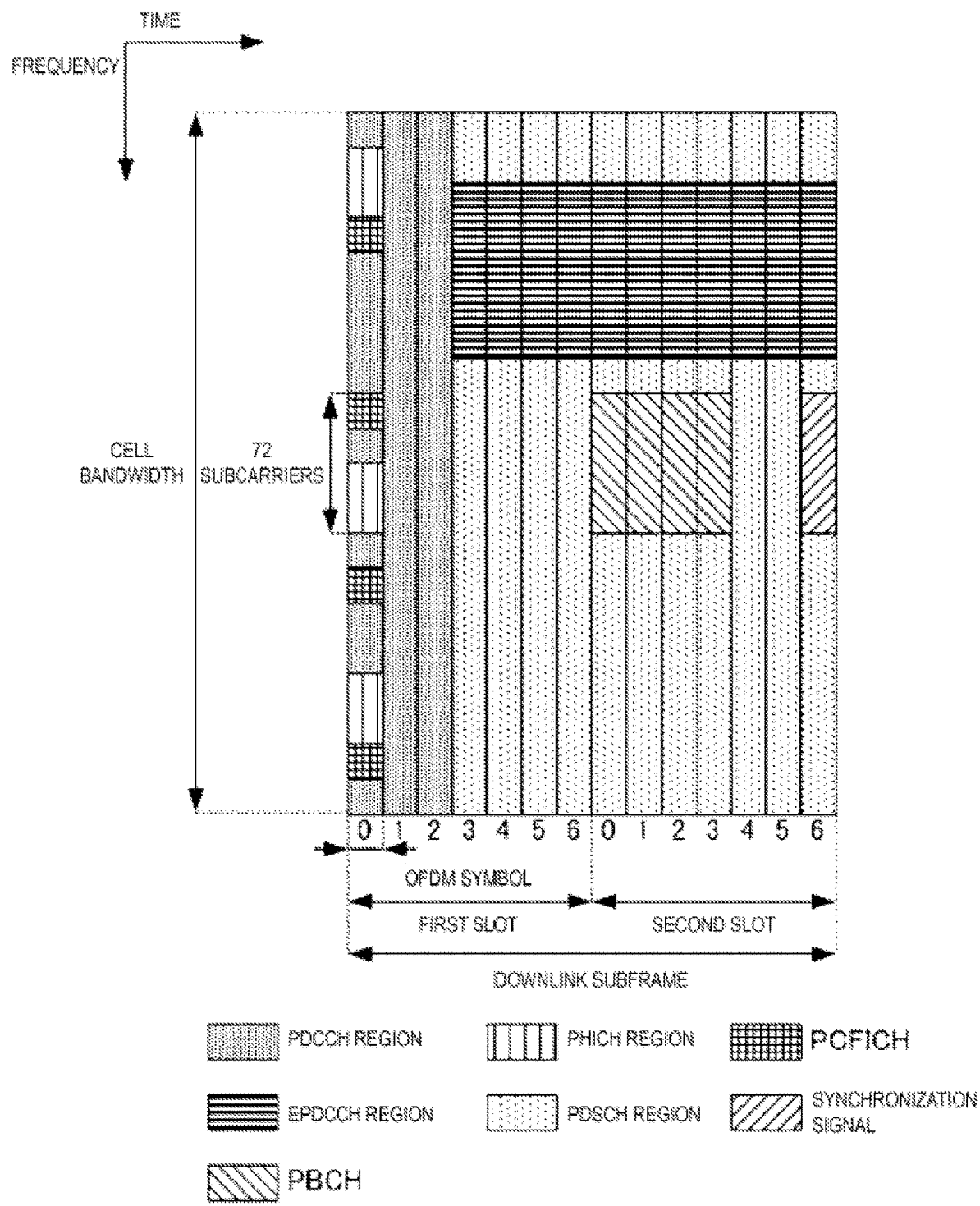
FIG. 4 is a diagram illustrating one example of allocation of the physical channel and mapping of the physical signal to the downlink subframe according to the present embodiment.

FIG. 4 is a diagram illustrating one example of allocation of the physical channel and mapping of the physical signal to the downlink subframe according to the present embodiment. In the downlink subframe, the base station device 3 is able to transmit the downlink physical channel (the PBCH, the PCFICH, the PHICH, the PDCCH, the EPDCCH, or the PDSCH), and/or the downlink physical signal (the synchronization signal or the downlink reference signal). Note that the PBCH is transmitted only in a subframe 0 within the radio frame. Note that the downlink reference signal is mapped to the resource elements distributed in the frequency domain and the time domain. The downlink reference signal is not illustrated in FIG. 4 for the sake of simplicity.

A plurality of PDCCH may be frequency-multiplexed, time-multiplexed, and/or spatial-multiplexed in a PDCCH region. A plurality of EPDCCH may be frequency-multiplexed, time-multiplexed, and/or spatial-multiplexed in an EPDCCH region. A plurality of PDSCH may be frequency-multiplexed, tune-multiplexed, and/or spatial-multiplexed in a PDSCH region. The PDCCH, the PDSCH, and/or the EPDCCH may be frequency-multiplexed, time-multiplexed, and/or spatial-multiplexed.

Figure 5:
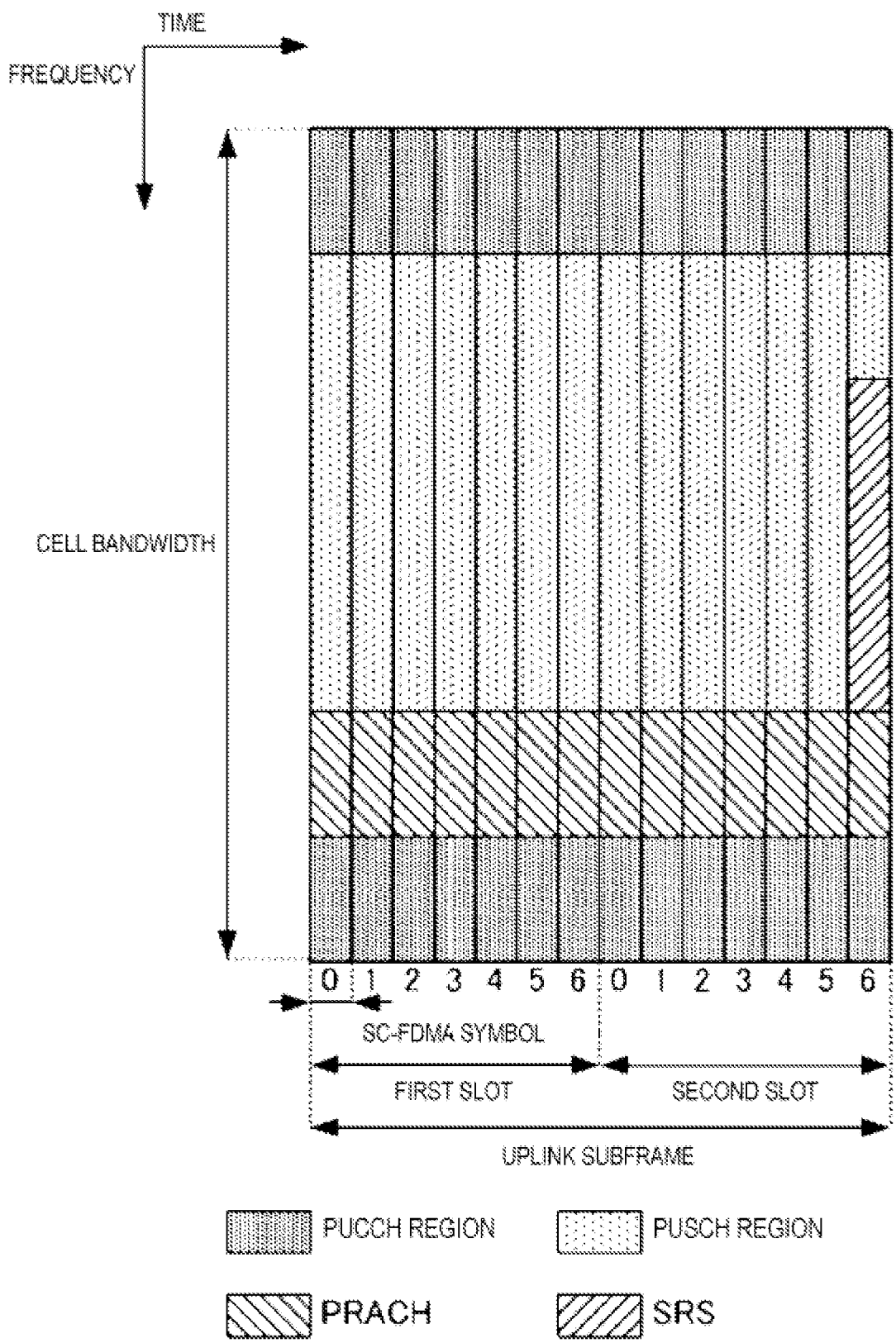
FIG. 5 is a diagram illustrating one example of the allocation of the physical channel and the mapping of the physical signal to the uplink subframe according to the present embodiment.

FIG. 5 is a diagram illustrating one example of the allocation of the physical channel and the mapping of the physical signal to the uplink subframe according to the present embodiment. In the uplink subframe, the terminal device 1 may transmit the uplink physical channel (the PUCCH, the PUSCH or the PRACH) and the uplink physical signal (the UL-DMRS or the SRS). Furthermore, a plurality of PUCCH are frequency-multiplexed, time-multiplexed, spatial-multiplexed, and/or code-multiplexed in the PUCCH region. Furthermore, a plurality of PUSCH may be frequency-multiplexed, time-multiplexed, spatial-multiplexed, and/or code-multiplexed in the PUSCH region. Furthermore, the PUCCH and the PUSCH may be frequency-multiplexed, time-multiplexed, spatial-multiplexed, and/or code-multiplexed. The PRACH may be allocated over a single subframe or two or more subframes. Furthermore, the PRACH may be allocated to one symbol (SC-FDMA symbol) or two symbols when transmitted using a preamble format 4. Furthermore, a plurality of PRACH may be code-multiplexed. The time length (sequence length) at which the PRACH is transmitted may be determined by the preamble format.

The SRS is transmitted using the last SC-FDMA symbol within the uplink subframe. To be more precise, the SRS is mapped to the last SC-FDMA symbol within the uplink subframe. The terminal device 1 can restrict simultaneous transmission of the SRS and the PUCCH/PUSCH/PRACH in a single SC-FDMA symbol in a single cell. In a single uplink subframe in a single cell, the terminal device 1 can transmit the PUSCH and/or the PUCCH using the SC-FDMA symbol except for the last SC-FDMA symbol within the uplink subframe, and can transmit the SRS using the last SC-FDMA symbol within the uplink subframe. That is, in the single uplink subframe in the single cell, the terminal device 1 can transmit the SRS, and the PUSCH and PUCCH. Note that the DMRS is time-multiplexed together with the PUCCH or the PUSCH. The DMRS is not illustrated in FIG. 5 for the sake of simplicity.

Figure 6:
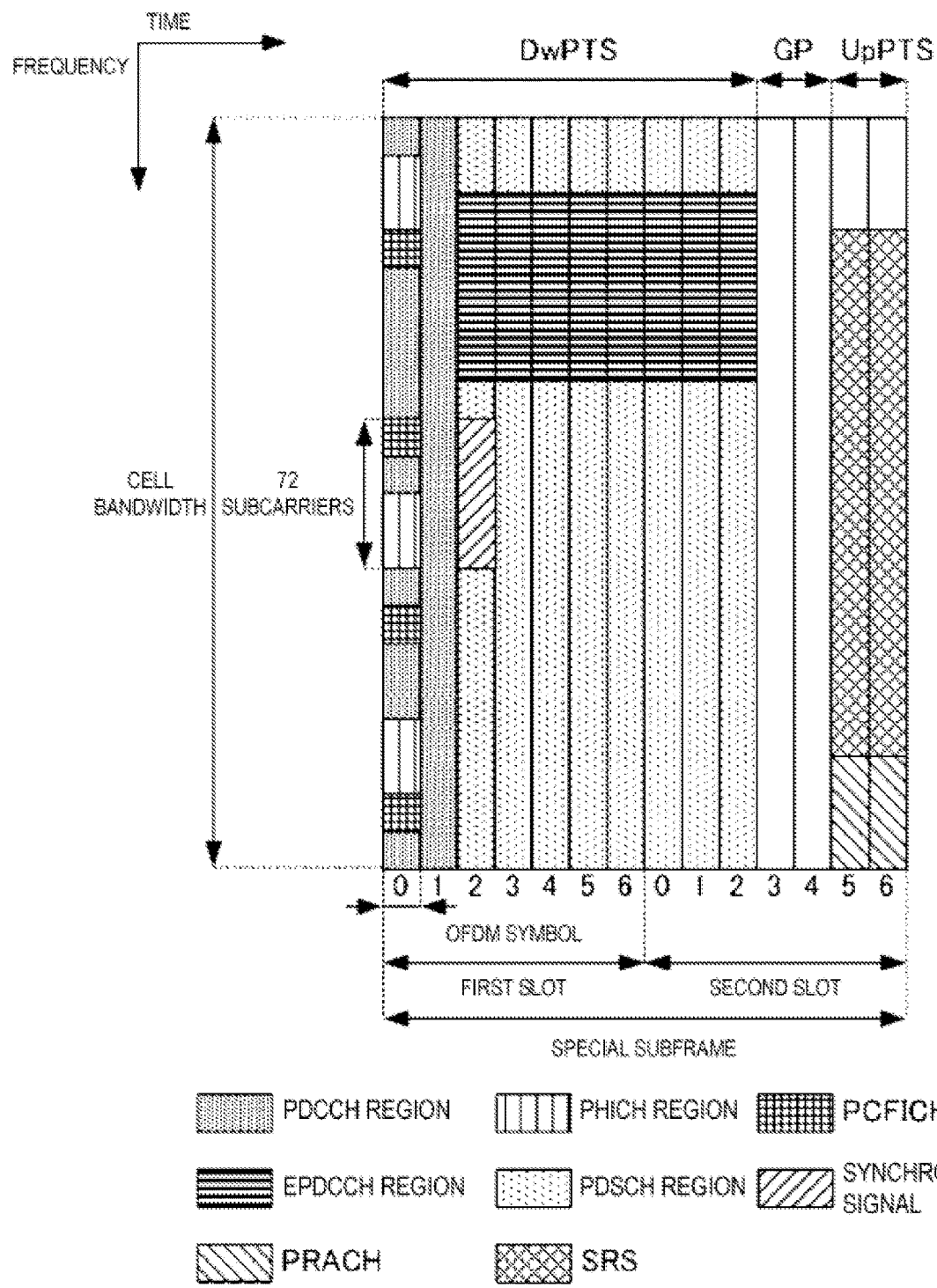
FIG. 6 is a diagram illustrating one example of allocation of the physical channel and mapping of the physical signal to the special subframe according to the present embodiment.

FIG. 6 is a diagram illustrating one example of allocation of the physical channel and mapping of the physical signal to the special subframe according to the present embodiment. In FIG. 6, the DwPTS is constituted of first to 10-th SC-FDMA symbols within the special subframe, the GP is constituted of 11-th and 12-th SC-FDMA symbols within the special subframe, and the UpPTS is constituted of 13-th and 14-th SC-FDMA symbols within the special subframe.

The base station device 3 may transmit the PCFICH, the PHICH, the PDCCH, the EPDCCH, the PDSCH, the synchronization signal, and the downlink reference signal, in the DwPTS of the special subframe. Toe base station device 3 can restrict transmission of the PBCH in the DwPTS of the special subframe. The terminal device 1 may transmit the PRACH and the SRS in the UpPTS of the special subframe. That is, the terminal device 1 can restrict transmission of the PUCCH, the PUSCH, and the DMRS in the UpPTS of the special subframe.

Figure 7:
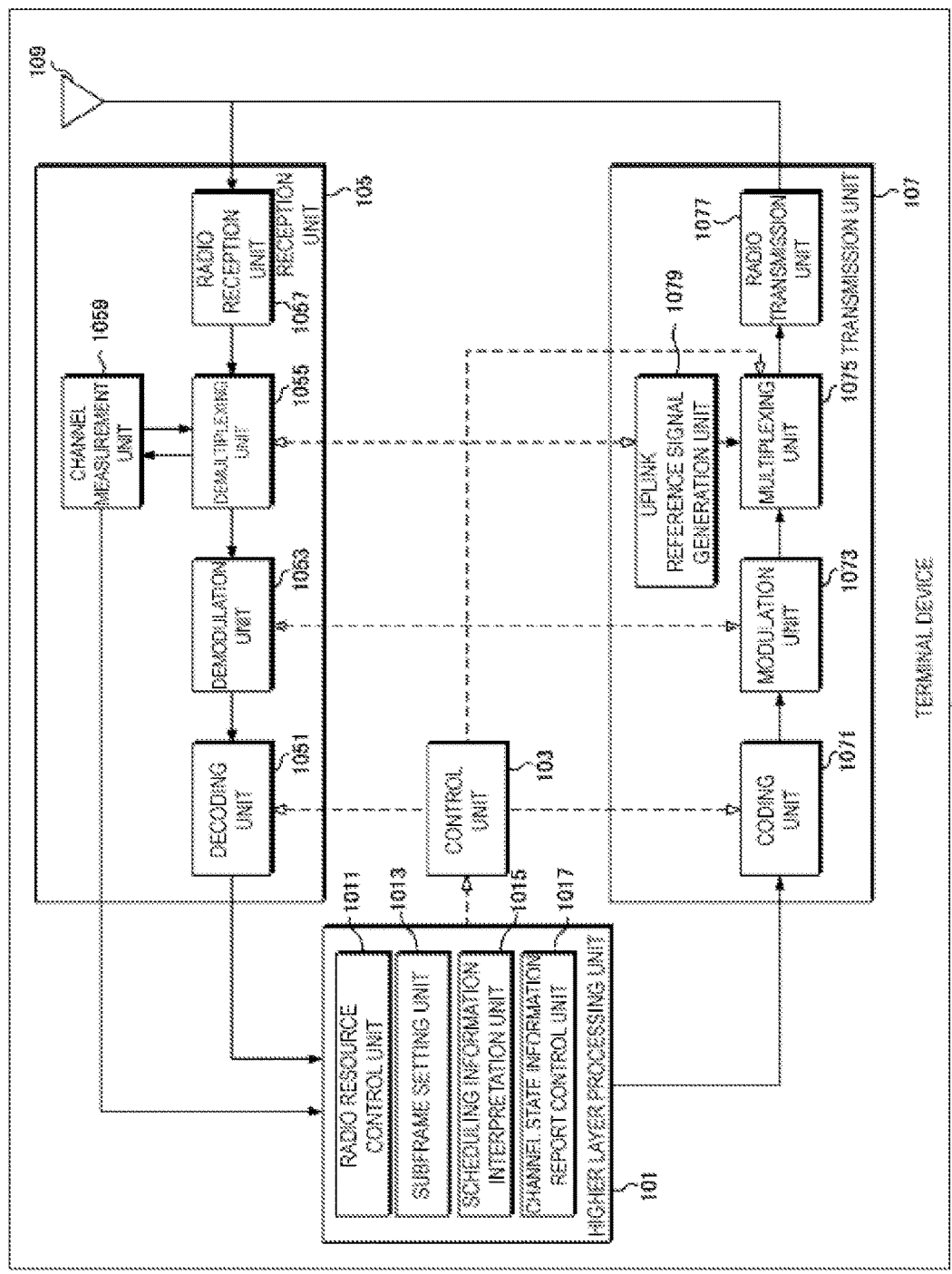
FIG. 7 is a schematic block diagram illustrating a structure of a terminal device 1 according to the present embodiment.

FIG. 7 is a schematic block diagram illustrating a structure of the terminal device 1 according to the present embodiment. As is illustrated, the terminal device 1 is configured to include a higher layer processing unit 101, a control unit 103, a reception unit 105, a transmission unit 107, and a transmit and receive antenna 109. Furthermore, the higher layer processing unit 101 is configured to include a radio resource control unit 1011, a subframe setting unit 1013, a scheduling information interpretation unit 1015, and a channel state information (CSI) report control unit 1017. Furthermore, the reception unit 105, is configured to include a decoding unit 1051, a demodulation unit 1053, a demultiplexing unit 1055, a radio reception unit 1057, and a channel measurement unit 1059. Furthermore, the transmission unit 107 is configured to include a coding unit 1071, a modulation unit 1073, a multiplexing unit 1075, a radio transmission unit 1077, and an uplink reference signal generation unit 1079.

The higher layer processing unit 101 outputs the UL-SCH data (the transport block) generated by a user operation or the like, to the transmission unit 107.

Furthermore, the higher layer processing unit 101 performs processing of the medium access control (MAC) layer, a packet data convergence protocol (PDCP) layer, a radio link control (RLC) layer, and a radio resource control (RRC) layer.

The higher layer processing unit 101 is provided with a function for carrying out control (switching) of activation/deactivation of the cell in the physical layer/the MAC layer and a function for controlling the physical layer and the MAC layer for managing an uplink transmission timing when carrier aggregation is performed using a plurality of cells.

The higher layer processing unit 101 is provided with a function for determining whether or not a measurement instruction that is calculated by the reception unit 105 and a measurement result that is calculated by the reception unit 105 is reported.

The higher layer processing unit 101 may be provided with a function for carrying out control (snitching) of activation/deactivation of the cell in the physical layer when carrier aggregation is performed using a plurality of cells and when at least one cell that is configured by the carrier frequency of the LAA band is included in the plurality of cells.

The radio resource control unit 1011 included in the higher layer processing unit 101 manages various pieces of configuration information of the terminal device 1 itself. Furthermore, the radio resource control unit 1011 generates information to be arranged in each channel for uplink, and outputs the generated information to the transmission unit 107.

The subframe setting unit 1013 included in the higher layer processing unit 101 manages subframe configuration in the base station device 3 and/or a base station device (for example, abase station device 3A) that is different from the base station device 3 based on information that is configured by the base station device 3. For example, the subframe configuration is an uplink or downlink configuration with respect to the subframe. The subframe configuration includes a subframe pattern configuration, an uplink-downlink (UL-DL) configuration, an uplink reference UL-DL configuration (uplink reference configuration), a downlink reference UL-DL configuration (downlink reference configuration), and/or a transmission direction UL-DL configuration (transmission direction configuration). The subframe setting unit 1013 sets the subframe configuration, the subframe pattern configuration, the uplink-downlink configuration, the uplink reference UL-DL configuration, the downlink reference UL-DL configuration, and/or a transmission direction UL-DL configuration. Furthermore, it is possible to configure the subframe setting unit 1013 of at least two subframe sets. Note that the subframe pattern configuration may include the EPDCCH subframe configuration. Note that the subframe setting unit 1013 is also referred to as a terminal subframe setting unit.

The subframe configuration and/or the subframe pattern may indicate the subframe in which a specific signal is received/monitored. For example, the EPDCCH subframe configuration may indicate the subframe in which it is possible to receive/monitor the EPDCCH.

The scheduling information interpretation unit 1015 included in the higher layer processing unit 101 interprets the DCI format (scheduling information) received through the reception unit 105, generates control information for controlling of the reception unit 105 and the transmission unit 107, on the basis of the result of the interpretation of the DCI format, and outputs the generated control information to the control unit 103.

The scheduling information interpretation unit 1015 determines a timing at which transmission processing and reception processing are performed based on the subframe configuration, the subframe pattern configuration, the uplink-downlink configuration, the uplink reference UL-DL configuration, the downlink reference UL-DL configuration, and/or the transmission direction UL-DL configuration.

A CSI report control unit 1017 specifies a CSI reference resource. The CSI report control unit 1017 instructs the channel measurement unit 1059 to derive a CQI relating to the CSI reference resource. The CSI report control unit 1017 instructs the transmission unit 107 to transmit the CQI. The CSI report control unit 1017 sets a configuration that is used when the channel measurement unit 1059 calculates the CQI.

On the basis of the control information originating from the higher layer processing unit 101, the control unit 103 generates a control signal for controlling of the reception unit 105 and the transmission unit 107. The control unit 103 outputs the generated control signal to the reception unit 105 and the transmission unit 107 to control the reception unit 105 and the transmission unit 107.

The reception unit 105 demultiplexes, demodulates, and decodes a reception signal received from the base station device 3 through the transmit and receive antenna 109 based on the control signal input from the control unit 103. The reception unit 105 outputs decoded information to the higher layer processing unit 101.

The radio reception unit 1057 converts (down-converts) a downlink signal received by the transmit and receive antenna 109 into a signal of an intermediate frequency, removes unnecessary frequency components, controls an amplification level in such a manner as to suitably maintain a signal level, performs orthogonal demodulation on the basis of an in-phase component and an orthogonal component of the received signal, and converts the resulting orthogonally-demodulated analog signal into a digital signal. The radio reception unit 1057 removes a part corresponding to a guard interval (GI) from the digital signal resulting from the conversion, performs fast Fourier transform (FFT) on the signal from which the guard interval has been removed, and extracts a signal in the frequency domain.

The demultiplexing unit 1055 demultiplexes the extracted signal into the PHICH, the PDCCH, the EPDCCH, the PDSCH, and/or the downlink reference signal. Furthermore, the demultiplexing unit 1055 makes a compensation of channels including the PHICH, the PDCCH, the EPDCCH, and/or the PDSCH, from a channel estimated value input from the channel measurement unit 1059. Furthermore, the demultiplexing unit 1055 outputs the downlink reference signal resulting from the demultiplexing, to the channel measurement unit 1059.

The demodulation unit 1053 multiplies the PHICH by a corresponding code for composition, demodulates the resulting composite signal in compliance with a binary phase shift keying (BPSK) modulation scheme, and outputs a result of the demodulation to the decoding unit 1051. The decoding unit 1051 decodes the PHICH destined for the terminal device 1 and outputs the HARQ indicator resulting from the decoding to the higher layer processing unit 101. The demodulation unit 1053 demodulates the PDCCH and/or the EPDCCH in compliance with a QPSK modulation scheme and outputs a result of the demodulation to the decoding unit 1051. The decoding unit 1051 attempts to decode the PDCCH and/or the EPDCCH. In a case of succeeding in the decoding, the decoding unit 1051 outputs downlink control information resulting from the decoding and an RNTI to which the downlink control information corresponds, to the higher layer processing unit 101.

The demodulation unit 1053 demodulates the PDSCH in compliance with a modulation scheme notified with the downlink grant, such as quadrature phase shift keying (QPSK), 16 quadrature amplitude modulation (QAM), or 64 QAM, and outputs a result of the demodulation to the decoding unit 1051. The decoding unit 1051 decodes the data on the basis of information on a coding rate notified with the downlink control information, and outputs, to the higher layer processing unit 101, the DL-SCH data (the transport block) resulting from the decoding.

The channel measurement unit 1059 measures a downlink path loss or a channel state from the downlink reference signal input from the demultiplexing unit 1055, and outputs the measured path loss or channel state to the higher layer processing unit 101.

Furthermore, the channel measurement unit 1059 calculates a downlink channel estimated value from the downlink reference signal (the CRS, the CSI-RS, and the DS) and outputs the calculated downlink channel estimated value to the demultiplexing unit 1055.

Furthermore, the channel measurement unit 1059 performs channel measurement and/or interference measurement in order to calculate the CQI. Furthermore, the channel measurement unit 1059 performs CSI measurement and/or CSI interference measurement in order to calculate the CSI (the CQI, the PMI, and the RI).

Furthermore, the channel measurement unit 1059 performs measurement to notify the downlink reference signal input from the demultiplexing unit 1055 to the higher layer.

Furthermore, the channel measurement unit 1059 performs calculation of the RSRP and the RSRQ, and outputs the result (measurement result and the calculation result) to the higher layer processing unit 101.

Furthermore, the channel measurement unit 1059 may calculate the received signal strength indicator (RSSI) using the RSRP and/or the RSRQ.

Furthermore, the channel measurement unit 1059 may perform RSRP measurement and/or the RSRQ measurement with respect to the CRS and output the result to the higher layer processing unit 101 when the parameter related to the CRS is set to the DS measurement configuration or the DS measurement taming configuration (DMTC).

Furthermore, the channel measurement unit 1059 may perform the RSRP measurement and/or the RSRQ measurement with respect to the configured CSI-RS resource and output the result to the higher layer processing unit 101 when the configuration that relates to the CSI-RS (the parameter that relates to the CSI-RS, for example, the CSI-RS resource configuration) is set to the DS measurement configuration or the DS measurement timing configuration (DMTC).

Furthermore, the channel measurement unit 1059 may calculate the RSSI based on the RSRP/RSRQ with respect to the CRS and the RSRP with respect to the CSI-RS.

The transmission unit 107 generates the uplink reference signal in accordance with the control signal input from the control unit 103, codes and modulates the UL-SCH data (the transport block) input from the higher layer processing unit 101, multiplexes the PUCCH, the PUSCH, and the generated uplink reference signal, and transmits a result of the multiplexing to the base station device 3 through the transmit and receive antenna 109.

The coding unit 1071 codes the uplink control information input from the higher layer processing unit 101 in compliance with a coding method, such as convolutional coding or block coding. Furthermore, the coding unit 1071 performs turbo coding on the basis of information used for the scheduling of the PUSCH.

The modulation unit 1073 modulates coded bits input from the coding unit 1071, in compliance with the modulation scheme notified with the downlink control information, such as BPSK, QPSK, 16 QAM, or 64 QAM, or in compliance with a modulation scheme prescribed in advance for each channel. On the basis of the information used for the scheduling of the PUSCH, the modulation unit 1073 determines the number of data sequences to be spatial-multiplexed, maps a plurality of pieces of UL-SCH data to be transmitted on the same PUSCH to a plurality of sequences through multiple input multiple output spatial multiplexing (MIMO SM), and performs precoding on the sequences.

The uplink reference signal generation unit 1079 generates a sequence acquired according to a rule (expression) prescribed in advance, on the basis of a physical layer cell identifier (also referred to as a physical cell identity (PCI), a cell ID, or the like) for identifying the base station device 3, a bandwidth to which the uplink reference signal is mapped, a cyclic shift notified with the uplink grant, a parameter value for generation of a OMRS sequence, and the like.

In accordance with the control signal input from the control unit 103, the multiplexing unit 1075 rearranges modulation symbols of the PUSCH in parallel and then performs discrete Fourier transformation (DFT) on the rearranged modulation symbols. Furthermore, the multiplexing unit 1075 multiplexes PUCCH and PUSCH signals and the generated uplink reference signal for each transmit antenna port. To be more precise, the multiplexing unit 1075 maps the FUCCH and PUSCH signals and the generated uplink reference signal to the resource elements for each transmit antenna port.

The radio transmission unit 1077 performs inverse fast Fourier transform (IFFT) on a signal resulting from the multiplexing, performs modulation in compliance with an SC-FDMA scheme, attaches the guard interval to the SC-FDMA-modulated SC-FDMA symbol, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a high frequency signal, removes unnecessary frequency components, performs power amplification, and outputs a final result to the transmit and receive antenna 109 for transmission. Note that the transmit and receive antenna 109 may have separate transmit antennas and receive antennas. For example, the transmit and receive antenna 109 may be constituted by a different number of transmit antennas and receive antennas.

Note that the terminal device 1 may be separately provided with the reception unit, the transmission unit, the channel measurement unit, the control unit, the higher layer processing unit, the scheduling unit the transmit and receive antenna, and the like for an LTE signal and a Wi-Fi signal when a function is supported related to transmission and reception of a Wi-Fi signal (wireless local area network (WLAN) signal and a radio local area network (RLAN) signal) in addition to the function that relates to transmission and reception of the LTE signal. In other words, the terminal device 1 may separately include a circuit/chip (chip set) supporting the LTE signal and a circuit/chip (chip set) supporting the Wi-Fi signal. Furthermore, the reception unit, the transmission unit, the channel measurement unit, the control unit, the higher layer processing unit, the scheduling unit, the transmit and receive antenna and the like may be common to the LTE signal and the Wi-Fi signal. In other words, the LTE signal and the Wi-Fi signal may be common to some of the devices. For example, the transmission unit or the reception unit that include a radio frequency (RF) unit, an amplifier, or the like may commonly process the LTE signal and the Wi-Fi signal. Here, a sequence, communication method, modulation/demodulation method, coding/decoding method, or the like with respect to the LTE signal or the Wi-Fi signal may be included in the LTE signal or the Wi-Fi signal.

Furthermore, the terminal device 1 may be separately provided with the reception unit, the transmission unit, the channel measurement unit, the control unit, the higher layer processing unit, the scheduling unit, the transmit and receive antenna, and the like for the LTE signal and the LAA signal when a function is supported related to transmission and reception of the LAA signal in addition to the function that relates to transmission and reception of the LTE signal. In other words, the terminal device 1 may separately include a circuit/chip (chip set) supporting the LTE signal and a circuit/chip (chip set) supporting the LAA signal. Furthermore, the reception unit, the transmission unit, the channel measurement unit, the control unit, the higher layer processing unit the scheduling unit, the transmit and receive antenna, and the like may be common to the LTE signal and the LAA signal. In other words, the LTE signal and the LAA signal may be common to some of the devices. For example, the transmission unit or the reception unit that include the RF unit, the amplifier, or the like may commonly process the LTE signal and the LAA signal. Here, the sequence, communication method, modulation/demodulation method, coding/decoding method, or the like with respect to the LAA signal may be included in the LAA signal.

Furthermore, the terminal device 1 may be separately provided with the reception unit, the transmission unit, the channel measurement unit, the control unit, the higher layer processing unit, the scheduling unit, the transmit and receive antenna, and the like for the LAA signal and the Wi-Fi signal when a function is supported related to transmission and reception of the LAA signal and a function is supported related to the transmission and reception of the Wi-Fi signal (the WLAN signal and the RLAN signal) in addition to the function that relates to transmission and reception of the LTE signal. In other words, the terminal device 1 may separately include a circuit/chip (chip set) supporting the LAA signal and a circuit/chip (chip set) supporting the Wi-Fi signal. Furthermore, the reception unit, the transmission unit, the channel measurement unit, the control unit, the higher layer processing unit, the scheduling unit, the transmit and receive antenna, and the like may be common to the LAA signal and the Wi-Fi signal. In other words, the LAA signal and the Wi-Fi signal may be common to some of the devices. For example, the transmission unit or the reception unit that include the RF unit, the amplifier, or the like may commonly process the LAA signal and the Wi-Fi signal.

Furthermore, the terminal device 1 may be separately provided with the reception unit, the transmission unit, the channel measurement unit, the control unit, the higher layer processing unit, the scheduling unit, the transmit and receive antenna, and the like for the LTE/LAA signal and an inter-RAT signal when a function is supported related to transmission and reception of the inter-RAT signal in addition to the function that relates to transmission and reception of the LTE/LAA signal. In other words, the terminal device 1 may separately include a circuit/chip (chip set) supporting the LTE/LAA signal and a circuit/chip (chip set) supporting the inter-RAT signal. Furthermore, the reception unit, the transmission unit, the channel measurement unit, the control unit, the higher layer processing unit, the scheduling unit, the transmit and receive antenna, and the like may be common to the LTE/LAA signal and the inter-RAT signal. In other words, the LTE/LAA signal and the inter-RAT signal may be common to some of the devices. For example, the transmission unit or the reception unit that include the RF unit, the amplifier, or the like may commonly process the LTE/LAA signal and the inter-RAT signal.

Furthermore, the terminal device 1 notifies to the base station device 3 that there is damage caused by interference with the LAA signal when there is an obstacle to reception of the LAA signal caused by transmission of the Wi-Fi signal. The base station device 3 receives the notification and controls the transmission timing of the LAA signal.

Figure 8:
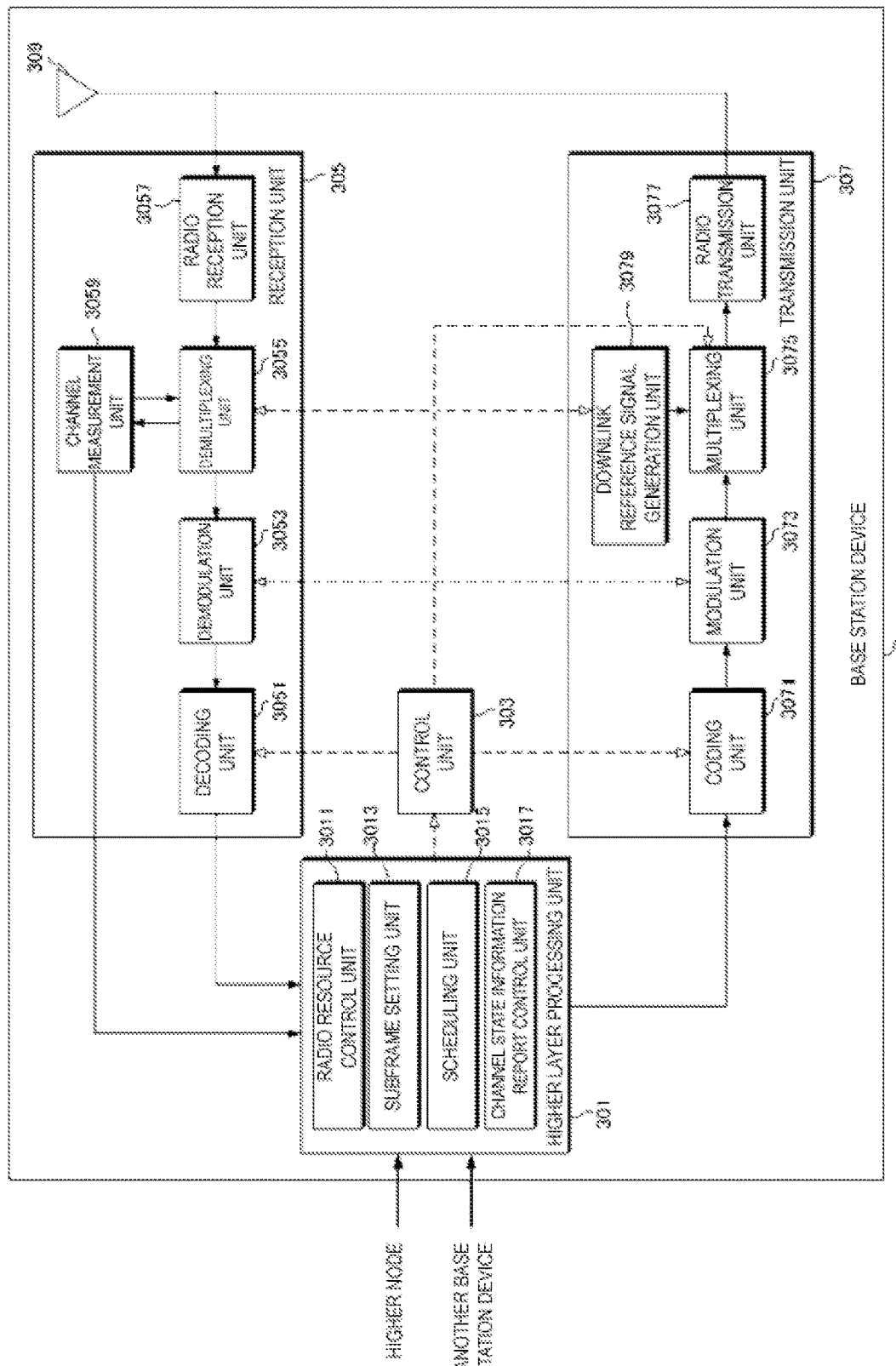
FIG. 8 is a schematic block diagram illustrating a structure of the base station device 3 according to the present embodiment.

FIG. 8 is a schematic block diagram, illustrating a structure of the base station device 3 according to the present embodiment. As is illustrated, the base station device 3 is configured to include a higher layer processing unit 301, a control unit 303, a reception unit 305, a transmission unit 307, and a transmit and receive antenna 309. Furthermore, the higher layer processing unit 301 is configured to include a radio resource control unit 3011, a subframe setting unit 3013, a scheduling unit 3015, and a CSI report control unit 3017. Furthermore, the reception unit 305, is configured to include a decoding unit 3051, a demodulation unit 3053, a demultiplexing unit 3055, a radio reception unit 3057, and a channel measurement unit 3059. Furthermore, the transmission unit 307 is configured to include a coding unit 3071, a modulation unit 3073, a multiplexing unit 3075, a radio transmission unit 3077, and a downlink reference signal generation unit 3079.

The higher layer processing unit 301 performs processing of the medium access control (MAC) layer, the packet data convergence protocol (PDCP) layer, the radio link control (RLC) layer, and the radio resource control (RRC) layer. Furthermore, the higher layer processing unit 301 generates control information for controlling the reception unit 305 and the transmission unit 307, and outputs the generated control information to the control unit 303. Furthermore, the higher layer processing unit 301 is provided with a function for acquiring the reported measurement result.

The radio resource control unit 3011 included in the higher layer processing unit 301 generates, or acquires from a higher node, the DL-SCH data (the transport block) allocated in the downlink PDSCH, system information, the RRC message, the MAC control element (CE), and the like, and outputs a result of the generation or the acquirement to the transmission unit 307. Furthermore, the radio resource control unit 3011 manages various pieces of configuration information for each of the terminal devices 1.

Furthermore, the radio resource control unit 3011 configures values of various parameters (higher layer parameters) that are transmitted via higher layer signalling, and outputs the values to the transmission unit 307.

The subframe setting unit 3013 included in the higher layer processing unit 301 performs management of the subframe configuration, the subframe pattern configuration, the uplink-downlink configuration, the uplink reference UL-DL configuration, the downlink reference UL-DL configuration, and/or the transmission direction UL-DL configuration, on each of the terminal devices 1. That is, the subframe setting unit 3013 sets the subframe configuration, the subframe pattern configuration, the uplink-downlink configuration, the uplink reference UL-DL configuration, the downlink reference UL-DL configuration, and/or the transmission direction UL-DL configuration, on each of the terminal devices 1, and transmits the information to the terminal device 1 via L1 signalling, L2 signalling, or L3 signalling. Note that the subframe setting unit 3013 is also referred to as a base station subframe setting unit.

The base station device 3 may determine the subframe configuration, the subframe pattern configuration, the uplink-downlink configuration, the uplink reference UL-DL configuration, the downlink reference UL-DL configuration, and/or the transmission direction UL-DL configuration, for the terminal device 1. Furthermore, the base station device 3 may be instructed by the higher node to set the subframe configuration, the subframe pattern configuration, the uplink-downlink configuration, the uplink reference UL-DL configuration, the downlink reference UL-DL configuration, and/or the transmission direction UL-DL configuration, for the terminal device 1.

For example, on the basis of the amount of uplink traffic and the amount of downlink traffic, the subframe setting unit 3013 may determine the subframe configuration, the subframe pattern configuration, the uplink-downlink configuration, the uplink reference UL-DL configuration, the downlink reference UL-DL configuration, and/or the transmission direction UL-DL configuration.

The subframe setting unit 3013 is able to perform management of at least two subframe sets. The subframe setting unit 3013 may configure at least two subframe sets for each of the terminal devices 1. The subframe setting unit 3013 may configure at least two subframe sets for each of the serving cells. The subframe setting unit 3013 may configure at least two subframe sets for each CSI process. The subframe setting unit 3013 may transmit information indicating at least two subframe sets to the terminal device 1 through the transmission unit 307.

The scheduling unit 3015 included in the higher layer processing unit 301 determines a frequency and a subframe to which the physical channels (the PDSCH and the PUSCH) are allocated, the coding rate and modulation scheme for the physical channels (the PDSCH and the PUSCH), the transmit power, and the like, from the received channel state information and from the channel estimated value, channel quality, or the like input from the channel measurement unit 3059. The scheduling unit 3015 determines whether, in a flexible subframe, the downlink physical channel and/or the downlink physical signal is scheduled or the uplink physical channel and/or the uplink physical signal is scheduled. The scheduling unit 3015 generates the control information (for example, the DCI format) in order to control the reception unit 305 and the transmission unit 307 on the basis of a result of the scheduling, and outputs the generated information to the control unit 303.

The scheduling unit 3015 generates the information to be used for the scheduling of the physical channel (the PDSCH and the PUSCH), on the basis of the result of the scheduling. The scheduling unit 3015 determines the timing (subframe) at which the transmission processing and the reception processing are performed, on the basis of the UL-DL configuration, the subframe pattern configuration, the uplink-downlink configuration, the uplink reference UL-DL configuration, the downlink reference UL-DL configuration, and/or the transmission direction UL-DL configuration.

The CSI report control unit 3017 included in the higher layer processing unit 301 controls a CSI report that is made by the terminal device 1. The CSI report control unit 3017 transmits information that is assumed in order for the terminal device 1 to derive a CQI in the CSI reference resource and that indicates various configurations, to the terminal device 1 through the transmission unit 307.

On the basis of the control information originating from the higher layer processing unit 301, the control unit 303 generates a control signal for controlling the reception unit 305 and the transmission unit 307. The control unit 303 outputs the generated control signal to the reception unit 305 and the transmission unit 307 to control the reception unit 305 and the transmission unit 307.

In accordance with the control signal input from the control unit 303, the reception unit 305 demultiplexes, demodulates, and decodes the reception signal received from the terminal device 1 through the transmit and receive antenna 309, and outputs information resulting from the decoding to the higher layer processing unit 301. The radio reception unit 3057 converts (down-converts) an uplink signal received through the transmit and receive antenna 309 into a signal of an intermediate frequency, removes unnecessary frequency components, controls an amplification level in such a manner as to suitably maintain a signal level, performs orthogonal demodulation on the basis of an in-phase component and an orthogonal component of the received signal, and converts the resulting orthogonally-demodulated analog signal into a digital signal.

The radio reception unit 3057 removes a portion corresponding to the guard interval (GI) from the digital signal resulting from the conversion. The radio reception unit 3057 performs fast Fourier transform (FTT) on the signal from which the guard interval has been removed, extracts a signal in the frequency domain, and outputs the resulting signal to the demultiplexing unit 3055.

The demultiplexing unit 1055 demultiplexes the signal input from the radio reception unit 3057 into the PUCCH, the PUSCH, and the signal such as the uplink reference signal. Note that the demultiplexing is performed on the basis of radio resource allocation information that is determined in advance by the base station device 3 using the radio resource control unit 3011 and that is included in the uplink grant notified to each of the terminal devices 1. Furthermore, the demultiplexing unit 3055 maVpc a compensation of channels including the PUCCH and the PUSCH from the channel estimated value input from the channel measurement unit 3059. Furthermore, the demultiplexing unit 3055 outputs an uplink reference signal resulting from the demultiplexing, to the channel measurement unit 3059.

The demodulation unit 3053 performs inverse discrete Fourier transform (IDFT) on the PUSCH, acquires the modulation symbol, and performs reception signal demodulation on each of the modulation symbols of the PUCCH and the PUSCH, in compliance with the modulation scheme prescribed in advance, such as binary phase shift keying (BPSK), QPSK, 16 QAM, or 64 QAM, or in compliance with the modulation scheme that the base station device 3 itself notifies in advance with the uplink giant to each of the terminal devices 1. The demodulation unit 3053 demultiplexes the modulation symbols of the plurality of pieces of UL-SCH data transmitted on the same PUSCH by using the MIMO SM, on the basis of the number of spatial-multiplexed sequences notified in advance with the uplink grant to each of the terminal devices 1 and information indicating the precoding to be performed on the sequences.

The decoding unit 3051 decodes the coded bits of the PUCCH and the PUSCH, which have been demodulated, at the coding rate in compliance with a coding scheme prescribed in advance, the coding rate being prescribed in advance or being notified in advance with the uplink grant to the terminal device 1 by the base station device 3 itself, and outputs, to the higher layer processing unit 101, the decoded UL-SCH data and uplink control information. In a case where the PUSCH is re-transmitted, the decoding unit 3051 performs the decoding using the coded bits input from the higher layer processing unit 301 and retained in an HARQ buffer, and the demodulated coded bits. The channel measurement unit 3059 measures the channel estimated value, the channel quality, and the like, on the basis of the uplink reference signal input from the demultiplexing unit 3055, and outputs a result of the measurement to the demultiplexing unit 3055 and the higher layer processing unit 301.

The transmission unit 307 generates the downlink reference signal in accordance with the control signal input from the control unit 303, codes and modulates the HARQ indicator, the downlink control information, and the DL-SCH data pieces that are input from the higher layer processing unit 301, multiplexes the PHICH, the PDCCH, the EPDCCH, the PDSCH, and the downlink reference signal, and transmits the resulting signal to the terminal device 1 through the transmit and receive antenna 309.

The transmission unit 307 transmits various downlink control information through the DCI format.

The coding unit 3071 codes the HARQ indicator, the downlink control information, and the DL-SCH data pieces that are input from the higher layer processing unit 301, in compliance with the coding scheme prescribed in advance, such as block coding, convolutional coding, or turbo coding, or in compliance with the coding scheme determined by the radio resource control unit 3011. The modulation unit 3073 modulates the coded bits input from the coding unit 3071, in compliance with the modulation scheme prescribed in advance, such as BPSK, QPSK, 16 QAM, or 64 QAM, or in compliance with the modulation scheme determined by the radio resource control unit 3011.

The downlink reference signal generation unit 3079 generates, as the downlink reference signal, a sequence that is already known to the terminal device 1 and that is acquired according to a rule prescribed in advance on the basis of the physical layer cell identifier (PCI) for identifying the base station device 3, and the like. The multiplexing unit 3075 multiplexes the modulated modulation symbol of each channel and the generated downlink reference signal. To be more precise, the multiplexing unit 3075 arranges the modulated modulation symbol of each channel and the generated downlink reference signal to the resource elements.

The radio transmission unit 3077 performs inverse fast Fourier transform (IFFT) on the modulation symbol and the like resulting from the multiplexing, performs modulation in compliance with an OFDM method, attaches the guard interval to the OFDM-modulated OFDM symbol, generates a baseband digital signal, converts the baseband digital signal into an analog signal, generates an in-phase component and an orthogonal component of an intermediate frequency from the analog signal, removes frequency components unnecessary for the intermediate frequency band, converts (up-converts) the signal of the intermediate frequency into a signal of a high frequency, removes unnecessary frequency components, performs power amplification, and outputs a final result to the transmit and receive antenna 309 for transmission. Note that the transmit and receive antenna 309 may have separate transmit antennas and receive antennas. For example, the transmit and receive antenna 309 may be constituted by a different number of transmit antennas and receive antennas.

Here, the PDCCH or the EPDCCH is used for transmitting (instructing) the downlink control information (DCI) to the terminal device 1. For example, the downlink control information includes information related to PDSCH resource allocation, information related to a modulation and coding scheme (MCS), information related to a scrambling identity (also referred to as a scrambling identifier), information relating to a reference signal sequence identity (also referred to as a base sequence identity, a base sequence identifier, and a base sequence index), and the like.

Note that the base station device 3 may be separately provided with the reception unit, the transmission unit, the channel measurement unit, the control unit, the higher layer processing unit, the scheduling unit, the transmit and receive antenna, and the like for the LTE signal and the Wi-Fi signal when a function is supported related to transmission and reception of the Wi-Fi signal (the WLAN signal and the RLAN signal) in addition to the function that relates to transmission and reception of the LTE sign. In other words, the base station device 3 may separately include a circuit/chip (chip set) supporting the LTE signal and a circuit/chip (chip set) supporting the Wi-Fi signal. Furthermore, the base station device 3 may include the base station device that supports the LTE signal and the base station device that supports the Wi-Fi signal. Furthermore, the reception unit, the transmission unit, the channel measurement unit, the control unit, the higher layer processing unit, the scheduling unit, the transmit and receive antenna, and the like may be common to the LTE signal and the Wi-Fi signal. In other words, the LTE signal and the Wi-Fi signal may be common to some of the devices. For example, the transmission unit or the reception unit that include the RF unit, the amplifier, or the like may commonly process the LTE signal and the Wi-Fi signal.

Furthermore, the base station device 3 may be separately provided with the reception unit, the transmission unit, the channel measurement unit, the control unit, the higher layer processing unit, the scheduling unit, the transmit and receive antenna, and the like for the LTE signal and the LAA signal when a function is supported related to transmission and reception of the LAA signal in addition to the function that relates to transmission and reception of the LTE signal. In other words, the base station device 3 may separately include a circuit/chip (chip set) supporting the LTE signal and a circuit/chip (chip set) supporting the LAA signal. Furthermore, the base station device 3 may include the base station device that supports the LTE signal and the base station device that supports the LAA signal. Furthermore, the reception unit, the transmission unit, the channel measurement unit, the control unit, the higher layer processing unit, the scheduling unit, the transmit and receive antenna, and the like may be common to the LTE signal and the LAA signal. In other words, the LTE signal and the LAA signal may be commonly processes to some of the devices. For example, the transmission unit or the reception unit that include the RF unit, the amplifier, or the like may commonly process the LTE signal and the LAA signal.

Furthermore, the base station device 3 may be separately provided with the reception unit, the transmission unit the channel measurement unit, the control unit the higher layer processing unit, the scheduling unit, the transmit and receive antenna, and the like for the LAA signal and the Wi-Fi signal when a function is supported related to transmission and reception of the LAA signal and a function is supported that relates to the transmission and reception of the Wi-Fi signal (the WLAN signal and the RLAN signal) in addition to the function that relates to transmission and reception of the LTE signal. In other words, the base station device 3 may separately include a circuit/chip (chip set) supporting the LAA signal and a circuit/chip (chip set) supporting the Wi-Fi signal. Furthermore, the base station device 3 may include the base station device that supports the LAA signal and the base station device that supports the Wi-Fi signal. Furthermore, the reception unit, the transmission unit, the channel measurement unit, the control unit, the higher layer processing unit, the scheduling unit, the transmit and receive antenna, and the like may be common to the LAA signal and the Wi-Fi signal. In other words, the LAA signal and the Wi-Fi signal may be common to some of the devices. For example, the transmission unit or the reception unit that include the RF unit, the amplifier; or the like may commonly process the LAA signal and the Wi-Fi signal.

When the PDSCH/EPDCCH is transmitted and/or when the downlink reference signal is transmitted at a shorter gap than a prescribed condition (prescribed cycle) to the LAA cell, the base station device 3 performs a clear channel assessment (CCA) check. When it is confirmed that there is no transmission from another LAA base station device or a Wi-Fi apparatus (that is, the channel is clear) in a channel (a component earner, a radio resource, and a frequency bandwidth) on the CCA check, the base station device 3 starts transmission. Prior to using the channel, a mechanism that applies the CCA is referred to as listen before talk (LBT). Here, in the present embodiment, it is considered that there is no difference between the LBT and the CCA. Furthermore, the base station device 3 and/or the terminal device 1 may always perform the CCA and not only just prior to the downlink transmission of the base station device 3 in the channel (the component carrier and the operating band). The LBT is supported in the base station device that is able to constitute the LAA cell.

Next, small cells will be described.

The small cells are constituted by the base station device 3 with a lower transmit power compared with a macro cell, and are collectively referred to as cells with small coverage. It is possible to configure the small cells to have small coverage, and the email cells may be closely located to each other. The base station device 3 that may constitute the small cells may be located at a different location from the base station device that may constitute the macro cells. Furthermore, it is possible to synchronize the small cells that are closely located and configure the small cells as a small cell cluster. The small cells in the small cell cluster are connected by backhaul (optical fibers, an X2 interface, and an S1 interface), and it is possible to apply an interference suppression technique such as enhanced inter-cell interference coordination (eICIC), further enhanced inter-cell interference coordination (FeICIC), coordinated multi-point transmission/reception (CoMP), and the like in the small cells in the small cell cluster. The small cells may be operated in a different frequency band and may be operated in the same frequency band as the macro cells. In particular, from the viewpoint of channel attenuation (path loss), it is possible to configure with smaller coverage by operating the small cells in a high frequency band compared with the macro cells.

The small cells that are operated in a different frequency band or interband may be operated using the macro cells and a carrier aggregation technique or a dual connectivity technique.

Furthermore, the small cells may be operated at the same frequency or the interband as the macro cells. The small cells may be operated outside of coverage of the macro cells. Furthermore, the base station device 3 of the small cells may be located at the same location as the base station device of the macro cells.

Furthermore, whether a certain cell is a macro cell or a small cell is recognized by the base station device 3, and it is not necessary that they are recognized by the terminal device 1. For example, the base station device 3 can configure, for the terminal device 1, the macro cell as a Pcell and the small cell as the Scell or the PSCell. In any case, the terminal device 1 may only recognize the PCell, SCell, or the PSCell, and it is not necessary to recognize the macro cells or the small cells.

Next, the carrier aggregation technique and the dual connectivity technique will be described in detail.

The secondary cells are configured by a serving cell set together with the primary cells dependent on the capability (performance or function) of the terminal device 1. That is, the secondary cells are listed and managed. The number of downlink component earners that are configured to the terminal device 1 must be greater than the number of uplink component carriers that are configured to the terminal device 1, and it is not possible to configure only the uplink component carriers as the secondary cells.

The terminal device 1 always uses the primary cells and the primary secondary cells in the transmission of the PUCCH. In other words, the terminal device 1 does not anticipate transmission of the PUCCH in secondary cells other than the primary cells and the primary secondary cells.

Reconfiguration/addition/modification/removal/release of the secondary cells is performed by the RRC layer. That is, reconfiguration/addition/modification/removal/release of the secondary cells may be performed through higher layer signalling.

When a new secondary cell is added, the new secondary cell transmits all required system information through dedicated RRC signalling (higher layer signalling). That is, in an RRC connected mode, it is not necessary to directly obtain system information (for example, MIB) by broadcast from the secondary cells. That is, the terminal device 1 does not anticipate transmission of the broadcast information from the secondary cell.

When carrier aggregation is configured (when at least one secondary cell is configured), a function of activation/deactivation of the secondary cells is supported. Note that a function of activation/deactivation is not applied to the primary cells. That is, the primary cells are always considered to be activated. When the secondary cells are configured to be deactivated, it is not necessary for the terminal device 1 to receive the corresponding PDCCH or PDSCH, or transmit at a corresponding uplink signal, and it is not necessary to perform CSI measurement conversely, when the secondary cells are configured to be activated, the terminal device 1 may perform CQI measurement/PMI measurement/RI measurement/CSI measurement in order to receive the corresponding PDSCH and PDCCH.

A mechanism of activation/deactivation may be based on a combination of the MAC CE and a deactivation timer. The MAC CE notifies information on the activation and deactivation of the secondary cells using a bit map. Bits that are set to 1 indicate activation of the secondary cells corresponding to the bits, and bits that are set to 0 indicate deactivation of the secondary cells corresponding to the bits. That is, the terminal device 1 is able to identify whether the secondary cells are activated or deactivated based on the bit value.

Note that the secondary cells that are configured in the terminal device 1 are configured as deactivation at an initial state (default state). That is, even if various parameters with respect to the secondary cells are configured for the terminal device 1, it cannot always start communication using the secondary cells immediately.

Next, an example of the MAC CE will be described.

An example of the structure of the activation/deactivation MAC CE will be described. The MAC CE has a fixed size and is constituted by seven Ci fields and one R field, and is defined as follows. Regarding the Ci, when there is a secondary cell configured with a secondary cell index (SCellIndex) i, the Ci field indicates an activation/deactivation state of the secondary cell having the secondary cell index i. The terminal device 1 ignores the Ci field when there is no secondary cell configured with the secondary cell index i. The Ci field being set to "1" indicates that the secondary cell having the secondary cell index i is activated. The Ci field being set to "0" indicates that the secondary cell having the secondary cell index i is deactivated. Furthermore, R is a reserved bit and is set to "0".

The structure of the activation/deactivation MAC CE may be modified when the secondary cell index is added or increased as a result of an increase of the number of the LAA cell. The Ci field may be added in accordance with the increase of the secondary cell index. For example, the Ci field may be added to/increased when the secondary cell index is added or increased by seven. The MAC CE of one octet (eight bits) may be modified to have two octets (16 bits) or more by adding the Ci field. Instruction/configuration of activation may be performed for up to four out of the secondary cells including the secondary cell corresponding to the added Ci field. The maximum number of secondary cells to be configured as activation may be determined based on an RF parameter. For example, when simultaneous transmission/reception in ten cells including a primary cell is possible, activation of nine cells excluding the primary cells may be instructed/configured/selected using the Ci fields. Furthermore, when simultaneous transmission/reception in five cells including a primary cell is possible, activation of four cells excluding the primary cells may be instructed/configured/selected using the Ci fields.

It is possible to instruct activation/deactivation of many rails at once by switching between activation/deactivation of LAA cells and LTE secondary cells by expanding the Ci field.

The base station device 3 may perform configuration to expand the secondary cell index when the terminal device 1 supports a function of communicating by the LAA cells and when it is possible to configure secondary cells of five cells or more. For example, the base station device 3 may configure the secondary cell index that corresponds to the LTE band (a band that supports the LTE carrier frequency, for example, the 2.4 GHz band) and the secondary cell index that corresponds to the LAA band (a band that supports the LAA carrier frequency for example, the 5 GHz band) with respect to the terminal device 1. The base station device 3 may configure, with respect to the terminal device 1, the respective secondary cells by listing them. Furthermore, the base station device 3 may expand the secondary cell index with respect to the terminal device 1. That is, the maximum number of secondary cells may be expanded to four or more with respect to the terminal device that is able to configure the LAA cell.

The terminal device 1 may simultaneously perform RLM on the LAA cells when DMTC is configured. That is, the terminal device 1 detects "out of synchronization" when the DS is not able to be detected in the subframe of the DMTC in the LAA cells, and detects "in synchronization" when the DS is detected. When a prescribed number of times of "out of synchronization" is detected successively, the physical layer of the terminal device 1 notifies that a problem is detected in the physical layer with respect to the higher layer of the terminal device 1. The higher layer of the terminal device 1 may receive the information and may not perform reception and transmission in the LAA cells. Furthermore, the higher layer of the terminal device 1 may notify that the problem is detected in the physical layer with respect to the higher layer of the base station device 3. The base station device 3 may receive the notification and update/reconfigure the cell list of the LAA cells. When the cell list of the LAA cells is reconfigured, the base station device 3 may transmit the reconfiguration information to the terminal device through higher layer signalling.

Next, an example of a deactivation timer (DeactivationTimer) will be described with respect to the secondary cells.

The deactivation timer is a timer that is associated with holding time with respect to the secondary cells that are configured with the deactivation timer. The terminal device 1 holds the deactivation timer for each secondary cell, and deactivates the secondary cells that are associated with the expired deactivation timer when the deactivation timer expires.

The initial value of the deactivation timer with respect to the secondary cells is configured using the higher layer parameter (sCellDeactivationTimer-r10). The initial value of the deactivation timer with respect to the secondary cells is configured using, for example, one from rf2, rf4, rf8, rf16, rf32, rf64, and rf128 that are values that are associated with the number of radio frames. Here, rf2 corresponds to two radio frames, rf4 corresponds to four radio frames, rf8 corresponds to eight radio frames, rf16 corresponds to 16 radio frames, rr32 corresponds to 32 radio frames, rf64 corresponds to 64 radio frames, and rf128 corresponds to 128 radio frames. Here, one radio frame consists often subframes (20 slots).

Note that the field (parameter sCellDeactivationTimer-r10) that is associated with the deactivation timer with respect to the secondary cells is configured with respect to the terminal device 1 that is configured by one or more secondary cells.

Note that it may be assumed that when there is no field that is associated with the deactivation timer, the terminal device 1 removes the value of an existing field that is associated with the deactivation timer and infinity is configured as the value.

Note that with respect to the terminal device 1, when only one field that is associated with the deactivation timer with respect to the secondary cells is configured, the initial value of the same deactivation timer is adapted to each secondary cell (a function that is associated with the deactivation timer is independently executed at each secondary cell).

An example of a mechanism of the activation/deactivation will be described.

When the MAC CE instructing activation of a secondary cell is received, the terminal device 1 configures, as activation, the secondary cell configured as activation by the MAC CE. Here, the terminal device 1 can perform the following operations with respect to the secondary cell configured as activation by the MAC CE. The operations include transmission of SRS using the secondary cells, reporting of a channel quality indicator (CQI)/precoding matrix indicator (PMI)/rank indicator (RI)/precoding type indicator (PTI) with respect to the secondary cells, transmission of uplink data (UL-SCH) using the secondary cells, transmission of RACH using the secondary cells, monitoring of the PDCCH using the secondary cells, and monitoring of the PDCCH with respect to the secondary cells.

When the MAC CE that instructs activation of a secondary cell is received, the terminal device 1 starts or restarts the deactivation timer that is associated with the secondary cell configured as activation by the MAC CE. Note that start is the start of counting of the timer by holding a value. Note that restart is the start of counting of the timer by configuring the value as the initial value.

The terminal device 1 triggers the transmission of a transmit power margin (power headroom (PHR)) when the MAC CE that instructs activation of the secondary cells is received.

When the MAC CE that instructs deactivation of the secondary cell is received or when the deactivation timer that is associated with the secondary cell has expired, the terminal device 1 configures, as deactivation, the secondary cell configured as deactivation by the MAC CE.

When the MAC CE that instructs deactivation of the secondary cell is received or when the deactivation timer that is associated with the secondary cell has expired, the terminal device 1 stops the deactivation timer associated with the secondary cell configured as deactivation by the MAC CE.

When the MAC CE that instructs deactivation of the secondary cell is received or when the deactivation timer that is associated with the secondary cell has expired, the terminal device 1 flushes all HARQ buffers that are associated with the secondary cell configured as deactivation by the MAC CE.

The terminal device 1 restarts the deactivation timer that is associated with the activated secondary cells when the PDCCH in the activated secondary cells indicates a downlink giant (DL giant) or an uplink grant (UL grant) or when the PDCCH in the serving cells that schedule the activated secondary cells indicates the downlink grant with respect to the activated secondary cells or the uplink giant with respect to the activated secondary cells.

When the secondary cells are deactivated, the terminal device 1 may not perform a specific operation on the deactivated secondary cells. The operations include transmission of SRS using the secondary cells, reporting of CQI/PMI/RI/PTI with respect to the secondary cells, transmission of uplink data (UL-SCH) using the secondary cells, transmission of the RACH using the secondary cells, monitoring of the PDCCH using the secondary cells, and monitoring of the PDCCH with respect to the secondary cells. In other words, the base station device 3 may not perform a specific operation on the deactivated secondary cells.

The terminal device 1 may not perform a specific operation on the deactivated secondary cells when the secondary cells are only configured by downlink (downlink cells). The operations may include reporting of CQI/PMI/RI/PTI with respect to the secondary cells, transmission of UL-SCH data with respect to the secondary cells, transmission of the RACH with respect to the secondary cells, and monitoring of the PDCCH with respect to the secondary cells. In other words, the base station device 3 may not perform a specific operation on the deactivated secondary cells.

When the secondary cells during execution of a random access procedure are configured as deactivation, the terminal device 1 may suspend the random access procedure during execution.

The terminal device 1 performs a process with the LTE secondary cells in the activation state such as CSI reporting based on minimum requirements when an activation command for the LTE secondary cells is received via the MAC CE. For example, time frequency synchronization and the like is performed such that a prescribed process is performed at subframe n+X (X is any of subframes 8-34) when the activation command is received in subframe n.

The terminal device 1 performs a process with the LAA secondary cells in an activated state such as CSI reporting based on minimum requirements when an activation command for the LAA secondary cells is received via the MAC CE. For example, time frequency synchronization and the like is performed such that a prescribed process is performed at subframe n+Y (for example, Y is subframe 8) when the activation command is received in subframe n. That is, the minimum requirements may be different in the LTE secondary cells and the LAA secondary cells.

The terminal device 1 performs a process with the LAA secondary cells in an activation state such as CSI reporting based on minimum requirements when an activation command (DCI associated with activation) for the LAA secondary cells is received via the PDCCH/DCI format. The minimum requirements may be configured as the higher layer parameter. For example, time frequency synchronization and the like is performed such that a prescribed process is performed at subframe n+Z (for example, Z is subframe 0) when the activation command is received in subframe n. That is, minimum requirements may be different depending on the signalling by which the activation command is received.

Note that configuration of the DS is configured by a parameter that is associated with the DS, for example, and may be configured by any of a physical cell identifier (PCID: physical cell ID, physCell ID, or physical layer cell ID) that is associated with the DS, a virtual cell identifier (VCD): virtual cell ID) that is associated with the DS, a CSI-RS resource element configuration (CSI-RS RE configuration) that is associated with the DS, or a CSI-RS subframe configuration (CSI-RS subframe configuration) that is associated with the DS. Here, preferably the CSI-RS subframe configuration that is associated with the DS is equal to a subframe offset between the secondary synchronization signal (SSS) and the CSI-RS in the DS occasion.

Note that the function of the DS may be synchronization of a downlink time domain (time synchronization) based on the DS, synchronization of downlink frequency (frequency synchronization) based on the DS, identification of the cell/transmission point (cell/transmission point identification) based on the DS, measurement of RSRP (RSRP measurement) based on the DS, measurement of RSRQ (RSRQ measurement) based on the DS, measurement of geographical position (UE positioning) of the terminal device 1 based on the DS, measurement of CSI (CSI measurement) based on the DS, or the like.

The DS is constituted by a plurality of signals. For example, the DS is constituted by the PSS, the SSS, and the CRS. Furthermore, preferably the DS is constituted by the PSS, the SSS, the CRS, and the CSI-RS when DS measurement based on the CSI-RS (CSI-RS-based DS measurement) is configured in the terminal device 1.

Preferably the DS is transmitted at the DS occasion in the DS measurement timing configurations (DMTC). Note that preferably the DMTC is notified (configured) by the cycle and the offset. Furthermore, a maximum allowed measurement bandwidth, an MBSFN subframe configuration of neighbor cells, and a TDD UL-DL configuration of neighbor cells may be used in the notification (configuration) of the DMTC.

The cycle and offset that are configured in the DMTC may have different selectable values in the LTE cells and the LAA cells. In the LTE cells, it is not possible to select 20 ms (20 subframes), but in the LAA cells, it may be possible to select 20 ms. The selectable value of the offset may be modified in accordance with the cycle.

Note that in addition to the notification (configuration) of the DMTC, a neighbor transmission points list (neighbor TPs list) may be notified when DS measurement based on the CSI-RS (CSI-RS-based DS measurement) is configured in the terminal device 1. Preferably, the neighboring transmission points list includes information related to the identity of each transmission point and information to assist synchronization of each transmission point.

Note that in addition to the notification (configuration) of the DMTC, a neighbor cells list may be notified when DS measurement based on the CRS (CRS-based DS measurement) is configured in the terminal device 1. Preferably, the neighbor cells list includes information that relates to a physical cell identifier (PCID: physical cell ID, physCell ID, or physical layer cell ID) of neighbor cells.

Next, a description of an unlicensed band is given below.

A licensed band is a band for which a license is granted by a government or a frequency administrator and which is used in the telecommunication business. An unlicensed band is a band used by specific low-power radio stations such as wireless LAN, for which a license is not required. For example, the unlicensed band may include 2.4 GHz and/or 5 GHz (5150 to 5350 MHz, 5470 to 5725 MHz, or 5725 to 5850 MHz) band.

For example, a configuration in which LTE-based communication is enabled in an unlicensed band and cell aggregation is employed in a licensed band cell and an unlicensed band cell achieves efficient communication. Note that performance of cell aggregation using the cells of the licensed band and the cells of the unlicensed band refers to LTE unlicensed (LTE-U), licensed assisted access (LAA), or the access that assists licensed band.

For the cell aggregation in the licensed band cell and the unlicensed band cell, it is preferable that the licensed band cell is configured as the primary cell and the unlicensed band cell is configured as the secondary cell.

The licensed band cells and the unlicensed band cells may be operated without synchronization in cell aggregation between the licensed band cells and the unlicensed band cells. That is, the licensed band cells and the unlicensed band cells may be operated by dual connectivity.

Preferably, the unlicensed band cells are not operated standalone.

It is preferable that the licensed band cell be used for communication of control data and user data, and the unlicensed band cell be used for communication of user data. Note that it is preferable that only radio resources used in downlink communication exist in the unlicensed band cell or, in other words, it is preferable that radio resources used in uplink communication do not exist in the unlicensed band cell. That is, it is preferable that the unlicensed band cell be used only for the downlink transmission of user data.

It is preferable that an FDD scheme or a TDD scheme using the uplink-downlink configurations 0 to 6 be applied to the licensed band cells.

It is preferable that an FDD scheme or a TDD scheme using the uplink-downlink configurations 0 to 6 be applied to the unlicensed band cells.

It is preferable that an FDD scheme in which only radio resources (downlink carriers) used in downlink communication exist, or a TDD scheme using the uplink-downlink configuration 7 be applied to the unlicensed band cell.

Note that the uplink-downlink configuration 7 may be set with respect to the LAA cells. Here, the uplink-downlink configuration 7 may be all downlink subframes or special subframes. The terminal device 1 and the base station device 3 may perform LBT by GP or UpPTS in the case of special subframes.

The LAA cells may not transmit a part or all of the PBCH, the PSS, the SSS, the CRS, the CSI-RS, and the SIB. That is, the LAA cells may transmit only a part of the PBCH, the PSS, the SSS, the CRS, the CSI-RS, and the SIB.

Preferably, in the LAA cell, it is possible for a part or all parameters of the PBCH, the PSS, the SSS, the CRS, the CSI-RS, and the SIB to be configured with different values from those in the LTE cells.

Preferably, the base station device 3 has a collision avoidance method for avoiding collision of communication with another RAT in the operating band that is shared with another RAT. For example, it is preferable that the base station device has a function (carrier sensing (CS), or listen before talk (LBT)) of checking the usage state of the frequency (channel) intended for transmission before initiating communication in the LAA cells, and if the channel is busy, attempting to initiate communication again after a certain period of time passes.

The bands available for communication between the base station device 3 and the terminal device 1 (E-UTRA operating bands) may be managed with a table shared by the base station device 3 and the terminal device 1. For example, the bands available for communication (E-UTRA operating bands) may be indexed for management, and a band corresponding to a prescribed index may be the licensed band, and a band corresponding to a prescribed index may be the unlicensed band. Note that the indexes of the bands available for communication (E-UTRA operating bands) may be transmitted from the terminal device 1 as a terminal capability information (UECapabilityInformation) message in which the indexes of the bands are represented as FreqBandIndicator. In the indexes of the bands available for communication (E-UTRA operating bands), it is preferable that the uplink operating bands, the downlink operating bands, and the multiplexing mode (FDD scheme or TDD scheme) be associated with each other.

When the terminal device 1 supports the features (capability) for communication in the unlicensed band, the mobile station device 1 may notify the base station device 3 of whether or not the features for communication in the unlicensed band are supported. That is, information related to the support of features for communication in the unlicensed band may be transmitted from the terminal device 1 as a terminal capability information (UECapabilityInformation) message. For example, the information related to the support of features for communication in the unlicensed band may be included in the parameters related to the physical layer (PhyLayerParameters).

That is, in cases where the terminal device 1 supports the features for communication in the unlicensed band, the information related to the support of features for communication in the unlicensed band may be retained (configured) for each band and be transmitted from the terminal device 1 as a terminal capability information (UECapabilityInformation) message. For example, the information related to the support of features for communication in the unlicensed band may be included in the parameter related to the radio frequency (RF-Parameters).

Note that the features for communication in the unlicensed band of the terminal device 1 may be a feature related to CS or LBT. Note that the features for communication in the unlicensed band of the terminal device 1 may be a feature related to the uplink-downlink configuration 7.

Note that in the present embodiment, the terminal device 1 is able to receive the DS with respect to the cell that is configured by the DS even if the cell is in the deactivation state. Furthermore, it is not anticipated that the terminal device 1 is able to receive the downlink signal other than the DS with respect to the cell that is configured by the DS if the cell is in the deactivation state. That is, the terminal device 1 may not receive the downlink signal other than the DS with respect to the cell that is configured by the DS if the cell is in the deactivation state. The base station device 3 may not transmit the downlink signal other than the DS with respect to the deactivated cell that is configured by the DS.

Note that an the present embodiment, the terminal device 1 may receive the PDCCH with respect to the deactivated LAA cells.

Furthermore, the terminal device 1 may switch activation/deactivation based on the PDCCH or DCI format with respect to the LAA cells.

Furthermore, the terminal device 1 may report the measurement result (RSRP, RSRQ, or CSI) based on the PDCCH or the DCI format with respect to the deactivated LAA cells.

Furthermore, the terminal device 1 may activate the deactivation timer based on the PDCCH or the DCI format with respect to the LAA cells.

Note that in the present embodiment, the terminal device 1 may notify to the base station device 3 that a function in which the RLM is performed with respect to the secondary cells is supported.

Note that in the present embodiment, the terminal device 1/base station device 3 that is able to communicate via the LAA cells may support the function related to the LBT.

The terminal device 1 that supports the function related to the LBT may perform. RLM with respect to the cells configured by the LBT.

The terminal device 1 that supports the function related to the LBT may detect a problem in the physical layer with respect to the LAA cells to which RLM is performed.

The function related to the LBT may include the function related to carrier sensing (CS) with respect to the Wi-Fi signal and the function related to energy detection (ED) other than the Wi-Fi signal. Furthermore, the function related to the LBT may be configured in every cell or every operating band.

The function related to the LBT may include the function related to dynamic frequency selection (DFS) or dynamic carrier selection (DCS). When a radar waveform/radar signal is detected in the cell configured by the LBT or the carrier frequency (operating band), the terminal device 1 and/or the base station device 3 avoid the communication at the cell/carrier frequency based on the function of the DFS or the DCS. For example, the function of the DFS/DCS may be reconfiguration (addition/modification, or removal) of the cell list. Furthermore, the function of the DFS/DCS may be reconfiguration of the activation/deactivation with respect to the secondary cells. Furthermore, the function of the DFS/DCS may be cross carrier scheduling. Here, the radar waveform/radar signal is referred to as radar.

In a certain cell/certain carrier frequency, it is not anticipated that the terminal device 1 that detects the radar transmits all downlink signals with respect to the cells (carrier frequencies). Furthermore, it is not anticipated that the terminal device 1 receives the downlink grant or the uplink grant with respect to the cells. Furthermore, the base station device 3 that detects the radar in a certain cell may not transmit all downlink signals with respect to the cells. Furthermore, it is not anticipated that the base station device 3 transmits the CSI report or the measurement report with respect to the cells.

The base station device 3 that is able to communicate with the LAA cells may configure a burst time (duration) upon considering transmission of a preamble when the PSS/SSS/CRS/CSI-RS is transmitted as the DS. For example, the subframe offset of the SSS and the CSI-RS may be set to 4 ms (four subframes) or less in the operating band that is only supported up to 4 ms in one transmission considering the preamble and the burst time of the DS. That is, the burst time of the DS may be modified in accordance with the operating band. Here, the preamble is a signal that does not include data transmitted to fill the temporal gap between signals.

Preferably, it is possible to transmit the preamble to every OFDM symbol. That is, preferably the preamble is configured by one OFDM symbol.

Preferably, for a sequence that is used in the preamble, a scrambling sequence generator or a pseudo random sequence generator is initialized in every one OFDM symbol. For example, preferably the sequence of the preamble is generated in a similar sequence to the CRS (antenna port 0 and/or antenna port 1). Furthermore, preferably the preamble sequence is generated using a method similar to the MBSFN RS. Furthermore, preferably the preamble sequence is generated using a method similar to the PRS. Furthermore, preferably the preamble sequence is generated using a method similar to the PRACH preamble format 4. Note that the same applies for resource mapping. That is, preferably the resource mapping of the preamble may have a similar structure to the CRS (antenna port 0 and/or antenna port 1), the MBSFN RS, PRS, UL DMRS, SRS, PRACH preamble format 4, and the like. That is, preferably the resource of the preamble is constituted to be allocated using one symbol. However, the preamble may not be allocated in the same symbol as the DS or PSS/SSS/CRS/CSI-RS. Furthermore, the preamble may not be allocated when the PDCCH or the PDSCH are allocated. Note that the preamble transmission may be referred to as empty transmission or dummy signal transmission. When the sequence generation method of the CRS, the PRS, or the MBSFN RS is applied to the sequence of the preamble, various sequence generation methods may be modified to correspond to one OFDM symbol. Some parameters may be added/modified with respect to the sequence generation method.

The transmission bandwidth of the preamble may be configured as the higher layer parameter. Furthermore, the transmission bandwidth of the preamble may be configured based on the system, bandwidth.

The initial value that is used in the sequence of the preamble may be determined based on the parameter according to the cell ID (PCI, VCID, scrambling ID, TPID, and the like) or the CP, the system frame number, the subframe number, the slot number, the OFDM symbol number, the antenna port index, and the like.

The resource mapping of the preamble may be determined based on the cell ID or the higher layer parameter (for example, resource configuration), the antenna port index, the transmission bandwidth (resource block number), and the like.

The terminal device 1 may not receive the preamble when the configuration information related to the preamble is not received from the base station device 3 through higher layer signalling. That is, the base station device 3 may not transmit the configuration information related to the preamble through higher layer signalling, but it is possible to transmit the preamble.

The terminal device 1 may perform the AGC using the preamble when the configuration information related to the preamble is configured from the base station device 3 through higher layer signalling. Furthermore, the result of the AGC, that is, the measurement result may be reported through higher layer signalling.

Furthermore, the preamble may be transmitted as a tether until the subsequent subframe when the clear channel is determined after the LBT.

The PSS/SSS/CRS/CSI-RS is transmitted so as to fill between each signal with the preamble when transmitted within the DS period (for example, in four subframes).

The base station device 3 that is able to communicate using the LAA cells may transmit the PRS as the DS. The configuration of the PRS may be configured by the transmission bandwidth or the measurement bandwidth, the burst time, the cell ID, and the like.

Note that in the present embodiment, the terminal device 1 may notify to the base station device 3 that the function related to radar detection is supported.

The base station device 3 transmits the synchronization signal, the reference signal, and the broadcast information such as the PSS/SSS, the CRS, the PBCH, and the SIB such that the terminal device 1 in the idle state is connected to the base station device 3, even when transmission and reception of data is not performed between the base station device 3 and the terminal device 1. Therefore, the signals cause inter-cell interference. Furthermore, power of the base station device 3 is wasted due to the signals being always transmitted.

Therefore, the base station device 3 transitions to the activation state (operation state or activated state) and the deactivation state (stopping state). The base station device 3 is able to transition to the deactivation state when the base station device 3 does not transmit and receive data with the terminal device 1. The base station device 3 is able to transition to the activation state when the base station device 3 transmits and receives data with the terminal device i.

For example, the stopping state of the base station device 3 is a state in which at least one of the PSS/SSS, the CRS, the PBCH, the PDCCH, and the PDSCH is not transmitted. For example, the stopped state is a state in which the PSS/SSS is not transmitted for one half frame or more (five subframes or more). For example, the stopping state of the base station device 3 is a state in which only the DS is transmitted. Note that the base station device 3 may perform the reception process using a reception unit of the base station device even in the stopping state.

The activated state of the cell/base station device 3 is a state in which there is transmission of at least one out of the PSS/SSS, and the CRS. For example, the activated state is a state in which the PSS/SSS is transmitted in one half frame.

Furthermore, with the activation state and the deactivation state of the base station device 3, the terminal device 1 may be associated with the process (assumption or operation) with respect to the prescribed channel or the prescribed signal. Here, the process is monitoring, the reception process, the transmission process, and the like. That is, the terminal device 1 may not recognize that the base station device 3 is in the activation state or the deactivation state, and the terminal device 1 may switch the process with respect to the prescribed channel or the prescribed signal. In the explanation in the present embodiment, transition between the activated state and the stopping state in the base station device 3 includes switching the process with respect to the prescribed channel or the prescribed signal in the terminal device 1. The activated state in the base station device 3 corresponds to a first process with respect to the prescribed channel or the prescribed signal in the terminal device 1. The stopping state in the base station device 3 corresponds to a second process with respect to the prescribed channel or the prescribed signal in the terminal device 1.

For example, the activation state of the base station device 3 is a state in which it is possible for the terminal device 1 to perform a similar process to a conventional terminal device. A specific example in the activation state of the base station device 3 is as follows. It is anticipated that the terminal device 1 receives the PSS, the SSS and the PBCH. The terminal device 1 monitors the PDCCH and/or the EPDCCH in a prescribed subframe. The terminal device 1 carries out the CSI report based on the configured CSI report mode. The terminal device 1 anticipates that there is a reference signal (for example, the CRS or the CSI-RS) for CSI reporting and the CSI reference resource.

For example, the deactivation state of the base station device 3 is a state in which the terminal device 1 performs a different process from a conventional terminal device. A specific example in the deactivation state of the base station device 3 is as follows. It is not anticipated that the terminal device 1 receives the PSS, the SSS and the PBCH. The terminal device 1 does not monitor the PDCCH and/or the EPDCCH in any subframe. The terminal device 1 does not carry out the CSI report regardless of the configured CSI report mode. The terminal device 1 does not anticipate that there is a reference signal (for example, the CRS or the CSI-RS) for CSI reporting and the CSI reference resource.

For example, the transition between the activated state and the stopping state in the base station device 3 is determined based on the connection state of the terminal device 1, the data request state of the terminal device 1 that is connected to the base station device 3, information on the CSI measurement and/or the RRM measurement from the terminal device 1, and the like.

The base station device 3 is able to explicitly or implicitly configure or notify information (cell state information) related to transition between the activated state and the stopping state in the base station device 3 with respect to the terminal device 1. For example, the base station device 3 explicitly notifies the cell state information to the terminal device 1 using the RRC, the MAC, the PDCCH and/or the EPDCCH. The base station device 3 implicitly notifies the cell state information to the terminal device 1 according to presence or absence of the prescribed channel or the signal.

An example of the procedure (notification of the cell state information) in which the base station device 3 in the activated state transitions to the stopping state will be described.

The base station device 3 (serving cell) that is connected to the terminal device 1 determines whether or not the activated state is transitioned to the stopping state based on the connection state of the terminal device 1, the situation of the data of the terminal device 1, and information on measurement of the terminal device 1. The base station device 3 that determines transition to the stopping state transmits information of transition to the stopping state to the base station device 3 of a neighbor cell and performs the stopping preparation of the cell. Note that determination of whether or not the activated state is transitioned to the stopping state and transmission of information of transition to the stopping state may not be performed in the serving cell, and for example, determination and transmission may be performed in a mobility management entity (MME) and a serving gateway (S-GW). In stopping preparation of the cells, when the terminal device 1 is connected to the base station device 3, transmission of an instruction that is handed over to the neighbor cells with respect to the terminal device 1, transmission of the instruction to deactivate, or the like are performed. The serving cells in which there is no terminal device 1 that is connected by the stopping preparation of the cells transition from the activated state to the stopping state.

When the terminal device 1 performs communication with the base station device 3 in the stopping state, the base station device 3 transitions from the stopping state to the activated state. Note that the time in which the state transitions from stopped to activated state and the time in which the state transitions from activated to stopping state are referred to as transition time. It is possible to reduce power consumption or various kinds of interference of the base station device 3 by shortening the transition time.

For example, it is determined whether or not the base station device 3 in the stopping state is transitioned to the activated state based on the uplink reference signal from the terminal device 1, the detection information of the cells from the terminal device 1, information on measurement of the physical layer from the terminal device 1, and the like.

An example of the procedure in which the base station device 3 in the stopping state transitions to the activated state based on the information on the measurement of the physical layer will be described.

The base station device 3 (serving cells) that are connected to the terminal device 1 and the base station device 3 (neighbor cells) in the stopping state share the DS configuration through backhaul. Furthermore, the serving cells notify the DS configuration to the terminal device 1. The neighbor cell transmits the DS. The terminal device 1 detects the DS transmitted from the neighbor cells based on the DS configuration that is notified from the serving cells. Furthermore, the terminal device 1 performs measurement of the physical layer using the DS that is transmitted from the neighbor cell. The terminal device 1 performs reporting of the measurement to the serving cell. In the serving cells, determination of whether or not the base station device 3 in the stopping state is transitioned to the activated state based on the measurement report from the terminal device 1 is performed. When the serving cell determines transitioning to the activated state, information that instructs activation is notified to the base station device 3 in the stopping state through backhaul. Note that determination of whether or not the stopping state is transitioned to the activated state and transmission of information that instructs activation may not be performed in the serving cell, and for example, determination and transmission may be performed in a mobility management entity (MME) and a serving gateway (S-GW). The neighbor cell that receives the information that instructs activation transitions from the stopping state to the activated state.

An example of the procedure in which the base station device 3 in the stepping state transitions to the activated state based on the information on the measurement of the physical layer will be described.

The base station device 3 (serving cells) that are connected to the terminal device and the base station device 3 (neighbor cells) in the stopping state share the SRS configuration of the terminal device 1 through backhaul. Furthermore, the serving cells notify the SRS configuration to the terminal device 1. The terminal device 1 transmits the SRS based on the instruction of the SRS configuration or an SRS request. The neighbor cell detects the SRS that is transmitted from the terminal device 1. Furthermore, the neighbor cell performs measurement of the physical layer using the SRS that is transmitted from the terminal device 1. The neighbor cell performs determination of whether or not the base station device 3 is transitioned to the activated state based on the measurement result according to the SRS and transitions from the stopping state to the activated state. Note that determination of whether or not the stopping state is transitioned to the activated state may not be performed in the neighbor cells, and for example, determination and transmission may be performed in the serving cells, the mobility management entity (MME) and the serving gateway (S-GW). In this case, after performing measurement of the physical layer using the SRS, the neighbor cell transmits the measurement result to the serving cells, the MME, and the S-GW, and receives the information that instructs activation.

The serving cells may notify information that indicates the activation/deactivation state of the neighbor cells with respect to the terminal device 1. The terminal device 1 switches behavior of the terminal device 1 by recognizing the activated state or the stopping state of the cells. For example, the behavior of the terminal device 1 is an interference measurement method.

An example of a notification method of the cell state information (information that indicates the activation/deactivation state of the cell) will be described.

Information that indicates the activation/deactivation state of an object cell is notified by L1 signalling (Layer 1 signalling). In other words, information that indicates the activation/deactivation state of the object cell is notified by the PDCCH or the EPDCCH. One bit that corresponds to the object cell is allocated, 0 (false, disable) indicates stopping, and 1 (true, enable) indicates activation. The bits that correspond to the object cell may be configured as aggregated bitmaps and simultaneously notify the activation/deactivation state with respect to a plurality of cells. Association of the bits and the object cells are notified by dedicated RRC signalling.

Information that indicates the activation/deactivation state is notified in a downlink control information (DCI) format 1C. Note that the information that indicates the activation/deactivation state may be notified in a DCI format 3/3A.

Note that the information that indicates the activation/deactivation state may be notified at a payload size (bit number) format that is the same as the DCI format 1C.

Next, the DCI format will be described.

The DCI format includes a DCI format that is associated with the uplink scheduling and a DCI format that is associated with the downlink scheduling. The DCI format that is associated with the uplink scheduling is referred to as the uplink grant and the DCI format that is associated with the downlink scheduling is referred to as the downlink grant (downlink assignment). Furthermore, one DCI format may be transmitted to the plurality of terminal devices 1. For example, when only the transmit power control command (TPC command) is transmitted, the TPC command may be collectively transmitted to the plurality of terminal devices 1. Such scheduling (or triggering) is referred to as group scheduling (group triggering). The terminal devices 1 are individually allocated an index and the bits are detected based on the index.

The DCI format 0 is used with respect to the scheduling of the PUSCH in one uplink cell.

The DCI format 1 is used with respect to the scheduling of one PDSCH codeword in one cell.

A DCI format 1A is used with respect to a random access process that is started by compact scheduling of one PDSCH codeword in one cell and a PDCCH order. Note that the DCI that corresponds to the PDCCH order may be transmitted using the PDCCH or the EPDCCH. It is possible to transmit the DCI format 0 and the DCI format 1A using the same bit information field, and the terminal device 1 discriminates whether the DCI format that is mapped to the received bit information field is the DCI format 0 or the DCI format 1A based on the value that is indicated by a certain bit field.

A DCI format 1B is used with respect to the compact scheduling of one PDSCH codeword in one cell involving the precoding information.

A DCI format 1C is used to notify a change (modification) of a multicast control channel (MCCH) and to perform compact scheduling on one PDSCH codeword. Furthermore, the DCI format 1C may be used to notify a random access response by scrambling using a random access-radio network temporary identifier (RA-RNTI). Here, for example, compact scheduling is scheduling of the PDSCH in a narrow bandwidth. The DCI format size is determined depending on the bandwidth that is used in the PDSCH that performs scheduling. When the bandwidth is narrow, it is possible to reduce the necessary DCI format size. Furthermore, the DCI format 1C may set information that indicates a TDD UL-DL configuration by scrambling using RNTI (for example, eIMTA-RNTI) related to dynamic TDD (first type (mode) TDD). When the dynamic TDD is set to the first type (mode) TDD, the conventional TDD is referred to as a second type (mode) TDD.

The dynamic TDD is a TDD that switches the TDD UL-DL configuration using L1 signalling according to the uplink/downlink communication situation. Furthermore, the dynamic TDD is used to expand adaptive control of interference management and traffic. The dynamic TDD may be referred to as enhanced interference management and traffic adaptation (eIMTA) or TDD-modeA.

A DCI format 1D is used with respect to the compact scheduling of one PDSCH codeword in one cell involving information related to preceding and power offset.

A DCI format 2/2A/2B/2C/2D is used with respect to the scheduling of not only one PDSCH codeword, but two (or a plurality of) PDSCH codewords.

A DCI format 3/3A indicates a value of a transmit power control command for adjusting the transmit power of the PUSCH or the PUCCH with respect to the plurality of terminal devices 1. The terminal devices 1 are able to detect the value of the transmit power control command that corresponds to the PUSCH or the PUCCH by detecting the bit information that corresponds to the index (TPC-index) that is assigned to the local station. Furthermore, the DCI format 3/3A discriminates whether the transmit power control command related to the PUSCH is indicated or the transmit power control command related to the PUCCH is indicated according to the scrambled RNTI type.

A DCI format 4 is used with respect to the scheduling of the PUSCH in one uplink cell involving a multi-antenna port transmission mode.

A cyclic redundancy check (CRC) is used for error detection of the DCI transmission. The CRC is scrambled by each RNTI.

A CRC parity bit is scrambled by a cell-radio network temporary identifier (C-RNTI), a semi persistent scheduling cell-radio network temporary identifier (SPS C-RNTI), a system information-radio network temporary identifier (SI-RNTI), a paging-radio network temporary identifier (P-RNTI), a random access-radio network temporary identifier (RA-RNTI), a transmit power control-physical uplink control channel-radio network temporary identifier (TPC-PUCCH-RNTI), a transmit power control-physical uplink shared channel-radio network temporary identifier (TPC-PUSCH-RNTI), a temporary C-RNTI, an M-RNTI (multimedia broadcast multicast services (MBMS)-radio network temporary identifier), or an eIMTA-RNTI The C-RNTI and the SPS C-RNTI are identifiers for identifying the terminal device 1 within a cell. The C-RNTI is used to control the PDSCH or the PUSCH in a single subframe.

The SPS C-RNTI is used to periodically allocate a resource for the PDSCH or the PUSCH. The control channel that has a scrambled CRC using the SI-RNTI is used to control the system information block (SIB).

The control channel that has the scrambled CRC using the P-RNTI is used to control paging.

The control channel that has the scrambled CRC using the RA-RNTI is used to control response to the RACH.

The control channel that has the scrambled CRC using the TPC-PUCCH-RNTI is used to control power of the PUCCH. The control channel that has the scrambled CRC using the TPC-PUSCH-RNTI is used to control power of the PUSCH.

The control channel that has the scrambled CRC using the temporary C-RNTI is used for the terminal device that is not identified by the C-RNTI The control channel that has the scrambled CRC using the M-RNTI is used to control the MBMS.

The control channel that has the scrambled CRC using the eIMTA-RNTI is used to notify the TDD UL/DL configuration information of each TDD serving cell to the terminal device 1 in a dynamic TDD.

Note that the DCI format is not limited to the above described RNTI and may be scrambled using a new RNTI.

The downlink transmit power control improves downlink communication efficiency with respect to the LAA cells. The parameter according to the downlink transmit power may be transmitted via the DCI format with respect to the LAA cells. For example, the reference signal power or $P_A$, $P_B$, p_C may be transmitted. Furthermore, the power offset or the TPC command with respect to the downlink transmit power may be transmitted. Here, the reference signal power is transmit power of the CRS or the base station device 3. $P_A$ is a parameter specific to the terminal device, and is used as one of the power offset $P_B$ is a value of an index that is used in the table that is associated with a cell specific ratio ($\rho_B/\rho_A$) and an antenna port number. The p_C is an energy per resource element (EPRE) ratio between the PDSCH and the CSI-RS. The ratio of the PDSCH EPRE with respect to the CRS EPRE between the PDSCH REs with respect to each OFDM symbol is known by knowing the cell specific ratio. That is, it is possible to know the transmit power of the PDSCH and demodulate.

The DCI format may be scrambled by a specific RNTI such as the LAA-RNTI or a downlink transmit power control (DL-TPC) RNTI when transmitting the parameter related to downlink transmit power control via the DCI format. The DCI format may be temporarily overwritten when the reference signal power or $P_A$, $P_B$, p_C is configured in the higher layer parameter. For example, the transmit power of the downlink signal may be determined based on the parameter that is instructed using the DCI format during an active time. The downlink transmit power may be determined based on the parameter that is configured by higher layer signalling when the active time ends and it is i the active time again. However, the transmit power of the downlink signal may be determined based on the parameter when the parameter is transmitted via the DCI format in the format during the active time again.

The base station device 3 may transmit the parameter that indicates whether or not the downlink transmit power control is effective via higher layer signalling. The terminal device 1 detects the value of the parameter from the field that corresponds to the downlink transmit power control that is set in the specific DCI format when the downlink transmit power control is indicated to be effective.

Next, the PDCCH or the EPDCCH will be described in detail.

The control region of each serving cell is constituted by the CCE set. The CCE is numbered from 0 to $N_{CCE, k}-1$. Here, the $N_{CCE, k}$ is a total number of the CEE in the control region of subframe k.

The terminal device 1 monitors one or a plurality of activated serving cell PDCCH candidate sets that are configured by higher layer signalling with respect to the control information. Here, monitoring means an attempt to decode each PDCCH in the set that corresponds to all of the monitored DCI formats.

The PDCCH candidate set that is to be monitored is referred to as a search space. The search space is defined by a common search space (CSS) and a terminal-specific search space (USS).

The common search space (CSS) is a search space that is configured using a parameter specific to the base station device 3 (cells or transmission points) and/or a parameter that is specified in advance. For example, the CSS is a search space that it is possible to commonly use in a plurality of terminal devices. Therefore, the base station device 3 is able to reduce resources for transmitting the control channel by mapping the common control channel to the CSS in the plurality of terminal devices.

A UE-specific search space (USS) is a search space that is configured using a parameter that is specific to at least the terminal device 1. Therefore, the base station device 3 is able to effectively control the terminal device 1 since it is possible for the USS to individually transmit the control channel specific to the terminal device 1.

Note that the CSS may be configured using the parameter that is specific to the terminal device 1. In this case, preferably the parameter that is specific to the terminal device 1 is configured to be the same value between the plurality of terminal devices. The CSS is common between the plurality of terminal devices that are configured by the same parameter when the CSS is configured using the parameter that is specific to the terminal device 1. For example, a unit that is configured in the same parameter between the plurality of terminal devices is a cell, a transmission point, a UE group, or the like. It is possible to reduce the resources for transmitting the control channel since the plurality of terminal devices that are configured by the same parameter are able to receive the common control channel that is mapped to the CSS. Note that such a search space may be referred to as the USS and not the CSS. That is, the USS that is the search space common to the plurality of terminal devices may be configured. The USS specific to one terminal device is also referred to as a first USS, and the USS that is common to the plurality of terminal devices is also referred to as a second USS.

The search space $S^{(L)}_k$ in each aggregation level is defined by the PDCCH candidate set. The number of CCE that are used for one PDCCH is also referred to as the aggregation level. The number of CCIE that are used in one PDCCH is 1, 2, 4, or 8. The CCE that corresponds to the PDCCH candidate of the search space $S^{(L)}k$ in each serving cell in which the PDCCH is monitored is given by expression (1) in FIG. 14. Here, $Y_k$ indicates the value in the subframe k. In the CSS, m'=m. In the USS of the PDCCH, when the CIF is configured in the terminal device 1 that is to be monitored in the serving cell in which the PDCCH is monitored, m'=m+$M^{(L)}$-$n_{CI}$, otherwise m'=m. Here, m is a value from 0 to $M^{(L)}$-1, and $M^{(L)}$ is a number of the PDCCH candidate that is to be monitored in a prescribed search space.

In the CSS, $Y_k$ is a value that is specified in advance or is a value that is determined based on the parameter that is specific to the base station device 3, and for example, is configured by 0 with respect to the aggregation level L=4 and L=8. $Y_k$ is a value that is specific to the terminal device 1 in the terminal-specific search space $S^{(L)}k$ at the aggregation level L, and for example, is given as $Y_k=(A \cdot Y_{k-1})$ mod D. Here, a value of the RNTI (for example, C-RNTI) is used as an initial value $Y_{-1}$ of $Y_k$.

The aggregation level is defined in every search space. For example, in the CSS, the aggregation levels 4 and 8 are defined. For example, in the USS, the aggregation levels 1, 2, 4 and 8 are defined.

The number of PDCCH candidates is defined for each aggregation level of each search space. For example, in the CSS, the number of the PDCCH candidates at the aggregation level 4 is 4, and the number of the PDCCH candidates at the aggregation level 8 is 2. For example, in the USS, the number of the PDCCH candidates at the aggregation level 1 is 6, the number of the PDCCH candidates at the aggregation level 2 is 6, the number of the PDCCH candidates at the aggregation level 4 is 2, and the number of the PDCCH candidates at the aggregation level 8 is 2.

The EPDCCH is transmitted by aggregating one or more enhanced control channel elements (ECCE). Bach ECCE is constituted by a plurality of enhanced resource element groups (EREG). The EREG are used to define mapping with respect to the resource element of the EPDCCH. In each RB pair, 16 EREG for which numbers 0 to 15 are given are defined. That is, in each RB pair, EREG 0 to EREG 15 are defined. In each RB pair, EREG 0 to EREG 15 are cyclically defined to prioritize the frequency direction with respect to a resource element other than a resource element in which a prescribed signal and/or channel is mapped. For example, the resource element in which a demodulation reference signal is mapped that is associated with the EPDCCH that is transmitted using the antenna ports 107 to 110 does not define the EREG The number of ECCE that are used in one EPDCCH is determined based on another parameter dependent on the EPDCCH format. The number of ECCE that are used for one EPDCCH is also referred to as the aggregation level. For example, the number of ECCE that are used in one EPDCCH is determined based on the number of resource elements that are possible to use in EPDCCH transmission in one RB pair, a transmission method of the EPDCCH, and the like. For example, the number of ECCE that are used in one EPDCCH is 1, 2, 4, 8, 16, or 32. In addition, the number of EREG that are used in one ECCE is determined based on the type of subframe and the type of cyclic prefix, and is 4 or 8. Distributed transmission and localized transmission are supported as the transmission method of the EPDCCH.

The EPDCCH is able to use distributed transmission or localized transmission. Distributed transmission and localized transmission have different EREG and ECCE mapping with respect to the RB pain. For example, in distributed transmission, one ECCE is constituted using EREG of a plurality of RB pairs. In localized transmission, one ECCE is constituted using EREG of one RB pair.

The base station device 3 performs configuration related to EPDCCH with respect to the terminal device 1. The terminal device 1 monitors a plurality of EPDCCH based on the configuration from the base station device 3. It is possible to configure the RB pair set in which the terminal device 1 monitors the EPDCCH. The KB pair set also refers to the EPDCCH set or an EPDCCH-PRB set. It is possible to configure one or more EPDCCH sets for one terminal device 1. Each EPDCCH set is constituted by one or more KB pairs. Furthermore, it is possible to individually perform the configuration related to the EPDCCH in every EPDCCH set.

The base station device 3 can configure a prescribed number of EPDCCH sets with respect to the terminal device 1. For example, it is possible to configure up to two EPDCCH sets as the EPDCCH set 0 and/or the EPDCCH set 1. Each of the EPDCCH sets is able to be constituted by a prescribed number of RB pairs. Each EPDCCH set is constituted by one set of the plurality of ECCE. The number of ECCE s that constitute one EPDCCH set is determined based on the number of RB pairs that configure the EPDCCH set and the number of EREG that are used in one ECCE. Each EPDCCH set is constituted by the ECCE that are numbered 0 to N−1 when the number of ECCE that constitute one EPDCCH set is N. For example, the EPDCCH sets that are constituted by four RB pairs are constituted by 16 ECCEs when the number of EREG that are used in one ECCE is 4.

The candidate of the EPDCCH that is monitored by the terminal device 1 is defined based on the ECCEs constituting the EPDCCH set. The EPDCCH candidate set is defined as the search space (search region). The terminal-specific search space that is a search space that is specific to the terminal device 1 and a common search space that is the search space specific to the base station device 3 (cells, transmission points, or UE group) are defined. The EPDCCH monitoring includes the terminal device 1 attempting decoding on each of the EPDCCH candidates in the search space according to the monitored DCI format.

A terminal-specific search space $ES^{(L)}_k$ of the EPDCCH in the aggregation level $L \in \{1, 2, 4, 8, 16, 32\}$ is defined by the EPDCCH candidate set.

The ECCE that corresponds to the EPDCCH candidate m of the search space $ES^{(L)}_k$ in the EPDCCH set is given in expression (2) in FIG. 14.

Here, $Y_{p,k}$ indicates the value in the EPDCCH set p and the subframe k. It is possible to independently configure $Y_{p,k}$ for the search space. $Y_{p,k}$ is a value specific to the base station device 3 (cell) in the common search space. For example, in the common search space, $Y_{p,k}$ is a value that is specified in advance or is a value that is determined based on the parameter that is specific to the base station device 3. In the terminal-specific search space, $Y_{p,k-1}$) is a value that is specific to the terminal device 1 and is given as $Y_{p,k}=(A \cdot Y_{p,k-1})$ mod D. For example, $Y_{p,k}$ is determined based on the prescribed value, the subframe k and the RNTI (for example, the C-RNTI) of the terminal device 1. Note that a plurality of common search spaces and/or a plurality of terminal-specific search spaces may be configured in one EPDCCH set.

Here, $b=n_{CI}$ when the CIF with respect to the serving cell in which the EPDCCH is monitored is configured in the terminal device 1, and otherwise b=0.

The DCI format that is monitored by the terminal device 1 depends on the transmission mode that is configured in every serving cell. In other words, the DCI format that is monitored by the terminal device 1 is different according to the transmission mode. For example, the terminal device 1 that is configured by downlink transmission mode 1 monitors the DCI format 1A and the DCI format 1. For example, the terminal device 1 that is configured by the downlink transmission mode 4 monitors the DCI format 1A and the DCI format 2. For example, the terminal device 1 that is configured by the downlink transmission mode 10 monitors the DCI format 1A and the DCI format 2D. For example, the terminal device 1 that is configured by the uplink transmission mode 1 monitors the DCI format 0. For example, the terminal device 1 that is configured by the uplink transmission mode 2 monitors the DCI format 0 and the DCI format 4.

The control region in which PDCCH is allocated to the terminal device 1 is not notified, and the terminal device 1 attempts decoding of all PDCCH candidates with respect to all aggregation levels that are defined by each search space and all DCI formats that correspond to the transmission mode. In other words, the terminal device 1 attempts decoding in all of the aggregation level, the PDCCH candidate, and the DCI format that may be transmitted to the terminal device 1. Then, the terminal device 1 recognizes the successfully decoded PDCCH as control information for the terminal device 1. This is referred to as blind decoding.

Note that when a bit size is the same, the number of times of decoding does not increase, even if the DCI format is different. For example, it is possible to decode two types of DCI formats in one time of decoding since the DCI format 0 and the DCI format 1A are the same bit size.

For example, in the CSS, the terminal device 1 that is configured by the uplink transmission mode 1 attempts decoding of the DCI format of six PDCCH candidates and two types of bit sizes in aggregation 4 or attempts decoding of the DCI format of two PDCCH candidates and two types of bit sizes in the aggregation 8. In the USS, the terminal device 1 attempts decoding of the DCI format of six PDCCH candidates and two types of bit sizes in aggregation 1, attempts decoding of the DCI format of six PDCCH candidates and two types of bit sizes in aggregation 2, attempts decoding of the DCI format of two PDCCH candidates and two types of bit sizes in aggregation 4, or attempts decoding of the DCI format of two PDCCH candidates and two types of bit sizes in aggregation 8. That is, the terminal device 1 attempts decoding of the PDCCH 44 times in one subframe.

For example, in the CSS, the terminal device 1 that is configured by the uplink transmission mode 2 attempts decoding of the DCI format of six PDCCH candidates and two types of bit sizes in aggregation 4 or attempts decoding of the DCI format of two PDCCH candidates and two types of bit sizes in the aggregation 8. In the USS, the terminal device 1 attempts decoding of the DCI format of six PDCCH candidates and three types of bit sizes in aggregation 1, attempts decoding of the DCI format of six PDCCH candidates and three types of bit sizes in aggregation 2, attempts decoding of the DCI format of two PDCCH candidates and three types of bit sizes in aggregation 4, or attempts decoding of the DCI format of two PDCCH candidates and three types of bit sizes in aggregation 8. That is, the terminal device 1 attempts decoding of the PDCCH 60 times in one subframe.

By blind decoding, the terminal device 1 is able to decode the PDCCH with different coding rates without prior information and it is possible to efficiently transmit the control information between the base station device 3 and the terminal device 1.

Information that indicates the activation/deactivation state is notified by the common search space. The common search space is a search space that is common to cells. Furthermore, information that indicates the activation/deactivation state is notified by the terminal group common search space. Here, the terminal group common search space is a search space in which a start point of the CCE to which the PDCCH candidate is allocated is determined using the RNTI (CE-group C-RNTI, TP-specific-RNTI, or SCE-RNTI) that is allocated in common to the terminal group. The plurality of terminal devices 1 that are configured by the terminal group RNTI detects the DCI format using the PDCCH that is allocated to the same search space.

Notification of the information that indicates the activation/deactivation state is performed at the timing that is specified in advance or the timing that is configured. For example, the timing of the notification is one radio frame unit.

Notification of the information that indicates the activation/deactivation state indicates information of a subsequent radio frame that receives the L1 signalling. Note that information on the received radio frame may be indicated when the L1 signalling is received at an initial subframe (subframe 0) in the radio frame.

An example of a notification method of the information that indicates the activation/deactivation state of the cell will be described.

The activation/deactivation state of the object cell may be implicitly indicated by changing (modifying) the DS structure. Information that indicates the activation/deactivation state of the object cell may be implicitly indicated by the DS structure being a different configuration between the activated state and the stopping state. The DS structure transmitted from the object cell may be different between the activated state and in the stopping state. The terminal device 1 may receive information related to the DS structure that is transmitted in the activated state and information related to the DS structure that is transmitted in the stopping state respectively from the base station device 3.

The activation/deactivation state of the object cell may be indicated by changing (modifying) the parameter of a certain structure of the DS (or value of the parameter). In other words, a certain parameter that is included in the DS configuration may be different between the activated state and the stopping state (or may be individually configured). For example, the DS that is transmitted in the activated state and the DS that is transmitted in the stopping state may have different resource element allocations. Furthermore, the DS that is transmitted in the activated state and the DS that is transmitted in the stopping state may have different antenna ports. Furthermore, the DS that is transmitted in the activated state and the DS that is transmitted in the stopping state may have different scramble sequences. Furthermore, the DS that is transmitted in the activated state and the DS that is transmitted in the stopping state may have different initial values of the scrambled sequence or different methods (expressions) for generating the initial values. Furthermore, the DS that is transmitted in the activated state and the DS that is transmitted in the stopping state may have different transmit power. Furthermore, the DS that is transmitted in the activated state and the DS that is transmitted in the stopping state may have different transmitted subframe gaps. Furthermore, the DS that is transmitted in the activated state and the DS that is transmitted in the stopping state may have different transmission bandwidths or resource block numbers. That is, information related to the DS configuration that is transmitted in the activated state and information related to the DS configuration that is transmitted in the stopping state may be individually set. The information may be transmitted from the base station device 3 to the terminal device 1 using higher layer signalling. That is, the information that indicates the activation/deactivation state of the object cell may be configuration information of the parameter related to the DS structure. In other words, a certain parameter is configured with respect to each of the activated state and the stopping state.

Furthermore, the terminal device 1 may monitor two ways, that is, the DS structure that indicates the activated state and the DS structure that indicates the stopping state. The terminal device 1 may monitor two ways using the monitoring pattern of the DS structure that indicates the activated state and the monitoring pattern of the DS structure that indicates the stopping state. In this case, information related to the monitoring pattern of two DS structures is notified to the terminal device 1. That is, two DS structures may be monitored based on one monitoring pattern when information related to the monitoring pattern of one DS structure is notified.

The terminal device 1 recognizes that the small cells in the stopping state are in the activated state when the DS in the activated state is measured in the measurement subframe of the DS in the stopping state.

Furthermore, the terminal device 1 may implicitly acquire information on the activation/deactivation state of the object cell using the monitoring pattern that detects the DS. The monitoring pattern of the DS structure that indicates the activated state and the monitoring pattern of the DS structure that indicates the stopping state may be defined in advance. The monitoring pattern of the DS structure that indicates the activated state and the monitoring pattern of the DS structure that indicates the stopping state may be notified from the base station device 3 by dedicated RRC signalling (higher layer signalling).

Another example of a notification method of the information that indicates the activation/deactivation state of the cell will be described.

The activation/deactivation state of the object cell may be implicitly indicated by the CRS structure (CRS configuration) being different between the activated state and the stopping state in the object cell. In this case, the CRS structure transmitted from the object cell may be different between the activated state and in the stopping state. At that time, the configuration information of the different structures of the CRS is notified to the terminal device 1.

The state of the activation/deactivation state of the object cell may be indicated by changing a certain parameter according to the CRS structure (or value or the parameter). For example, the CRS that is transmitted in the activated state and the CRS that is transmitted in the stopping state may have different resource element allocations. Furthermore, the CRS that is transmitted in the activated state and the CRS that is transmitted in the stopping state may have different antenna ports. Furthermore, the CRS that is transmitted in the activated state and the CRS that is transmitted in the stopping state may have different scramble sequences. Furthermore, the CRS that is transmitted in the activated state and the CRS that is transmitted in the stopping state may have different initial values of the scramble sequences. Furthermore, the CRS that is transmitted in the activated state and the CRS that is transmitted in the stopping state may have different transmit power. Furthermore, the CRS that is transmitted in the activated state and the CRS that is transmitted in the stopping state may have different transmitted subframe gaps. Furthermore, the CRS that is transmitted in the activated state and the CRS that is transmitted in the stopping state may have different transmission bandwidths or resource block numbers. That is, the information that indicates the activation/deactivation state of the object cell may be configuration information of the parameter related to the CRS structure. At that time, a certain parameter is individually configured with respect to each of the activated state and the stopping state. Here, an example of the CRS is given, but a similar manner may be employed for the PSS, the SSS, the CSI-RS, the FRS, and the like.

The terminal device 1 monitors in two ways, that is, the CRS structure that indicates the activated state and the CRS structure that indicates the stopping state. The terminal device 1 monitors two ways using the monitoring pattern of the CRS structure that indicates the activated state and the monitoring pattern of the CRS structure that indicates the stopping state. The terminal device 1 implicitly acquires information on the activation/deactivation state of the object cell using the monitoring pattern that detects the CRS. The monitoring pattern of the CRS structure that indicates the stopping state may be defined in advance. The monitoring pattern of the CRS structure that indicates the stopping state may be notified from the base station device 3 by dedicated RRC signalling.

Another example of a notification method of the information that indicates the activation/deactivation state of the cell will be described.

Information that indicates the activation/deactivation state of the cell may be notified by dedicated RRC signalling. Information that indicates the activation/deactivation state of the cells may be notified with a list in which a central frequency (carrier frequency) and the cell ID are associated.

The terminal device 1 is able to recognize the activation/deactivation state of the object cell by the above described notification method. Any of the above described notification methods are applied when the terminal device 1 switches behavior according to the activation/deactivation state of the object cell.

Next, detection of the cell (base station device 3) will be described.

Cell detection means that detection of a synchronization signal (PSS, SSS, or the like) and/or the reference signal (CRS, CSI-RS, or the like) transmitted from the base station device 3 that constitutes the cell, in which the detection is occurred in the terminal device 1. The cell ID information is included in the synchronization signal and/or the reference signal that is used in the cell detection. The terminal device 1 detects the cell according to the cell ID of the cell and the detection reference of the synchronization signal and/or the reference signal.

Cell detection may include detection of the base station device 3. Primary cell detection may include detection of a master base station device. Furthermore, primary secondary cell detection may include detection of a secondary base station device.

Furthermore, cell detection may be referred to as cell search. The cell search may include time and frequency synchronization of the cell. Furthermore, the cell search may include detection of the cell ID of the cell. The cell ID may be detected based on the PSS and the SSS.

In the cell that is configured by the DS or the DMTC, detection and synchronization of the cell may be performed based on the PSS/SSS/CRS/CSI-RS based on the DS.

An example of the detection reference of the synchronization signal and/or the reference signal will be described.

The terminal device 1 determines the detection based on received power intensity and/or received power quality of the synchronization signal and/or the reference signal from the cell. The terminal device 1 compares the received power intensity and/or the received power quality of the synchronization signal and/or the reference signal with thresholds, and determines that the cell is detected when reception intensity and/or reception quality is high. For example, the received power intensity is RSRP and the like. For example, the reception quality is interference, RSRQ, SINR, and the like. Furthermore, cell detection may be determined according to the measurement event which will be described later.

An example of the detection reference of the synchronization signal and/or the reference signal will be described.

The terminal device 1 determines the detection based on decoding success/failure of information on the synchronization signal and/or the reference signal from the cell. For example, the cell (base station device 3 that constitutes the cell) transmits a parity code such as the CRC in the synchronization signal and/or the reference signal. The terminal device 1 performs decoding using the parity code that is included in the synchronization signal and/or the reference signal, and determines that the cell is detected when determining that it is possible to correctly decode according to the parity detection.

After the cell is detected in the terminal device 1, the terminal device 1 selects the cell that is connected/activated and selects the cell that is disconnected/deactivated.

Furthermore, after the cell is detected in the terminal device 1, the terminal device 1 reports information on the detected cell, to the base station device 3 that is connected. The information cm the detected cell includes the cell ID and the measurement information.

The CRS that is described in detail below is transmitted using the antenna ports 0 to 3. The CRS is allocated to all downlink subframes that are non-MBSFN subframes. In other words, the CRS is allocated to all downlink subframes except for the MBSFN subframes. The CRS is determined by the resource element and the signal sequence based on the physical cell identifier (PCI).

Figure 10:
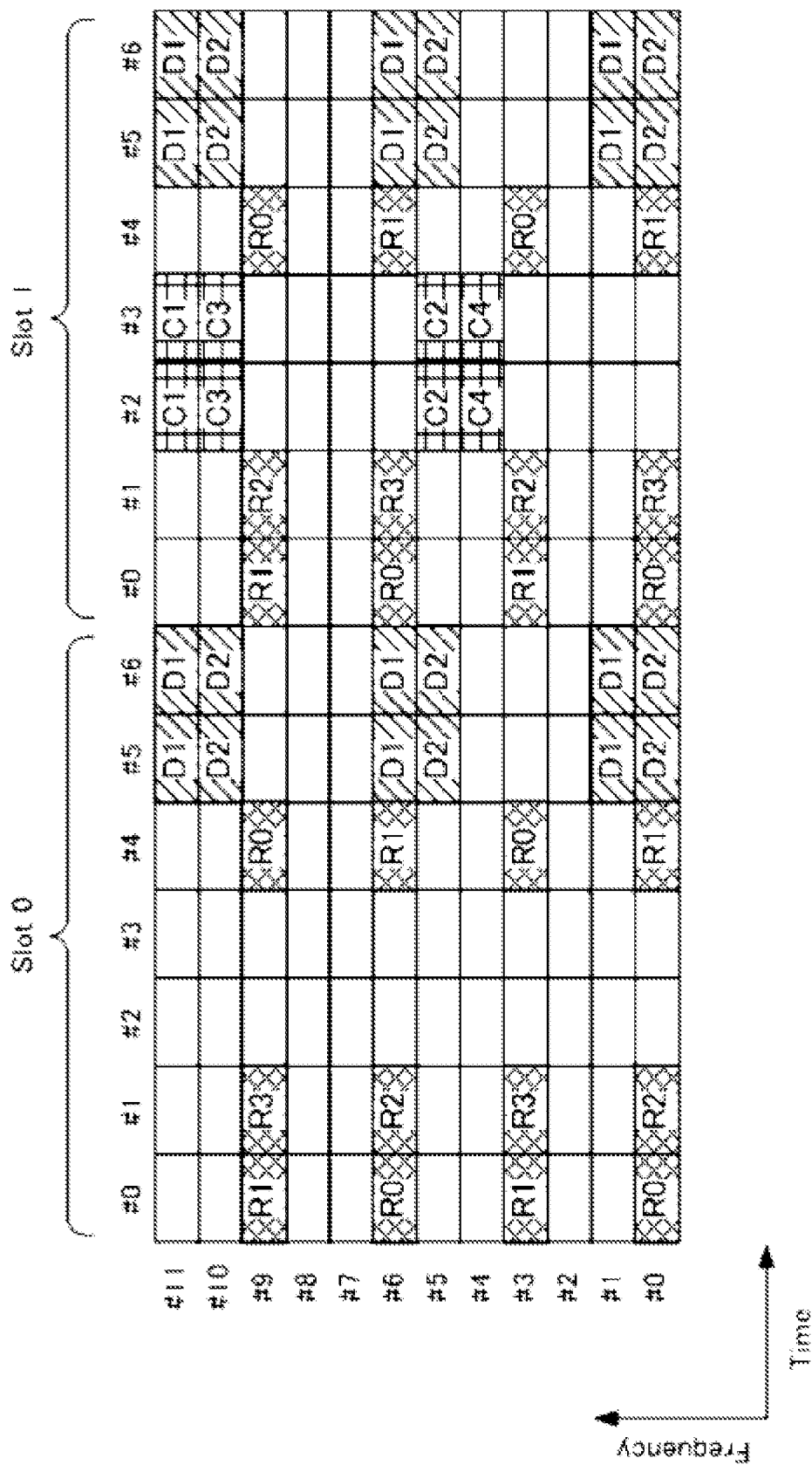
FIG. 10 is a diagram illustrating an example of a CRS structure and/or a DS structure.

FIG. 10 is a diagram illustrating an example of the CRS structure. The CRS signal is generated using a pseudo-random sequence. For example, the pseudo-random sequence is a Gold sequence. The pseudo-random sequence is calculated based on the physical cell identifier (PCI). The pseudo-random sequence is calculated based on the CP type.

The pseudo-random sequence is calculated based on the slot number and the OFDM symbol number in the slot. The CRS resource element of the normal CP uses R0 to R3 in FIG. 10. R0 corresponds to CRS allocation of the antenna port 0, R1 corresponds to CRS allocation of the antenna port 1, R2 corresponds to CRS allocation of the antenna port 2, and R3 corresponds to CRS allocation of the antenna port 3. The CRS resource element that is transmitted using one antenna port is allocated to a cycle of six subcarriers on the frequency axis. The CRS that is transmitted using the antenna port 0 and the CRS resource element that is transmitted using the antenna port 1 are allocated separated by three subcarriers. The CRS is shifted on the frequency in a cell specific manner based on the cell ID. The CRS that is transmitted using the antenna port 0 and the CRS resource element that is transmitted using the antenna port 1 are allocated to the OFDM symbols 0 and 4 in a normal CP and are allocated to the OFDM symbols 0 and 3 in an extended CP. The CRS that is transmitted using the antenna port 2 and the CRS resource element that is transmitted using the antenna port 3 are allocated to the OFDM symbol 1. The CRS is transmitted in a wide band at a bandwidth that is configured by downlink. Note that the DS may have the similar structure to the CRS.

Next, details of the discovery signal (DS) will be described.

The DS is transmitted from the base station device 3 for the purpose of various applications including synchronization of a downlink time domain (time synchronization), synchronization of a downlink frequency (frequency synchronization), identification of the cell/transmission point (cell/transmission point identification), measurement of RSRP (RSRP measurement), measurement of RSRQ (RSRQ measurement), measurement of geographical position (UE positioning) of the terminal device 1, measurement of CSI (CSI measurement), and the like. The DS may be the reference signal that is used to support the activation state and the deactivation state of the base station device 3. The DS may be the reference signal that is used for detecting the activation state and/or the deactivation state of the base station device 3 by the terminal device 1.

The DS is constituted by a plurality of signals. For example, the DS is constituted by the PSS, the SSS, and the CRS. The PSS and the SSS that are included in the DS may be used for time synchronization, frequency synchronization, identification of the cells, and identification of the transmission points. The CRS that is included in the DS may be used for measurement of the RSRP, measurement of the RSRQ, and measurement of the CSI. As another example, the DS is constituted by the PSS, the SSS, the CRS, and the CSI-RS. The PSS and the SSS that are included in the DS may be used for time synchronization, frequency synchronization, identification of the cells, and identification of the transmission points. The CSI-RS that is included in the DS may be used in identification of the transmission points, measurement of the RSRP, measurement of the RSRQ, and measurement of the CSI. The CRS may be used to calculate the RSSI. Note that the DS that is constituted by a plurality of signals may be referred to as a detection burst (discovery burst). Note that the DS may be referred to as the reference signal that performs measurement of the RSRP and/or measurement of the RSRQ.

The base station device 3 may switch and transmit the first DS that is constituted by the PSS, the SSS, and the CRS and the second DS that is constituted by the PSS, the SSS, the CRS, and the CSI-RS. In that case, the base station device 3 may configure the terminal device 1 by the first DS or the second DS. Furthermore, the terminal device 1 may recognize the configuration by the second DS when the parameter related to the CSI-RS is configured.

The DS is transmitted on the downlink subframe or a special subframe. Furthermore, the DS is transmitted on the downlink component carrier.

The DS is transmitted by the base station device 3 in the stopping state (off state, dormant mode, or deactivation). Furthermore, the DS may be transmitted by the base station device 3 in the activated state (on state, active mode, or activation).

It is possible to independently configure the DS in the respective base station devices (cells or transmission points). For example, the plurality of small cells transmit the DS with different configurations from each other using resources that are different from each other.

The base station device 3 configures the terminal device 1 by a list related to the DS and a DS measurement (detection, monitoring, or transmission) timing. The list related to the DS is an information list related to the base station device that transmits a certain DS that the terminal device 1 may receive. For example, the list related to the DS is a list of the transmission point ID of the transmission points that transmit the DS. The plurality of transmission points transmit the DS specific to the respective transmission points based on the measurement timing of the DS that are configured with respect to the terminal device 1. The terminal device 1 performs measurement of the DS based on the list related to the DS that is configured in the base station device 3 and the measurement timing of the DS. For example, the terminal device 1 measures the DS that are determined based on the list related to the DS using the subframe or the resource that is determined based on the measurement timing of the DS. Furthermore, the terminal device 1 reports the measurement result according to measurement of the DS to the base station device 3.

Each of the transmission points transmits the DS on one subframe. That is, each of the transmission points transmits the PSS, the SSS, the CRS and/or the CSI-RS related to one DS on one subframe. The terminal device 1 anticipates that the DS that corresponds to one transmission point is transmitted on one subframe. Note that one DS may be transmitted on a plurality of subframes.

The transmission of the DS or the measurement timing of the DS is cyclically configured on the time axis. Furthermore, the transmission of the DS or the measurement timing of the DS may be configured on continuous subframes. In other words, the DS may be burst transmitted. For example, the transmission of the DS or the measurement timing of the DS may be configured on N continuous subframes on M subframe cycles. The subframe L in which the DS is allocated may be configured in the cycle. The value of M, N, and/or L are configured on the higher layer. Note that the number N of subframes that are continuously transmitted in the cycle may be specified in advance. When the subframe cycle M is configured in a long period, it is possible to reduce the number of times that the DS is transmitted from the base station device 3 in the stopping state, and reduce inter-cell interference. Note that different configurations of the value of the M, N, and/or the L may be applied between the stopping state and the activated state. Furthermore, the parameter that corresponds to the value of the M, N, and/or the L may be notified by higher layer signalling.

Note that the parameter that corresponds to M may be indicated by, not only the cycle, but also the subframe offset (or start subframe). That is, the parameter that corresponds to M may be an index that is corresponded to the cycle and/or the subframe offset.

Note that the parameter that corresponds to N may be managed by using a table. The value of the parameter that corresponds to N may not represent the subframe number without any changes. Furthermore, the parameter that corresponds to N may not be indicated by including, not only the subframe number, but also the start subframe.

Note that the parameter that corresponds to L may be managed by using a table. The parameter that corresponds to L may be associated with the cycle. The value of the parameter that corresponds to L may not indicate the offset of the subframe without any changes.

The terminal device 1 may perform monitoring of the PDCCH in addition to measurement of the DS in a subframe or the measurement subframe of the DS in which it is possible to transmit the DS. For example, the terminal device 1 may monitor the PDCCH in the above described parameter that corresponds to N. At that time, the terminal device 1 may have a condition in which the function of monitoring the PDCCH is supported with respect to the small cells in the stopping state.

The DS may be transmitted including the information of the transmission point ID. Here, the transmission point ID information is information for identifying the transmission point (cell) that transmits the DS. For example, the transmission point ID is the physical cell identifier (physical cell ID, physCellID, or physical layer cell ID), the cell global identity (CGI), a new cell identifier (small cell ID, a discovery ID, and an extended cell ID). Furthermore, the transmission point ID may be an ID that is different from the physical cell identifier that is recognized in the PSS and the SSS that are included in the DS. The transmission point ID may be an ID that is associated with the physical cell identifier that is recognized in the PSS and the SSS that are included in the DS. For example, a certain transmission point ID may be associated with any one physical cell identifier that is recognized in the PSS and the SSS that are included in the DS. Note that a plurality of the ID related to the cell may be transmitted using the DS. For example, in an environment in which a number of cells is allocated and the physical cell identifier is insufficient to allocate them, it is possible to substantially expand the physical cell identifier by transmitting the physical cell identifiers and the new cell identifiers in combination using the DS.

The DS are transmitted using the antenna ports p, . . . , p+n−1. Here, n indicates the total number of antenna ports that transmit the DS. The value of p, . . . , p+n−1 may be applied to a value other than 0 to 22, 107 to 110. That is, the DS may be transmitted using the antenna ports that are different from the antenna ports used in other reference signals.

Next, an example of the DS structure (or configuration) will be described.

The DS may be applied to a plurality of structures and/or configurations. Here the plurality of structures may be structures or configurations of the plurality of signals. Furthermore, the plurality of structures may be signals that have the plurality of structures. In other words, the DS may be constituted from a plurality of signals. For example, the DS may be applied to the similar structure (or configuration) to the PSS. Further, the DS may be applied to the similar structure (or configuration) to the SSS. Further, the DS may be applied to the similar structure (or configuration) to the CRS. Further, the DS may be applied to the similar structure (or configuration) to the CSI-RS. That is, the DS may be based on the structure (or configuration) from the first signal to an $n^{th}$ signal (n is a natural number). In other words, the DS may be based on the first structure signal to the $n^{th}$ structure signal. Note that the signal structure may include the radio resource allocation (resource configuration) or a subframe configuration.

According to the object, the DS may differently use each structure signal (radio resource). For example, the structure of signals that are used in synchronization of the time domain and the frequency domain, the structure of signals that are used in the cell identification, and RSRP/RSRQ/RSSI measurement (RRM measurement) may be different. That is, the terminal device 1 may perform synchronization of the time domain and the frequency domain using the first signal may perform the cell identification using the second signal, and may perform RSRP/RSRQ measurement using the third signal. Furthermore, synchronization of the time domain and the frequency domain as well as cell identification may be performed using the first signal and the second signal, and RSRP/RSRQ/RSSI measurement (RRM measurement) may be performed using the third signal.

Furthermore, when the DS is generated from the signal based on the plurality of structures, the activation/deactivation state of the small cells may be indicated by transmitting the specific structure signals. For example, when the fourth signal (fourth structure signal) is transmitted, the terminal device 1 may recognize that the small cells are in the activated state and perform a process. That is, the terminal device 1 may recognize the small cells in the activated state by detecting the fourth signal (fourth structure signal).

Furthermore, the CSI measurement may be performed using the fifth signal (fifth structure signal). When performing CSI measurement, the terminal device 1 may perform CSI reporting in the first uplink subframe after a prescribed subframe from the subframe in which the CSI measurement is performed. Note that the CSI measurement i may be performed using another signal and not the fifth signal. In the stopping state, when the CSI measurement is performed, configuration information for performing CSI measurement/CSI reporting in the stopping state is notified from the base station device 3 to the terminal device 1 using higher layer signalling.

Furthermore, the DS structure that is transmitted from the small cells (the base station device 3 that is constituted by the small cells) may be different between the activated state and the stopping state of the small cells. For example, in the stopping state, the signals from the first structure to the third structure may be transmitted, and in the activated state, the signals from the first structure to the fourth structure may be transmitted. Furthermore, in the activated state, the fourth structure signal may be transmitted and not the third structure signal. Furthermore, when a plurality of signals having the similar structure to the SSS are configured, a plurality of signals are transmitted in the stopping state of the small cells, but only one signal may be transmitted in the activated state of the small cells. That is, the DS may switch the structure according to the state of the small cells.

Furthermore, the DS may be constituted from a plurality of signals in order to transmit the expanded physical cell identifier (PCI). Furthermore, the physical layer cell identifier and the transmission point identity (TP ID) may be transmitted using the plurality of signals. Here, the plurality of signals may be a plurality of SSS or signals with a structure similar to the SSS. Here, the plurality of signals may be signals with a structure similar to the PSS and the SSS. Furthermore, the plurality of signals may b e signals with a structure similar to the PSS and the plurality of SSS.

Note that the TPID may be a virtual cell identifier (VCID). The TPID may be an ID for identifying the transmission point, that is, the base station device 3. Note that the VCID may be an identifier that is used in the signal sequence. In other words, for the DS, the cell ID group may be identified using the first structure signal, the cell ID may be identified using the first structure signal and the second structure signal, and the TPID may be identified using the first structure signal, the second structure signal, and the third structure signal. Furthermore, the TPID may be expanded using the fourth structure signal.

Note that the DS may be configured separately from the PSS, the SSS, the CRS, and the CSI-RS. That is, the ID and the like for the DS resource configuration, the subframe configuration, the antenna port index, the antenna port number, or the sequence generation may be configured independently (individually) from the PSS, the SSS, the CRS, and the CSI-RS.

Figure 9:
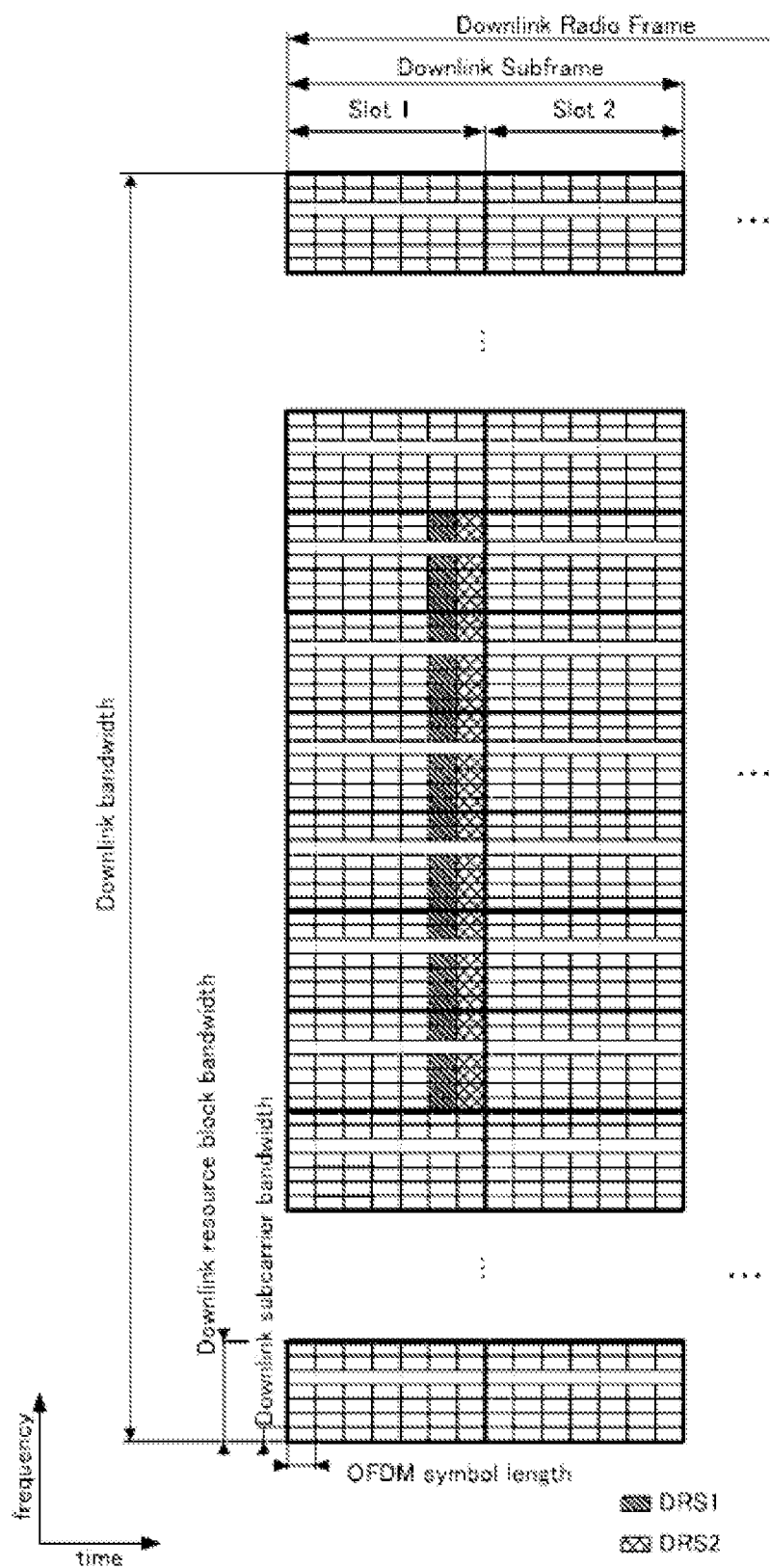
FIG. 9 is a diagram illustrating an example of a DS structure.

FIG. 9 is a diagram illustrating an example of the DS structure. Here, the sequence used in the DS (signal sequence or reference signal sequence) may be generated by a Zadoff-Chu sequence on the frequency axis. Furthermore, the DS may be allocated continuously on the frequency axis. Six resource blocks are used in the DS, and the DS may be transmitted using 62 sub earners out of the six resource blocks. Ten subcarriers out of the six resource blocks of the DS may be transmitted at zero power. In other words, the DS may reserve ten sub carriers out of the six resource blocks and may not transmit a signal. The DS are allocated to the last OFDM symbol at a slot number 0 and a slot number 10 upon the FDD (frame structure type 1), and are mapped to the third OFDM symbol of subframe 1 and subframe 6 upon the TDD (frame structure type 2). The DS may be transmitted containing a part of information that identifies the cell ID.

Note that the DS may be allocated to a different resource block (different frequency position) from the PSS. Note that the DS may be transmitted using a different resource block number from the PSS. Note that the DS may be transmitted using a different subcarrier number from the PSS. Note that the DS may be allocated to a different OFDM symbol from the PSS. Note that the DS may be transmitted including different information from the cell ID (PCI or VCID).

Another example of the DS structure will be described.

Furthermore, another example of the DS structure is illustrated in FIG. 9. The sequence (signal sequence or reference signal sequence) used in the DS may connect and interleave two length 31 binary sequences. The sequence of the DS may be generated based on the M sequence. The DS are different from the signal allocated to the subframe 0 and the signal allocated to the subframe 5. The DS are allocated to the sixth OFDM symbol at a slot number 0 and a slot number 10 upon the FDD, and are allocated to the seventh OFDM symbol of slot number 1 and slot number 11 upon the TDD. In other words, the DS are allocated to the second last OFDM symbol at the slot number 0 and the slot number 10 upon the FDD, and are allocated to the last OFDM symbol of slot number 1 and slot number 11 upon the TDD. At that time, the DS may be transmitted containing a part of information that identifies the cell ID.

Note that the DS may be allocated to a different resource block (different frequency position) from the SSS. Note that the DS may be transmitted using a different resource block number from the SSS. Note that the DS may be transmitted using a different subcarrier number from the SSS. Note that the DS may be allocated to a different OFDM symbol from the SSS. Note that the DS may be transmitted including different information from the cell ID.

Note that the subframe number that is transmitted by the DS is not limited. For example, the DS may be transmitted in the subframes 0, 1, 5, and 6. That is, the plurality of DS may be transmitted based on the SSS structure. In this case, it is possible to transmit a large amount of information that is included in the DS. Furthermore, in this case, there is an effect of suppressing inter-cell interference due to increase in an orthogonal sequence number.

Furthermore, another example of the DS structure is illustrated in FIG. 10. The DS signal is generated using the pseudo-random sequence. For example, the pseudo-random sequence is a Gold sequence. The pseudo-random sequence is calculated based on the cell ID (the PCI, the VCID, the scramble ID, the scrambling identifier (scrambling Identity), and the scrambling initialization identifier (scrambling initialization ID)). The pseudo-random sequence is calculated based on the CP type. The pseudo-random sequence is calculated based on the slot number and the OFDM symbol number in the slot. The DS resource element that is transmitted using one antenna port is allocated to a cycle of six subcarriers on the frequency axis. The DS that is transmitted using the antenna port p and the DS resource element that is transmitted using the antenna port p+1 are allocated separated by three sub carriers. The DS is shifted on the frequency in a cell specific manner based on the cell ID. The DS that is transmitted using the antenna port p and the DS resource element that is transmitted using the antenna port 0+1 are allocated to the OFDM symbols 0 and 4 in a normal CP and are allocated to the OFDM symbols 0 and 3 in an extended CP. The DS that is transmitted using the antenna port p+2 and the DS resource element that is transmitted using the antenna port p+3 are allocated to the OFDM symbol 1. The DS is transmitted in a wide band at a bandwidth that is configured by downlink. Note that the transmission bandwidth of the DS may be configured using higher layer signalling. The DS transmission bandwidth may be considered as the same as the measurement bandwidth.

Note that the DS may be transmitted using a different pseudo-random sequence from the CRS. Note that the DS may use a calculation method of a different sequence from the CRS. Note that the DS may be allocated to the frequency in a different subcarrier cycle from the CRS. Note that the allocation relationship of the resource element of the antenna port p that is transmitted using the DS and the antenna port p+1 that is transmitted using the DS may be different from the allocation relationship of the antenna port 0 and the antenna port 1. The DS may shift the allocation on the frequency based on different information from the CRS. Note that the DS may be allocated to a different OFDM symbol from the CRS. Note that the DS may be allocated to a different bandwidth from the CRS, may be allocated to the bandwidth that is configured on the higher layer; and may transmit on a narrow band.

Furthermore, another example of the DS structure is illustrated in FIG. 10. The DS (D1 or D2 in FIG. 10) sequence (signal sequence or reference signal sequence) is generated using a pseudo-random sequence. For example, the pseudo-random sequence is a Gold sequence. The pseudo-random sequence is calculated based on the information from the higher layer: The pseudo-random sequence is calculated based on the cell ID when information from the higher layer is not configured. The pseudo-random sequence is calculated based on the CP type. The pseudo-random sequence is calculated based on the slot number and the OFDM symbol number in the slot. The resource element to which the DS are allocated may be determined using a resource configuration number (DS resource configuration index), and may be calculated using the table in FIG. 12. Here, k' indicates the subcarrier number, l' indicates the OFDM symbol number, $n_s$ indicates the slot number, and $n_s$ mod 2 indicates the slot number in the subframe. For example, for configuration number 0, the DS may be allocated to the resource element of the slot number 0, the subcarrier number 9, and the OFDM symbol numbers 5 and 6. The DS is transmitted in a wide band at a bandwidth that is configured by downlink.

Note that the DS sequence may use a different pseudo-random sequence from the CSI-RS. Note that the DS sequence may be generated based on the calculation method of a different sequence from the CSI-RS. Note that the DS are not limited to the table in FIG. 12, and are able to be allocated to a different resource element from the CSI-RS. Note that the DS may be allocated to a different bandwidth from the CSI-RS, may be allocated to the bandwidth that is configured on the higher layer, and may transmit on a narrow band.

Furthermore, another example of the DS structure is illustrated in FIG. 10. The resource element to which the DS are allocated is determined using a resource configuration number (DS resource configuration index), and is calculated using the table in FIG. 12. Here, k' indicates the subcarrier number, l' indicates the OFDM symbol number, $n_s$ indicates the slot number, and $r_s$ mod 2 indicates the slot number in the subframe. For example, for configuration number 0, the DS may be allocated to the resource element of the slot number 0, the subcarrier number 9, and the OFDM symbol numbers 5 and 6. The DS is transmitted in a wide band at a bandwidth that is configured by downlink. The DS may be transmitted by zero output in the configured resource element. In other words, the base station device 3 may not transmit the DS in the configured resource element. From the viewpoint of the terminal device 1, the resource element that is not used by the base station device 3 to transmit the DS, is able to be used in interference measurement from neighbor cells (or neighboring base station devices). Furthermore, the DS may have a structure similar to R6 in FIG. 11.

Figure 11:
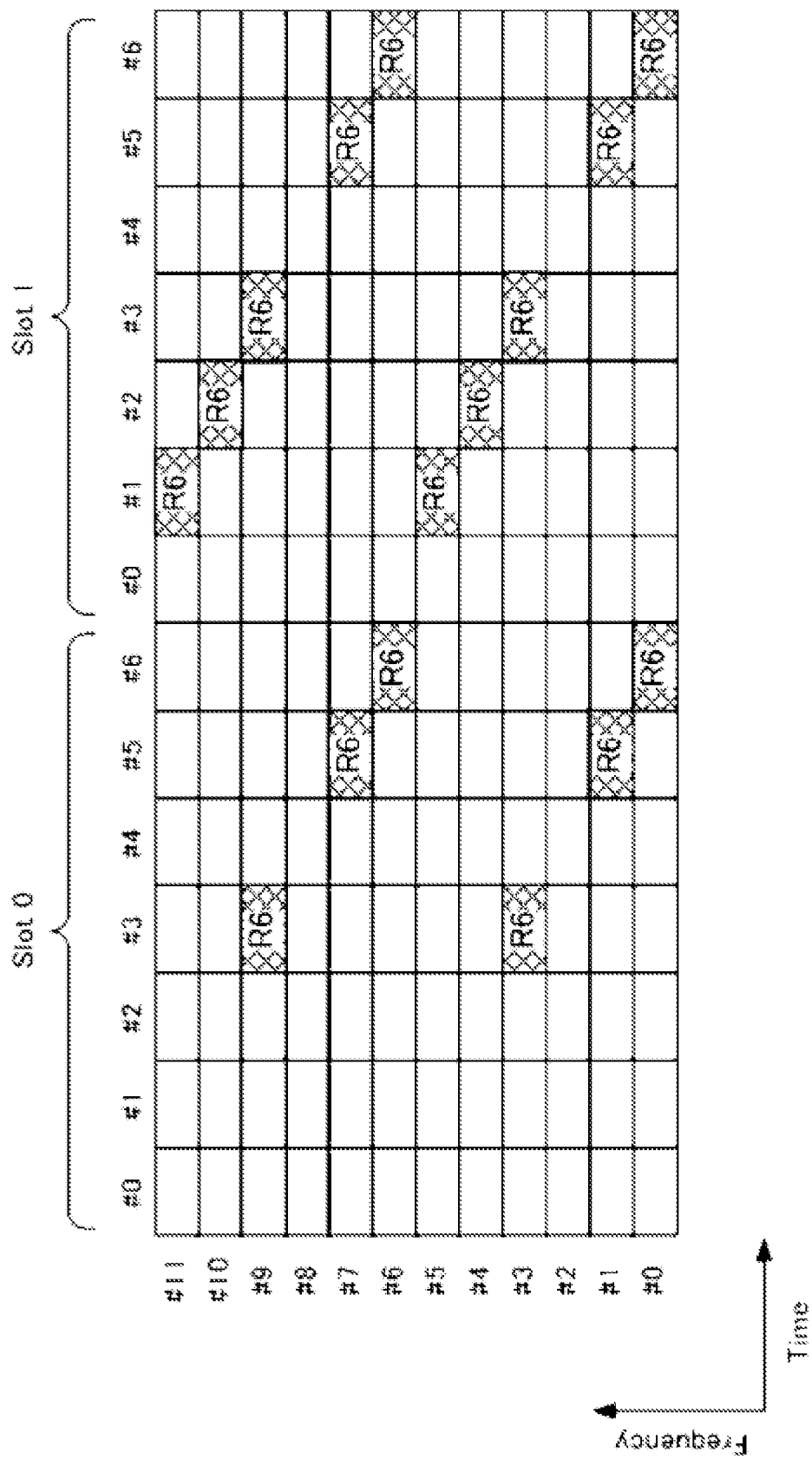
FIG. 11 is a diagram illustrating another example of a DS structure.

An example of the DS structure is illustrated in FIG. 11. The DS sequence is generated using a pseudo-random sequence. For example, the pseudo-random sequence is a Gold sequence. The pseudo-random sequence is calculated based on the cell ID. The pseudo-random sequence is calculated based on the CP type. The pseudo-random 1 sequence is calculated based on the slot number and the OFDM symbol number in the slot. The DS that is transmitted using one antenna port is allocated to a cycle of six subcarriers on the frequency axis. The DS is shifted on the frequency in a cell specific manner based on the cell ID. In the case of the normal CP, the DS is allocated to the slot 0 OFDM symbols 3, 5, and 6 and the slot 1 OFD symbols 1, 2, 3, 5, and 6, and in the case of the extended CP, the DS is allocated to the slot 0 OFDM symbols 4 and 5, and the slot 1 OFDM symbols 1, 2, 4, and 5. The DS resource element is located shifted by an amount L on the frequency at the $l^{th}$ OFDM symbol and the $l+L^{th}$ OFDM symbol. The DS is transmitted in a wide band at a bandwidth that is configured by downlink.

Note that the DS sequence may use a different pseudo-random sequence from the PRS. Note that the DS sequence may use a calculation method of a different sequence from the PRS. Note that the DS may be allocated to the frequency in a different sub carrier cycle from the PRS.

Note that the DS may be allocated to a different OFDM symbol from the PRS.

Note that the DS may be allocated to a different bandwidth from the PRS, may be allocated to the bandwidth that is configured on the higher layer, and may transmit on a narrow band. That is, the transmission bandwidth or the measurement bandwidth of the DS may be configured by the higher layer.

The DS may be constituted to include the CSI-IM resource. The CSI-IM resource is a resource used by the terminal device 1 to measure interference. For example, the terminal device 1 uses the CSI-IM resource as a resource for measuring interference in CSI measurement or a resource for measuring interference in RSRQ measurement. The CSI-IM resource is configured using the same method as the configuration method of the CSI-RS. The CSI-IM resource may be a resource that is configured as a zero power CSI-RS.

The structure of the DS is described above, but is not limited only to one example described above, and the DS may be constituted by combining a plurality of the above examples.

A specific example of a preferred combination is given. The DS may be constituted by combining the signal that is constituted by the Zadoff-Chu sequence, the signal that is constituted based on the M sequence, and the signal that is constituted based on the Gold sequence. Furthermore, the signal that is constituted based on the Gold sequence may be constituted by a wide band compared with the signal that is constituted by the Zadoff-Chu sequence, the signal dial is constituted based on the Zadoff-Chu sequence may be transmitted using six resource blocks, and the signal that is constituted based on the Gold sequence may be transmitted using the entire band of the subframe. That is, the bandwidth on which the DS are transmitted may be configured (configurable) by the higher layer. That is, desirably the DS is constituted by a signal that has a different structure using the different sequence.

Furthermore, the DS may be constituted by combining the signal that is constituted by the Zadoff-Chu sequence, the signal that is constituted based on the M sequence, the signal that is constituted based on the Gold sequence, and the signal that is transmitted at zero power. Furthermore, the signal that is constituted based on the Gold sequence and the signal that is transmitted at zero output may be configured by the resource element using DS configuration information. Furthermore, the signal that is constituted based on the Gold sequence may be constituted by a wide band compared with the signal that is constituted by the Zadoff-Chu sequence, the signal that is constituted by the Zadoff-Chu sequence may be transmitted using six resource blocks, and the signal that is constituted based on the Gold sequence may be transmitted using the entire band of the subframe.

The terminal device 1 may be notified about the DS configuration by dedicated RRC signalling. The DS configuration includes common information between cells that transmit the RS and information on individual cells that transmit the DS. Note that the DS configuration may be notified to include configuration information of the measurement object that will be described later.

Information on a central frequency of the band, bandwidth information, subframe information, and the like are included in the information that is common between cells that transmit the DS.

Information on a center frequency of the band, bandwidth information, subframe information, information that designates the resource element, information that identifying the cell (cell ID, PCI, or VCID), and the like are included in the information on individual cells that transmit the DS.

The terminal device 1 may not perform the DS detection process in the subframes in which the DS are not included since it is possible to recognize the subframes in which the DS are included according to the DS configuration. Thereby, it is possible to reduce power consumption of the terminal device 1.

The DS configuration may include configurations from the first structure signal to the $n^{th}$ structure signal. For example, the resource configuration of each structure signal may be individually set. Furthermore, the subframe configuration or the transmit power of each structure signal may be common (or a common value). Furthermore, the cell ID, the antenna port index, and the antenna port number may be set for only a certain structure signal. Furthermore, the resource configuration, the subframe configuration, and the like may be set for a plurality of certain structure signals in the DS configuration.

Information (parameter) that indicates the frequency at which the DS is transmitted may be included in the DS configuration.

Furthermore, information that indicates the offset (offset value) of the subframe at which it is possible to transmit the DS may be included in the DS configuration.

Furthermore, information that indicates the sub frame cycle at which it is possible to transmit the DS may be included in the DS configuration.

Furthermore, the identifier for generating the DS sequence may be included in the DS configuration.

Furthermore, information that indicates the antenna port through which the DS is transmitted may be included in the DS configuration.

Furthermore, information that indicates the DS burst transmission period (subframe period in which it is possible to transmit the DS) may be included in the DS configuration.

Furthermore, information that indicates the subframe cycle in which the DS is measured once in the subframe cycle may be included in the DS configuration.

That is, necessary information/parameters for DS transmission, and/or necessary information/parameters for DS reception, and/or necessary information/parameters for DS measurement may be included in the DS configuration.

The above described Information that is included in the DS configuration may be set in every structure signal. That is, the above described information may be configured in every signal of the different structures.

The information or parameters related to the DS configuration may be transmitted using higher layer signalling. Furthermore, the information or parameters related to the DS configuration may be transmitted using system information. Furthermore, the information/parameters of a part of the DS configuration may be transmitted using L1 signalling (DCI format) or L2 signalling (MAC CE).

The DS may be used in the listening reference signal (LRS) for synchronization between base station devices (network listening (NL) by the radio interface at the same frequency.

Synchronization between base station devices by the radio interface using the DS will be described below.

Application of the TDD system, application of an inter-cell interference suppression technique such as eICIC or CoMP, and application of the carrier aggregation between base stations with different transmission points are possible by synchronizing the transmission timing between the base station devices. However, when the small cells are located in an environment and a building in which a backhaul delay is large, it is difficult to perform time synchronization using backhaul or a satellite positioning system (global navigation satellite system (GSNN)). Therefore, the radio interface is used to perform synchronization at the downlink transmission timing.

The procedure of synchronization between base station devices by the radio interface will be described. At first, determination of the base station device 3 as references of transmission timing and designation of the LRS transmission timing are performed by backhaul. Furthermore, simultaneously, determination of the base station device 3 that performs synchronization of the transmission timing and designation of the LRS reception timing are performed by backhaul. Determination of the base station device 3 providing reference of the transmission timing, the base station device 3 that performs synchronization of the transmission timing and the transmission/reception timing of the LRS may be performed by the base station device, the MME, or the S-GW. The base station device 3 providing reference of the transmission timing performs transmission of the LRS in the downlink component carrier or the downlink subframe based on the transmission timing that is notified by backhaul. The base station device 3 performing synchronization of the transmission timing performs reception of the LRS at the notified reception timing and synchronization of the transmission tuning is performed. Note that the LRS may be transmitted even if the base station device 3 providing reference of the transmission timing is in the stopping state. Note that the LRS may be received even if the base station device 3 that performs synchronization of the transmission timing is in the activation/deactivation state.

In the TDD, the base station device 3 that performs synchronization of the transmission timing stops transmission of the downlink signal during reception of the LRS and the reception process of the radio signal is performed. In other words, the base station device 3 that performs synchronization of the transmission timing is configured at the uplink subframe during reception of the LRS. Here, the terminal device 1 that is connected to the base station device 3 that performs synchronization of the transmission timing recognizes the stopping state while the base station device 3 that performs synchronization of the transmission timing receives the listening RS. That is, the terminal device 1 recognizes that the PSS/SSS, the PBCH, the CRS, the PCFICH, the PHICH, and the PDCCH are not transmitted from the base station device 3 that performs synchronization of the transmission timing. The terminal device 1 is notified of the timing at which the listening RS is received by the base station device 3. In other words, the terminal device 1 is notified of the stopping state by the base station device 3. The terminal device 1 does not perform measurement on the base station device 3 at the timing at which the LRS is received. Note that the terminal device 1 that is connected to the base station device 3 that performs synchronization of the transmission timing recognizes the uplink subframe while the base station device 3 that performs synchronization of the transmission timing receives the LRS.

In the FDD, the base station device 3 that performs synchronization of the transmission timing stops transmission of the downlink signal during reception of the LRS and the reception process by the downlink component carrier is performed. Here, the terminal device 1 that is connected to the base station device 3 that performs synchronization of the transmission timing recognizes the stopping state while the base station device 3 that performs synchronization of the transmission timing receives the LRS. That is, the terminal device 1 recognizes that the PSS/SSS, the PBCH, the CRS, the PCFICH, the PHICH, and the PDCCH are not transmitted from the base station device 3 that performs synchronization of the transmission timing. The terminal device 1 is notified of the timing at which the LRS is received by the base station device 3. In other words, the terminal device 1 is notified of the stopping state by the base station device 3. The terminal device 1 does not perform measurement on the base station device 3 at the timing at which the LRS is received.

Note that the terminal device 1 may perform cell detection using the listening RS that is received from the base station device 3 providing reference of the transmission timing.

Next, measurement of the physical layer will be described in detail. The terminal device 1 performs measurement of the physical layer that reports to the higher layer. Measurement of the physical layer includes reference signal received power (RSRP), a received signal strength indicator (RSSI), reference signal received quality (RSRQ), and the like.

Next, the RSRP will be described in detail. The RSRP is defined as reception power of the reference signal. The RSRQ is defined as reception quality of the reference signal.

An example of the RSRP will be described.

The RSRP is defined as the value obtained by linearly averaging power of the resource element that transmits the CRS included in the considered measurement frequency bandwidth. In the RSRP determination, the resource element is used in which the CRS of the antenna port 0 is mapped. When the terminal device is able to detect the CRS of the antenna port 1, it is possible to also use the resource element (radio resource that is mapped to the resource element that is allocated to the antenna port 1) to which the CRS of the antenna port 1 is mapped in addition to the resource element (radio resource that is mapped to the resource element that is allocated to the antenna port 0) to which the CRS of the antenna port 0 is mapped in order to determine the RSRP. The RSRP that is calculated using the resource element to which the CRS of the antenna port 0 is mapped is referred to as the CRS base RSRP or a first RSRP.

The Terminal device 1 measures the RSRP of the cell of an intra frequency and/or the cell of an inter frequency in an RRC idle (RRC_IDLE) state. Here, the cell of the intra frequency in the RRC idle state is a cell of the same frequency bandwidth as the cell from which the terminal device 1 receives system information by broadcast. Here, the cell of the inter frequency in the RRC idle state is a cell of a different frequency bandwidth from the cell from which the terminal device 1 receives system information by broadcast. The terminal device 1 measures the RSRP of the cell of an intra, frequency and/or the cell of an inter frequency in an RRC connected (RRC_CONNECTED) state. Here, the cell of the intra frequency in the RRC connection state is a cell of the same frequency bandwidth as the cell from which the terminal device 1 receives system information by RRC signalling or broadcast. Here, the cell of the inter frequency in the RRC connection state is a cell of a different frequency bandwidth from the cell from which the terminal device 1 receives system information by RRC signalling or broadcast.

An example of the RSRP will be described.

The RSRP is defined as the value obtained by linearly averaging power of the resource element that transmits the DS included in the considered measurement frequency bandwidth. In the RSRP determination, the resource element is used in which the DS is mapped. The resource element and the antenna port through which the DS are transmitted are notified in the higher layer.

The terminal device 1 measures the RSRP of the cell of an intra frequency and/or the cell of an inter frequency in an RRC connected (RRC_CONNECTED) state.

The RSSI will be described in detail. The RSSI is defined by the total received power that is observed using a receive antenna.

An example of the RSSI will be described.

The RSSI (E-UTRA carrier RSSI) is constituted by a value obtained by linearly averaging the total received power where only the OFDM symbol, which is assumed to include the reference signal with respect to the antenna port 0, is observed. In other words, the RSSI is constituted by a value obtained by linearly averaging the total received power where only the OFDM symbol, which includes the CRS of the antenna port 0, is observed. The RSSI is observed at the bandwidth of resource block number N. The total received power of the RSSI includes power from the serving cell or a non-serving cell on the same channel, interference power from the neighboring channel, thermal noise power, and the like.

An example of the RSSI will be described.

The RSSI (E-UTRA carrier RSSI) is constituted by a value obtained by linearly averaging the total received power where all OFDM symbols are observed. The total received power of the RSSI includes power from the serving cell or a non-serving cell on the same channel, interference power from the neighboring channel, thermal noise power, and the like.

An example of the RSSI will be described.

The RSSI (E-UTRA earner RSSI) is constituted by a value obtained by linearly averaging the total received power where the OFDM symbol that does not include the DS is observed. The RSSI is observed at the bandwidth of resource block number. The total received power of the RSSI includes power from the serving cell or a non-serving cell on the same channel, interference power from the neighboring channel, thermal noise power, and the like. The resource element and/or the antenna port through which the DS are transmitted are notified in the higher layer.

An example of the RSSI will be described.

The RSSI (E-UTRA carrier RSSI) is constituted by a value obtained by linearly averaging the total received power where only the OFDM symbol that does not include the DS (CRS and/or CSI-RS) is observed. In other words, the RSSI is constituted by a value obtained by linearly averaging the total received power where only the OFDM symbol that does not include the DS (CRS and/or CSI-RS) is observed. The RSSI is observed at the bandwidth of resource block number N. The total received power of the RSSI includes power from the serving cell or a non-serving cell on the same channel, interference power from the neighboring channel, thermal noise power, and the like.

An example of the RSSI will be described.

The RSSI (E-UTRA carrier RSSI) is constituted by a total value of a value obtained by linearly averaging the total received power where only the OFDM symbol that does not include the DS (CRS aid/or CSI-RS) is observed and the value of the RSRP. In other words, the RSSI is constituted by a total value of a value obtained by linearly averaging the total received power where only the OFDM symbol that does not include the DS (CRS and/or CSI-RS) is observed and the value of the RSRP. The RSSI is observed at the bandwidth of resource block number N. The total received power of the RSSI includes power from the serving cell or a non-serving cell on the same channel, interference power from the neighboring channel, thermal noise power, and the like.

The RSRQ will be described in detail below. The RSRQ is defined by the ratio of the RSRP and the RSSI and is used for a similar purpose as a signal-to-interference-and-noise ratio (SINR) of a certain measurement object cell that is an indicator of the communication quality, hi the RSRQ, a combination of the RSRP and the RSSI is not limited to the following, but in the present embodiment, in the RSRQ, a preferable combination of the RSRP and the RSSI will be described.

An example of the RSRQ will be described.

The RSRQ is defined as a ratio that is calculated by the expression of N× RSRP/RSSI. Here, N is a resource block: number that corresponds to the measurement bandwidth of the RSSI, and a numerator and a denominator of the RSRQ are constituted by the same resource block set. Here, the RSRP is a first RSRP. Hereinafter, the RSRQ that is calculated using the RSRQ that is calculated using the first RSRP is referred to as a CRS base RSRQ or a first RSRQ.

The RSSI (E-UTRA carrier RSSI) is constituted by a value obtained by linearly averaging the total received power where only the OFDM symbol, which includes the reference signal with respect to the antenna port 0, is observed. In other words, the RSSI is constituted by a value obtained by linearly averaging the total received power where only the OFDM symbol, which includes the CRS of the antenna port 0 (radio resource that is mapped to the antenna port 0), is observed. The RSSI is observed at the bandwidth of resource block number N. The total received power of the RSSI includes power from the serving cell or a non-serving cell on the same channel, interference power from the neighboring channel, thermal noise power, and the like. When a prescribed subframe for performing measurement of the RSRQ is designated by higher layer signalling, the RSSI is measured from all OFDM symbols in the designated subframe.

The terminal device 1 measures the RSRQ of the cell of an intra frequency and/or the cell of an inter frequency in an RRC idle state. The terminal device 1 measures the RSRQ of the cell of an intra frequency and/or the cell of an inter frequency in an RRC connection state.

An example of the RSRQ will be described.

The RSRQ is defined as a ratio that is calculated by the expression of N× RSRP/RSSI. Here, N is a resource block number of the measurement bandwidth of the RSSI, and a numerator and a denominator of the RSRQ must be constituted by the same resource block set. Here, the RSRP is a second RSRP. Hereinafter, the RSRQ that is calculated using the RSRQ that is calculated using the second RSRP is referred to as a second RSRQ.

The RSSI (E-UTRA carrier RSSI) is constituted by a value obtained by linearly averaging the total received power where only the OFDM symbol, which is assumed to include the reference signal with respect to the antenna port 0, is observed. In other words, the RSSI is constituted by a value obtained by linearly averaging the total received power where only the OFDM symbol, which includes the CRS of the antenna port 0, is observed. The RSSI is observed at the bandwidth of resource block number N. The total received power of the RSSI includes power from the serving cell or a non-serving cell on the same channel, interference power from the neighboring channel, thermal noise power; and the like. When a prescribed subframe for performing measurement of the RSRQ is designated by higher layer signalling, the RSSI is measured from all OFDM symbols in the designated subframe.

An example of the RSRQ will be described.

The RSRQ is defined as a ratio that is calculated by the expression of N× RSRP/RSSI. Here, N is a resource block number that corresponds to the measurement bandwidth of the RSSI, and a numerator and a denominator of the RSRQ are constituted by the same resource block set. Here, the RSRP is measured based on the DS (PSS/SSS/CRS/CSI-RS).

The RSSI (E-UTRA carrier RSSI) is constituted by a total value of a value obtained by linearly averaging the total received power where only the OFDM symbol that does not include the DS (CRS and/or CSI-RS) is observed and the value of the RSRP. In other words, the RSSI is constituted by a total value of a value obtained by linearly averaging the total received power where only the OFDM symbol that does not include the DS (CRS and/or CSI-RS) is observed and the value of the RSRP. The RSSI is observed at the bandwidth of resource block number N. The total received power of the RSSI includes power from the serving cell or a non-serving cell on the same channel, interference power from the neighboring channel, thermal noise power, and the like.

Furthermore, the RSSI that is used in the RSRQ may be obtained based on the RSRP and the linearly averaged value of the total received power that is obtained by the OFDM symbol that does not include the DS in the measurement bandwidth.

Furthermore, the RSSI that is used in the RSRQ may be obtained based on the linearly averaged value of the total received power that is obtained by all OFDM symbols in the measurement bandwidth.

Furthermore, the RSSI that is used in the RSRQ may be obtained based on the linearly averaged value of the total received power that is obtained by the OFDM symbol that does not include the DS in the measurement bandwidth.

Furthermore, the RSSI that is used in the RSRQ may be obtained from the RSSI measurement of the CRS that is constituted by the DS.

The measurement bandwidth may be configured at 5 MHz or more when the DS has a structure similar to the CSI-RS.

The measurement bandwidth may be configured at 6 RBs and/or 15 RBs when the DS has a structure similar to the CSI-RS.

The measurement bandwidth of the DS may be configured using the higher layer signalling.

The terminal device 1 measures the RSRQ of the cell of an intra frequency and/or the cell of an inter frequency in an RRC connection state.

A first measurement procedure will be described. The first measurement is first RSRP or first RSRQ measurement. Note that the first measurement may be measurement (RRM measurement, RSRP measurement, RSRQ measurement, and RSSI measurement) of the first signal (first structure signal).

The terminal device 1 recognizes the resource element to which CRS is allocated that is transmitted from the physical cell identifier (PCI) using the antenna port 0. Then, the terminal device 1 measures the first RSRP from the resource element to which CRS transmitted using the antenna port 0 is allocated. Note that the subframe number used in measurement is not limited, measurement may be carried out across the plurality of subframes and an average value may be reported. Next, the OFDM symbol included in the antenna port 0 is recognized and the measurement of the RSSI is performed. Then, calculation of the first RSRQ is performed from the first RSRP and RSSI. Note that the measurement subframes of the first RSRP and RSSI may be different.

Note that the result (first RSRP and first RSRQ) that is obtained based on the first measurement procedure is referred to as a first measurement result.

A second measurement procedure will be described. The second measurement is second RSRP or second RSRQ measurement.

The terminal device 1 recognizes the resource element to which the DS is allocated from the DS configuration information. Then, the terminal device 1 measures the second RSRP from the resource element to which DS is allocated. Note that the subframe number used in measurement is not limited, measurement may be carried out on the plurality of subframes and the average value of the measurements may be reported. Next, the RSSI measurement is performed. Then, calculation of the second RSRQ is performed from the second RSRP and RSSI.

Note that the result (second RSRP, second RSRQ, second RSSI, and second RRM) that is obtained based on the second measurement procedure is referred to as a second measurement result. Note that the second measurement may be measurement (RRM measurement, RSRP measurement, RSRQ measurement, and RSSI measurement) of the second signal (second structure signal).

Next, the mechanism for reporting the measurement value that is measured by the terminal device 1 to the higher layer will be described.

Figure 13:
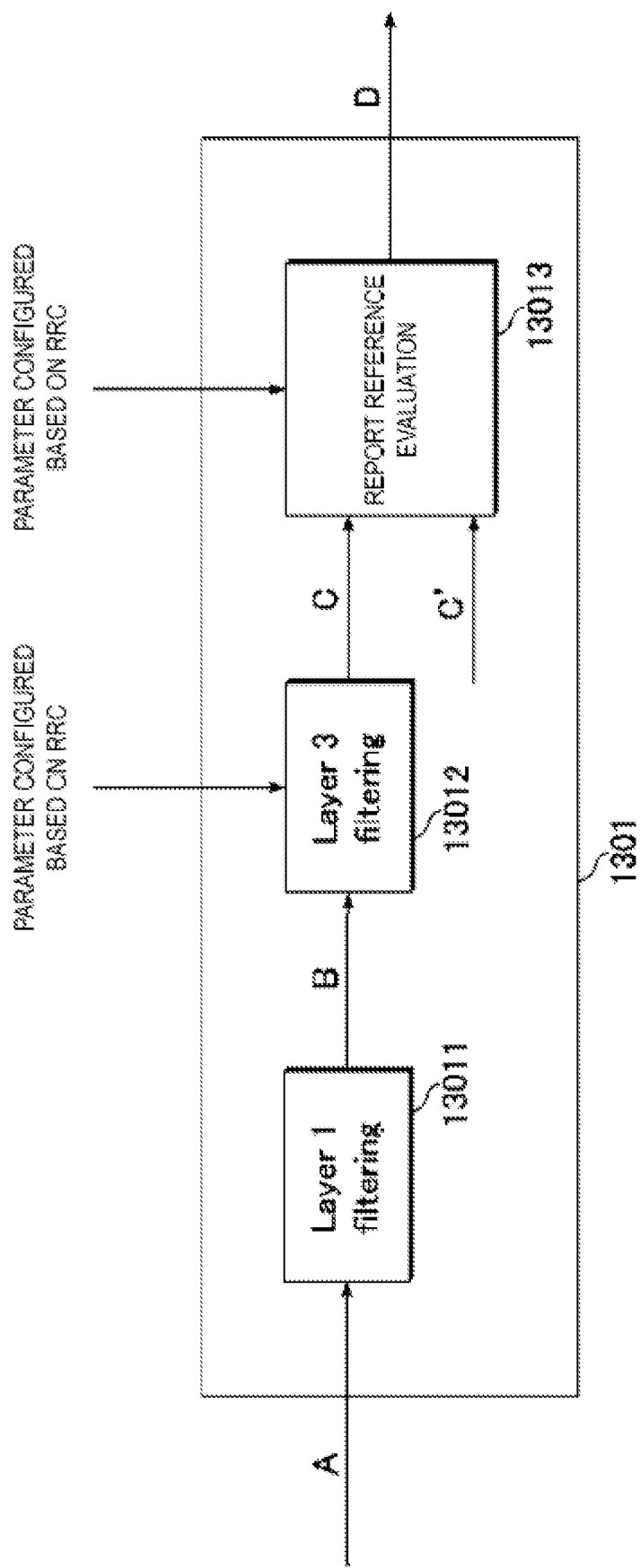
FIG. 13 is a diagram illustrating a measurement model.

A measurement model will be described. FIG. 13 is a diagram illustrating an example of a measurement model.

A measurement unit 1301 may be constituted to include a first layer filtering unit 13011, a third layer filtering unit 13012, and a report reference evaluation unit 13013. Note that the measurement unit 1301 may be constituted to partially include functions of a reception unit 105 and the higher layer processing unit 101. Specifically, the first layer filtering unit 13011 may be constituted to be included in the reception unit 105, and the third layer filtering unit 13012 and the report reference evaluation unit 13013 may be constituted to be included in the higher layer processing unit 101.

The measurement value (sample) that is inputted from the physical layer is filtered by the first layer filtering (layer 1 filtering) unit 13011. For example, the first layer filtering unit 13011 may apply an average of a plurality or input values, a weighted average, an average that follows the channel characteristic, and the like, and may apply another filter method. The measurement value that is reported from the first layer is input to the third layer after the first layer filtering unit 13011. The measurement value that is input to the third layer filtering (layer 3 filtering) unit 13012 is filtered. The third layer filtering configuration is provided from the RRC signalling. A gap that is reported by filtering using the third layer filtering unit 13012 is the same as the input measurement gap. The report reference evaluation unit 13013 examines whether it is necessary to actually report the measurement value. Evaluation is based on one or more measurement flow. Examples of the measurement flow include a comparison and the like between different measurement values. The terminal device 1 performs evaluation of the report reference every time at least a new measurement result is reported. The configuration of the report reference is provided by RRC signalling. After it is determined that a measurement value report is necessary in evaluation of the report reference, the terminal device 1 transmits measurement report information (measurement report message) by a radio interface.

Next, measurement will be described. The base station device 3 transmits a measurement configuration message to the terminal device 1 using an RRC connection reconfiguration message of the RRC signalling (radio resource control signal). The terminal device 1 configures the system information that is included in the measurement configuration message and performs measurement, event evaluation, and measurement reporting on the serving cells and the neighbor cells (including listed cells and/or detected cells) in accordance with the notified system information. The listed cells are cells that are listed in the measurement object (cells that are notified from the base station device 3 to the terminal device 1 as the neighbor cell list). The detected cells are cells that are detected by the terminal device 1 at the frequency that is instructed by the measurement object, but not listed in the measurement object (cells that is not notified by the neighbor cell list, and detected by the terminal device 1 itself).

There are three types of measurement (intra-frequency measurement, inter-frequency measurement, and inter-radio access technology measurement (inter-RAT measurement)). Intra-frequency measurement is measurement at the downlink frequency of the serving cells (downlink frequency). Inter-frequency measurement is measurement at a different frequency from the downlink frequency of the serving cells. Liter-radio access technology measurement (inter-RAT measurement) is measurement using wireless technology (for example, UTRA, GERAN, and CMDA 2000) that is different from the wireless technology (for example, EUTRA) of the serving cells.

The measurement configuration message includes addition and/or modification and/or removal of a measurement identifier (measID), the measurement objects, and the reporting configurations, physical quantity configuration (quantityConfig), measurement gap configuration (measGapConfig), a serving cell quality threshold (s-Measure), and the like.

The quantity configuration (quantityConfig) designates the third layer filtering coefficient (L3 filtering coefficient) when the measurement objects are EUTRA. The third layer filtering coefficient (L3 filtering coefficient) defines a ratio (proportion) of the newest measurement result to a past filtering measurement result. The filtering result is utilized in event evaluation by the terminal device 1.

The measurement gap configuration (measGapConfig) is utilized to control the configuration of a measurement gap pattern or activation/deactivation of the measurement gap. In the measurement gap configuration (measGapConfig), the gap pattern, a start system frame number (start SFN), and a start subframe number (start SubframeNumber) are notified as information when the measurement gap is activated. The gap pattern specifies what pattern is used as the measurement gap. The start system frame number (start SFN) specifies the system frame number (SFN) for starting the measurement gap. The start subframe number (startsubframeNumber) specifies the subframe number for starting the measurement gap.

The measurement gap is a certain period (time or subframe) in which it is possible for the terminal device 1 to utilize for performing measurement when uplink/downlink transmission is not scheduled.

When the measurement gap is configured with respect to the terminal device 1 that supports DS measurement (or in which the DS configuration is set), DS measurement may be performed on the subframe that is specified based on the measurement gap configuration (that is, on the measurement gap).

When the measurement gap is configured with respect to the terminal device 1 that supports DS measurement (or in which the DS configuration is set), if the DS transmission subframe based on the subframe configuration that is included in the DS configuration overlaps the subframe specified based on the measurement gap configuration, DS measurement may be performed on the measurement gap. If the DS transmission subframe is on the measurement gap, the terminal device 1 may measure the DS on the measurement gap.

When the measurement gap is configured with respect to the terminal device 1 that supports DS measurement (or in which the DS configuration is set), DS measurement may be performed on the measurement gap, in only the cells indicated to be in the stopping state in the DCI format or the MAC CE. That is, the terminal device 1 may not perform DS measurement on the measurement gap with respect to the cells in which the activated state is indicated. The base station device 3 may not transmit the DS in the cells in the activated state.

The measurement gap may be configured in every DS or every cell in which the activation/deactivation state is indicated.

The serving cell quality threshold (s-Measure) is utilized to express a threshold related to quality of the serving cells and control whether or not it is necessary for the terminal device 1 to perform measurement. The serving cell quality threshold (s-Measure) is configured as a value with respect to the RSRP.

Here, the measurement identifier (measID) is utilized to link the measurement objects and the reporting configuration, and specifically, to link a measurement object identifier (measObjectId) and a reporting configuration identifier (reportConfigID). The measurement identifier (measID) associates one measurement object identifier (measObjectId) and one reporting configuration identifier (reportConfigID). It is possible to add/modify/remove the measurement configuration message with respect to the relationship of the measurement identifier (measID), the measurement objects, and the reporting configuration.

measObjectToRemoveList is a command that removes the designated measurement object identifier (measObjectId) and measurement objects that correspond to the designated measurement object identifier (measObjectId). At this time, all measurement identifiers (measID) that are associated with the designated measurement object identifier (measObjectId) are removed. This command is able to simultaneously designate a plurality of measurement object identifiers (measObjectId).

measObjectToAddModifylist is a command that modifies the designated measurement object identifier (measObjectId) to the designated measurement objects or adds the designated measurement object identifier (measObjectId) and the designated measurement objects. This command is able to simultaneously designate a plurality of measurement object identifiers (measObjectId).

reportConfigToRemoveList is a command for removing a designated reporting configuration identifier (reportConfigID) and reporting configurations that correspond to the designated reporting configuration identifier (reportConfigId). At this time, all measurement identifiers (measID) that are associated with the designated reporting configuration identifier (reportConfigID) are removed. This command is able to simultaneously designate a plurality of reporting configuration identifiers (reportConfigID).

measIdToRemoveList is a command for removing the designated measurement identifier (measID). At this time, the measurement object identifier (measObjectId) and the reporting configuration identifier (reportConfigID) that are associated with the designated measurement identifier (measId) are maintained without being removed. This command is able to simultaneously designate a plurality of measurement identifiers (measID).

measIdToAddModifyList is a command that modifies the designated measurement identifier (measID) so that it is associated with the designated measurement object identifier (measObjectId) and a designated reporting configuration identifier (reportConfigID), or associates a designated measurement object identifier (measObjectId) and a designated reporting configuration identifier (reportConfigId) with the designated measurement identifier (measID), and adds the designated measurement identifier (measID). This command is able to simultaneously designate a plurality of measurement identifiers (measID).

The measurement objects are specified in the radio access technology (RAT) and each frequency. Furthermore, the reporting configurations are a specification with respect to the EUTRA and a specification with respect to a RAT other than the EUTRA.

The measurement objects include a measurement object EUTRA (measObjectEUTRA) that is associated with the measurement object identifier (measObjectId) and the like.

The measurement object identifier (measObjectId) is an identifier used for identifying the configuration of the measurement objects. As described above, the configuration of the measurement objects are specified in the radio access technology (RAT) and each frequency. The measurement objects are separately specified with respect to the EUTRA, the UTRA, the GERAN, and the CMDA2000. The measurement object EUTRA (measObjectEUTRA) that are measurement objects with respect to the EUTRA specifies the information that is applied to neighbor cells of the EUTRA. Furthermore, measurement object EUTRA (measObjectEUTRA) with different frequencies are handled as different measurement objects, and separately allocated with the measurement object identifiers (measObjectId).

An example of information on the measurement objects will be described.

The measurement object EUTRA (measObjectEUTRA) includes EUTRA carrier frequency information (eutra-CarrierInfo), the measurement bandwidth (measurementBandwidth), antenna port 1 presence information (presenceAntennaPort1), an offset frequency (offsetFreq), information related to a neighbor cell list, and information related to a black list.

Next, information that is included in the measurement object EUTRA (measObjectEUTRA) will be described. The EUTRA carrier frequency information (eutra-CarrierInfo) designates the carrier frequency that is the measurement object. The measurement bandwidth indicates a measurement bandwidth that is common to all neighbor cells that are operated at the carrier frequency that is the measurement object. The antenna port 1 presence information (presenceAntennaPort1) indicates whether or not the antenna port 1 is used in the cells that are measurement objects. The offset frequency (offsetFreq) indicates a measurement offset value that is applied at the frequency that is the measurement object.

An example of information on the measurement objects will be described.

The base station device 3 performs different configuration from the first measurement to perform the second measurement on the terminal device 1. For example, the first measurement and the second measurement may have different signals (or the structure of the signal and the configuration of the signal) that are the measurement objects.

Furthermore, the first measurement and the second measurement may have different cell ID that are set in the signals that are the measurement objects. Furthermore, the first measurement and the second measurement may have different antenna ports of the signals that axe the measurement objects. Furthermore, the first measurement and the second measurement may have different measurement cycles (or a measurement subframe pattern) of the signals that axe the measurement objects. That is, the first measurement and the second measurement may be individually configured.

The measurement object EUTRA (measObjectEUTRA) includes EUTRA carrier frequency information (eutra-CarrierInfo), the measurement bandwidth (measurementBandwidth), DS configuration information, the offset frequency (offsetFreq), information related to a neighbor cell list, and information related to a black list.

Next, information that is included in the measurement object EUTRA (measObjectEUTRA) will be described. The EUTRA carrier frequency information (eutra-CarrierInfo) designates the carrier frequency that is the measurement object. The measurement bandwidth indicates a measurement bandwidth that is common to all neighbor cells that are operated at the carrier frequency that is the measurement object. The DS configuration information is used to notify the terminal device 1 of the common configuration information at a frequency band necessary for detecting the DS configuration, and for example, indicates the subframe number, the subframe cycle, and the like that are transmitted in the cells that are the measurement objects. The offset frequency (offsetFreq) indicates a measurement offset value that is applied at the frequency that is the measurement object.

An example of the information related to the neighbor cell list and the black list will be described.

Information related to the neighbor cell list includes information related to the neighbor cells that are the object of event evaluation or measurement reporting. The physical cell identifier (physical cell ID), the cell-specific offset (cellIndividualOffset, indicating the measurement offset value that is applied with respect to the neighbor cells), and the like are included as information related to the neighbor cell list. For the EUTRA, the terminal device 1 utilizes the information as information for performing addition/modification/removal with respect to the neighbor cell list that is already acquired from the broadcast information (broadcast system information).

Furthermore, information related to the black list includes information related to the neighbor cells that are not the object of event evaluation or measurement reporting. The physical cell identifier (physical cell ID) and the like are included as information related to the black list. For the EUTRA, the terminal device 1 utilizes the information as information for performing addition/modification/removal with respect to the black cell list (black listed cell list) that is already acquired from the broadcast information.

An example of the information related to the neighbor cell list and the black list will be described.

When the second measurement is performed, it is assumed that the physical cell identifier (PCI) is insufficient. Therefore, anew neighbor cell list and a new black list in which the physical cell identifier is expanded are necessary.

Information related to the new neighbor cells list (neighboring small cell list) may include information related to the neighbor cells that are the object of event evaluation or measurement reporting. The cell ID, the cell-specific offset (cellIndividualOffset, indicating the measurement offset value that is applied with respect to the neighbor cells), cell-specific DS configuration information, and the like may be included as information related to anew neighbor cell list. Here, cell-specific DS configuration information is DS information that is configured to be cell-specific, for example, is information that indicates the resource element of the DS that is used, and the like. For the EUTRA, the terminal device 1 utilizes the information as information for performing addition/modification/removal with respect to the new neighbor cell list that is already acquired from the broadcast information (broadcast system information).

Furthermore, information related to the new blade list may include information related to the neighbor cells that are not the object of event evaluation or measurement reporting. Furthermore, the cell ID and the like may be included as information related to the new black list. For the EUTRA, the terminal device 1 utilizes the information as information for performing addition/modification/removal with respect to the new black cell list (black listed small cell list) that is already acquired from the broadcast information.

Here, for example, the cell ID includes a physical cell identifier (physical cell ID, physical layer cell ID), a cell global identity/identifier (CGI), an E-UTRAN cell global identifier/identity (ECGI), a discovery ID, a virtual cell identifier (virtual cellID), a transmission point ID, and the like, and is constituted based on information on a cell (transmission point) ID that is transmitted on the DS. Furthermore, instead of the cell ID, there may be a parameter associated with a sequence generator (a scrambling sequence generator and a pseudo-random sequence generator).

Note that the neighbor cell list may indicate the DS list when the cell ID (or a parameter associated with the pseudo-random sequence generator (for example, the scrambling ID)) is included in the DS configuration. That is, the terminal device 1 may perform DS measurement on the cell ID that is set in the neighbor cell list.

Note that the black list may indicate the DS black list when the cell ID is included in the DS configuration. That is the terminal device 1 may not perform DS measurement on the cell ID that is set in the black list.

Next, the reporting configuration will be described in detail.

The reporting configurations include a reporting configuration EUTRA (reportConfigEUTRA) that is associated with the reporting configuration identifier (reportConfigID), and the like.

The reporting configuration identifier (reportConfigID) is an identifier used to identify the reporting configurations related to measurement. The reporting configurations related to measurement are a specification with respect to the EUTRA and a specification with respect to a RAT other than the EUTRA (UTRA, GERAN, and CDMA 2000) as described above. The reporting configuration EUTRA (reportConfigEUTRA) that is the reporting configuration (Reporting configurations) with respect to the EUTRA specifies a trigger condition (trigger criteria) of an event that is utilized in the report of measurement in the EUTRA.

Furthermore, the reporting configuration EUTRA (reportConfigEUTRA) includes the event identifier (eventId), a trigger quantity (triggerQuantity), hysteresis, a trigger time (timeToTrigger), a report quantity (reportQuantity), a maximum report cell number (maxReportCells), a report interval (reportInterval), and a number of times of reporting (reportAmount).

The event identifier (eventId) is utilized to select the condition (criteria) related to event triggered reporting. Here, event triggered reporting is a method for reporting measurement when the event trigger condition is satisfied. Other than this, there is also an event triggered periodic reporting that reports measurement only a certain number of times with a certain interval, when the event trigger condition is satisfied.

When the event trigger condition that is designated by the event identifier (eventId) is satisfied, the terminal device 1 performs the measurement report with respect to the base station device 3. The trigger quantity (triggerQuantity) is a quantity utilized to evaluate the event trigger condition. That is, the RSRP or the RSRQ are designated. That is, the terminal device 1 measures the downlink reference signal by utilizing the quantity designated by the trigger quantity to determine whether or not the event trigger condition designated by the event identifier (eventId) is satisfied.

Hysteresis is a parameter that is utilized in the event trigger condition. The trigger time (timeToTrigger) indicates the period in which the event trigger condition is to be satisfied. The report quantity (reportQuantity) indicates the quantity of reporting in the measurement report. Here, the quantity that is designated by the trigger quantity (triggerQuantity) or the RSRP and the RSRQ are designated.

The maximum report cell number (maxReportCells) indicates the maximum number of the cells that are included in the measurement report. The report interval is utilized with respect to periodical reporting or event triggered periodic reporting and is periodically reported in each interval that is indicated by the report interval (reportInterval). The number of times of reporting (reportAmount) specifies the number of times periodical reporting is performed according to necessity.

Note that the threshold parameter or the offset parameter that are utilized in the event trigger condition described later are notified to the terminal device 1 together with the event identifier (eventId) in the reporting configuration.

Note that the base station device 3 may or may not notify the serving cell quality threshold (s-Measure). When the base station device 3 notifies the serving cell quality threshold (s-Measure), the terminal device 1 performs neighbor cell measurement and event evaluation (whether or not the event trigger condition is satisfied, also referred to as evaluation of reporting criteria) when the RSRP of the serving cell is lower than the serving cell qualify threshold (s-Measure). Meanwhile, when the base station device 3 does not notify the serving cell quality threshold (s-Measure), the terminal device 1 performs neighbor cell measurement and event evaluation regardless of the RSRP of the serving cells.

Note that when it is possible to configure the LAA cells, the maximum report cell number may be expanded according to the number of cells. In addition, measurement reporting may be performed based on a first maximum report cell number when the LAA cells is not configured and measurement reporting may be performed based on a second maximum report cell number when the LAA cells are configured. That is, when the LAA cells or LAA cell list are configured, the maximum report cell number may be individually configured in the LTE cells and the LAA cells.

Note that when the LAA cells are configurable, the serving cell quality threshold may be individually configured in the LTE cells and the LAA cells.

That is, when the LAA cells are configurable, the reporting configuration may be individually configured in the LTE cells and the LAA cells. That is, the event specific to the LAA cells may be configured.

Next, the event and the event trigger condition will be described in detail.

The terminal device 1 that satisfies the event trigger condition transmits the measurement report to the base station device 3. The measurement report includes the measurement result.

A plurality of event trigger conditions for carrying out measurement report are defined, and there are respectively a subscription condition and a withdrawal condition. That is, the terminal device 1 that satisfies the subscription condition with respect to the event that is designated from the base station device 3 transmits the measurement report with respect to the base station device 3. Meanwhile, the terminal device 1 that satisfies the event subscription condition and transmits the measurement report stops transmission of the measurement report when the event withdrawal condition is satisfied.

An example of the event and the event trigger condition are described below using either of the first measurement result and the second measurement result.

An example of a designation method of the type of measurement results utilized to evaluate the event trigger condition will be described below.

The type of measurement results utilized to evaluate the event trigger condition is designated by the reporting configuration. The event trigger condition is evaluated according to the parameter using either the first measurement result or the second measurement result.

As a specific example, the first measurement result or the second measurement result are designated by the trigger quantity. The trigger quantity may be specified by four selection columns of {first RSRP, first RSRQ, second RSRP, second RSRQ}. Furthermore, {first RSRP/first RSRQ} and {second RSRP/second RSRQ} may be individually selected. The terminal device 1 measures the downlink reference signal by utilizing the quantity designated by the trigger quantity to determine whether or not the event trigger condition designated by the event identifier (eventId) is satisfied.

As a specific example, the first measurement result or the second measurement result may be specified by a new parameter (triggerMeasType) that designates the type of measurement results utilized to evaluate the event trigger condition other than the trigger quantity. The new parameter sets information that indicates evaluation of the event trigger condition using the first measurement result or information that indicates evaluation of the event trigger condition using the second measurement result. For example, when the new parameter sets information that indicates evaluation of the event trigger condition using the second measurement result, the terminal device 1 performs second measurement and evaluates the event trigger condition using the second measurement result. Note that the parameter may be common to the parameter (reportMeasType) that designates the type of the reported measurement result.

Note that in the event trigger conditions that uses two or more measurement results for one conditional expression, such as comparison of the serving cell measurement result and a neighboring cell measurement result the type of measurement results utilized to evaluate the event trigger condition may be designated for each measurement result. For example, the new parameter (triggerMeasTypeServ) for the serving cell measurement result and a new parameter (triggerMeasTypeNeigh) for the neighboring cell measurement result may be specified.

An example of a designation method of the type of measurement results utilized to evaluate the event trigger condition will be described below.

The type of measurement results utilized to evaluate the event trigger condition is determined according to the reporting configuration depending on the condition that configures measurement.

As a specific example, the type of measurement results utilized to evaluate the event trigger condition is determined depending on the activation/deactivation state of the object cell. For example, if the object cell in the activated state, the event trigger condition is evaluated using the first measurement result, and if the object cell is in the stopping state, the event trigger condition is evaluated using the second measurement result.

As a specific example, the type of measurement results utilized to evaluate the event trigger condition is determined depending on detection of the reference signal. For example, when the CRS is detected and the DS is not detected, the event trigger condition may be evaluated using the first measurement result, and when the CRS is not detected and the DS is detected, the event trigger condition may be evaluated using the second measurement result. Furthermore, when both the CRS and the DS are detected, the event trigger condition may be evaluated using the measurement result having the higher received power. Furthermore, when both the CRS and the DS are detected, the event trigger condition may be evaluated using the measurement result obtained by averaging the received power of both. Furthermore, when neither the CRS or the DS are detected, the event trigger condition may not be evaluated.

Next, the measurement result will be described in detail.

The measurement result is constituted by the measurement identifier (measID), the serving cell measurement result (measResultServing), and the EUTRA measurement result list (measResultListEUTRA). Here, the physical cell identifier (physicalCellIdentity) and the EUTRA cell measurement result (measResultEUTRA) are included in the EUTRA measurement result list (measResultListEUTRA). Here, as described above, the measurement identifier (measID) is an identifier that is utilized to link the measurement object identifier (measObjectId) and the reporting configuration identifier (reportConfigID). Furthermore, the physical cell identifier (physicalCellIdentity) is utilized to identify the cells. The EUTRA cell measurement result (measResultEUTRA) is a measurement result with respect to the EUTRA cell. The measurement result of the neighbor cells is only included during generation of the associated event.

An example of the measurement result will be described.

The terminal device 1 may report the measurement result including a result of the RSRP and the RSRQ with respect to the object cells. The RSRP and the RSRQ that are reported one time may be either one of the first measurement result or the second measurement result. Note that the first measurement result may be a measurement result that is obtained from the first measurement. Furthermore, the second measurement result may be a measurement result that is obtained from the second measurement. In other words, the first measurement result is a measurement result that is obtained based on the configuration information related to the first measurement, and the second measurement result is a measurement result that is obtained based on the configuration information related to the second measurement.

In a specific example, the measurement result is reported based on the parameter that determines the first measurement result or the second measurement result. For example, a reference that determines the first measurement result or the second measurement result is a new parameter (reportMeasType). The new parameter may set information that indicates reporting of the first measurement result or information that indicates reporting of the second measurement result. For example, when information that indicates reporting of the second measurement result is set to the new parameter, the terminal device 1 recognizes the new parameter, performs the second measurement, performs transmission of the second measurement result that is in the measurement report message, and does not transmit the first measurement result. Furthermore, the new parameter may set information that indicates reporting of the first measurement result and the second measurement result.

Note that the new parameter may be shared with the parameter (triggerMeasType) that designates the type of measurement results utilized to evaluate the event trigger condition. Note that the parameter may be shared with the higher layer i parameter that designates the measurement method.

Note that the parameter (reportQuantity) that indicates the report quantity may be configured for each measured type as a parameter (reportQuantityRSRP) with respect to the RSRP and the parameter (reportQuamtityRSRQ) with respect to the RSRQ. For example, when the reportQuantityRSRP is configured by the first RSRP and the reportQuantityRSRQ is configured by the second RSRQ, the terminal device 1 transmits the first RSRP and the second RSRQ and does not transmit the second RSRP and the first RSRQ.

For example, the parameter may be reported depending on the condition that designates measurement.

For example, the type of the measurement result that is reported may be determined depending on the activation/deactivation state of the object cell.

For example, the type of the reported measurement result is determined depending on detection of the reference signal. For example, when the CRS is detected and the DS is not detected, the first measurement result is reported, and when the CRS is not detected and the DS is detected, the second measurement result is reported. When both the CRS and the DS are detected, the measurement result having the higher received power is reported. When neither of the CRS nor the DS is detected, reporting is not performed or a minimum value is reported.

Note that the parameter clearly indicating what measurement type is set in the measurement result may be added such that the base station device 3 can recognize whether a reported measurement result from the terminal device 1 is a result that is calculated by the first measurement or a result that is calculated by the second measurement.

As above, an example of the event, the event trigger condition, and the report of the measurement result will be described. According to these combination, the terminal device 1 reports the first measurement result and/or the second measurement result with respect to the base station device 3. The combination of the event, the event trigger condition, and the report of the measurement result is not limited in the present embodiment, but a preferable example of the combination will be described below.

An example of the combination of the event, the event trigger condition, and the report of the measurement result will be described.

When the first measurement is performed, the measurement object (measObject) is configured that includes the neighbor cells list or the black list in which the physical cell identifier is configured, and the reporting configuration (reportConfig) is configured that is configured by the event and the event trigger condition that are triggered by the first measurement, and they are associated by the ID, and thereby, the measurement report message including the first measurement result (measResults) is transmitted. Furthermore, when the second measurement is performed, the measurement object (measObject) is configured that includes the new neighbor cells list or the new black list in which the expanded cell ID is configured, and the report configuration (reportConfig) is configured that is configured by the event and the event trigger condition that are triggered by the second measurement, and they are associated by the ID, and thereby, the measurement report message including the second measurement result (measResults) is transmitted.

That is, the terminal device 1 is configured by the measurement object, the reporting configuration, and the measurement result for the first measurement and the measurement object, the reporting configuration, and the measurement result for the second measurement. That is, the reporting configuration with respect to the first measurement result and the reporting configuration with respect to the second measurement result are respectively independently configured.

An example of the combination of the event, the event trigger condition, and the report of the measurement result will be described.

When the first measurement is performed, the measurement object (measObject) that includes the neighbor cells list or the black list in which the physical cell identifier is configured is configured, and the report configuration (reportConfig) that is configured by the event and the event trigger condition that are triggered by the first measurement is configured, and they are associated with the measurement results (measResults) by the ID. When the second measurement is performed, the measurement object (measObject) that includes the new neighbor cells list or the new blade list in which the expanded cell ID is configured is configured, and the report configuration (reportConfig) that is configured by the event and the event trigger condition that are triggered by the second measurement is configured, and they are associated with the measurement results (measResults) by the ID. When the event that is triggered by the first measurement is generated, the first measurement result is assigned to the measurement result, and is transmitted by the measurement report message. When the event that is triggered by the second measurement is generated, the second measurement result is assigned to the measurement result, and is transmitted by the measurement report message.

That is, the terminal device 1 is configured by the measurement object and the reporting configuration for the first measurement, and the measurement object and the reporting configuration for the second measurement, and the measurement result is a common field for the first measurement and the second measurement. The first measurement result or the second measurement result is transmitted according to the event.

Thereby, the terminal device 1 is able to report the first measurement result and the second measurement result to the base station device 3.

The terminal device 1 of the present embodiment is a terminal device 1 for communicating with the base station device 3, including a reception unit 105 that performs first measurement based on the first RS (CRS) and performs second measurement based on the second RS (DS); and the higher layer processing unit 101 that reports the first measurement result and the second measurement result to the base station device 3, in which the first measurement result is reported to the base station device 3 in a first state and the first measurement result or the second measurement result is reported to the base station device 3 in a second state.

For example, in the second state, the event that reports the first measurement result and the event that reports the second measurement result are configured by the base station device 3. Furthermore, for example, in the second state, only the event that reports the second measurement result is configured by the base station device 3. The event trigger condition that reports the second measurement result is specified using the second measurement result.

For example, the first state is a state in which the second RS configuration information is not notified, and the second state is a state in which the second RS configuration information is notified from the base station device 3. Furthermore, for example, the first state is a state in which the second measurement information is not configured, and the second state is a state in which the second measurement information is configured from the base station device 3. Furthermore, for example, the second state is a state in which the first RS is not transmitted.

The reporting configuration with respect to the DS may individually set the reporting configuration with respect to the CRS or the CSI-RS.

The transmit power or power headroom (PHR) are determined by the value that is dependent on path loss. An example of the method for estimating the path loss (channel attenuation) will be described below.

A downlink path loss estimation value of a serving cell c is calculated by the terminal device 1 using an equation: PLc=referenceSignalPower−higher layer filtered RSRP. Here referenceSignalPower is given in the higher layer. referenceSignalPower is information based on the transmit power of the CRS. Here, the higher layer filtered RSRP is a first RSRP of the reference serving cell that is filtered in the higher layer.

When the serving cell c belongs to TAG (pTAG) that includes the primary cell, the primary cell is used for the referenceSignalPower and higher layer filtered RSRP reference serving cells with respect to the uplink primary cells. The serving cells that are configured by higher layer parameter pathlossReferenceLinking is used for the referenceSignalPower and higher layer filtered RSRP reference serving cells with respect 1 to the uplink secondary cells. When the serving cell c belongs to TAG (for example, sTAG) that does not include the primary cell, the serving cell c is used for the reference SignalPower and higher layer filtered RSRP reference serving cells.

An example of the method for estimating the path loss will be described.

A downlink path loss estimation value of the serving cells c is calculated by the terminal device 1 using an equation: PLc=discoveryReferenceSignalPower−higher layer filtered RSRP2 when configured by the higher layer, and otherwise an equation: PLc=referenceSignalPower−higher layer filtered RSRP. Here referenceSignalPower is given in the higher layer. referenceSignalPower is information based on the transmit power of the CRS. Here, the higher layer filtered RSRP is a first RSRP of the reference serving cell that is filtered in the higher layer. Here discoveryReferenceSignalPower is a parameter associated with the DS transmit power and is given in the higher layer. Furthermore, the higher layer filtered RSRP2 is a second RSRP of the reference serving cell that is filtered in the higher layer.

Here, configuring using the higher layer, for example, may be a case based on the DS configuration that is notified using higher layer signalling. Configuring using the higher layer, for example, may be a case based on the configuration of measurement that is notified using higher layer signalling. Configuring using the higher layer, for example, may be a case based on the configuration of the uplink transmit power control that is notified using higher layer signalling. That is, configuring using the higher layer, may include a case in which the parameter or information is notified using higher layer signalling and configured in the terminal device 1.

When the serving cell c belongs to TAG that includes the primary cell, the primary cell is used for the discoveryReferenceSignalPower and higher layer filtered RSRP2 reference serving cells with respect to the uplink primary cells. The serving cells that are configured by higher layer parameter pathlossReferenceLinking is used for the discoveryReferenceSignalPower and higher layer filtered RSRP2 reference serving cells with respect to the uplink secondary cells. When the serving cell c belongs to TAG that does not include the primary cell, the serving cell c is used for the discoveryReferenceSignalPower and higher layer filtered RSRP2 reference serving cells.

When the secondary cells are in the stopping state, the terminal device 1 may not perform the following processes. The processes include transmission of SRS using the secondary cells, reporting of a channel quality indicator (CQI)/precoding matrix indicator (PMI)/rank indicator (RI)/precoding type indicator (PTI) with respect to the secondary cells, transmission of uplink data (UL-SCH) using the secondary cells, transmission of RACH using the secondary cells, monitoring of the PDCCH using the secondary cells, and monitoring of the PDCCH with respect to the secondary cells.

When the secondary cells are small cells, the terminal device 1 may perform the following processes even if the secondary cells are in the stopping state. The processes include transmission of SRS using the secondary cells, reporting of CQI/PMI/RI/PTI with respect to the secondary cells, (transmission of uplink data (UL-SCH) using the secondary cells), transmission of the RACH using the secondary cells, monitoring of the PDCCH using the secondary cells, and monitoring of the PDCCH with respect to the secondary cells.

When the secondary cells in the stopping state are small cells, the terminal device 1 may transmit the SRS using secondary cells when SRS transmission is requested from the primary cell (PDCCH/EPDCCH (DCI format) transmitted using the primary cell) to the secondary cells (SRS request is transmitted) by cross carrier scheduling. That is, in this case, the base station device 3 anticipates reception of the SRS.

When the secondary cells in the stopping state are small cells, the terminal device 1 may transmit the CQI/PMI/RI/PTT with respect to the secondary cells using the PUSCH of the primary cells when CSI reporting is requested from the primary cell (PDCCH/EPDCCH (DCI format) transmitted using the primary cell) to the secondary cells (CSI request is transmitted) by cross carrier scheduling. That is, in this case, the base station device 3 anticipates reception of the CQI/PMI/RI/PTI with respect to the secondary cells using the PUSCH of the primary cells.

When the secondary cells in the stopping state are small cells, the terminal device 1 may transmit the RACH using secondary cells when a random access response grant (RAR grant) is transmitted by the PDCCH order from the primary cell (PDCCH/EPDCCH (DCI format) transmitted using the primary cell) by cross carrier scheduling. That is, in this case, the base station device 3 anticipates reception of the RACH using the secondary cells.

When the secondary cells in the stopping state are small cells, the terminal device 1 may transmit the RACH using secondary cells when it is possible to detect the DCI format involving the CRC that is scrambled by the RA-RNTI with respect to the secondary cells from the primary cell (PDCCH/EPDCCH (DCI format) transmitted using the primary cell) by cross carrier scheduling. That is, in this case, the base station device 3 anticipates reception of the RACH using the secondary cells.

When the secondary cells in the stopping state are small cells, the terminal device 1 may monitor the PDCCH in the secondary cells when the configuration of the EPDCCH set (or EPDCCH configuration) is not set with respect to secondary cells. That is, in this case, the base station device 3 may transmit the PDCCH in the small cells in the stopping state.

When the secondary cells in the stopping state are small cells, the terminal device 1 may monitor the PDCCH with respect to the secondary cells when the downlink grant or the uplink grant, the CSI request or the SRS request, the random access response grant, and the like are transmitted with respect to the secondary cells from the primary cell (PDCCH/EPDCCH (DCI format) transmitted using the primary cell) by cross carrier scheduling. At that time, in only a case in which the configuration of the EPDCCH set (or EPDCCH configuration) is not performed with respect to the terminal device 1, or a function in which the DCI is received using the EPDCCH in the terminal device 1 is not supported, the terminal device 1 may perform monitoring of the PDCCH with respect to the secondary cells. That is, in this case, the base station device 3 may transmit the PDCCH in the small cells in the stopping state.

When the secondary cells in the stopping state are small cells, even if information related to uplink scheduling is transmitted with respect to the secondary cells, the terminal device 1 may not perform uplink transmission based on information related to uplink scheduling. That is, in this case, it is not anticipated that the base station device 3 performs uplink transmission in the small cells in the stopping state.

When the secondary cells in the stopping state are primary secondary cells (special secondary cells), the terminal device 1 may transmit the SRS using secondary cells when SRS transmission is requested to the secondary cells (the SRS request is transmitted) by self-scheduling. That is, in this case, the base station device 3 anticipates reception of the SRS.

When the secondary cells in the stopping state are primary secondary cells, the terminal device 1 may transmit the CQI/PMI/RI/PTT with respect to the secondary cells using the PUSCH of the secondary cells when CSI reporting is requested to the secondary cells (the CSI request is transmitted) by self-scheduling.

When the secondary cells in the stopping state are primary secondary cells, the terminal device 1 may transmit the RACH using secondary cells when a random access response grant (RAR grant) is transmitted according to the PDCCH order by self-scheduling.

When the secondary cells in the stopping state are primary secondary cells, the terminal device 1 may transmit the RACH using secondary cells when it is possible to detect the DCI format involving the CRC that is scrambled by the RA-RNTI with respect to the secondary cells by self-scheduling.

When the secondary cells in the stopping state are primary secondary cells, the terminal device 1 may monitor the PDCCH using the secondary cells when the configuration of the EPDCCH set is not configured with respect to secondary cells. That is, the terminal device 1 monitors the PDCCH using the secondary cells if the configuration of the EPD- CCH set is not received with respect to primary secondary cells. Furthermore, the base station device 3 may transmit the PDCCH with respect to the terminal device 1 rising the secondary cells if the configuration of the EPDCCH set is not set with respect to primary secondary cells.

When the secondary cells in the stopping state are primary secondary cells, the terminal device 1 may monitor the PDCCH with respect to the secondary cells when the downlink giant or the uplink grant, the CSI request or the SRS request, the random access response grant, and the like are transmitted with respect to the secondary cells by self-scheduling. At that time, in only a case in which the configuration of the EPDCCH set is not performed with respect to the terminal device 1, or a function in which the DCI is received using the EPDCCH in the terminal device 1 is not supported, the terminal device 1 may perform monitoring of the PDCCH with respect to the secondary cells.

When the secondary cells in the stopping state are primary secondary cells, the terminal device 1 may perform uplink transmission based on information related to uplink scheduling using the secondary cells when information related to uplink scheduling (PUSCH grant, CSI request, or SRS request) is transmitted with respect to the secondary cells by self-scheduling. For example, when the DCI format 0 is detected with respect to the secondary cells, the terminal device 1 may transmit the PUSCH using the secondary cells.

When the secondary cells in the stopping state are primary secondary cells (special secondary cells), the terminal device 1 may transmit the SRS using secondary cells when SRS transmission is requested from the primary cell (PDCCH/EPDCCH (DCI format) transmitted at the primary cell) to the secondary cells (SRS request is transmitted) by cross carrier scheduling. At that time, the terminal device 1 may support a function of performing cross carrier scheduling on the primary cells and the primary secondary cells.

When the secondary cells in the stopping state are primary secondary cells, the terminal device 1 may transmit the CQI/PMI/RI/PTT with respect to the secondary cells using the PUSCH of the primary cells when CSI reporting is requested from the primary cell (PDCCH/EPDCCH (DCI format) transmitted using the primary cell) to the secondary cells (CSI request is transmitted) by cross carrier scheduling. At that time, the terminal device 1 may support a function of performing cross carrier scheduling on the primary cells and the primary secondary cells.

When the secondary cells in the stopping state are primary secondary cells, the terminal device 1 may transmit the RACH using secondary cells when a random access response grant (RAR grant) is transmitted by the PDCCH order from the primary cell (PDCCH/EPDCCH (DCI format) transmitted using the primary cell) by cross carrier scheduling. At that time, the terminal device 1 may support a function of performing cross carrier scheduling on the primary cells and the primary secondary cells. In this case, the base station device 3 may transmit the random access response grant (RAR grant) according to a PDCCH order with respect to the secondary cells in the stopping state by cross carrier scheduling.

When the secondary cells in the stopping state are primary secondary cells, the terminal device 1 may transmit the RACH using secondary cells when it is possible to detect the DCI format involving the CRC that is scrambled by the RA-RNTI with respect to the secondary cells from the primary cell (PDCCH/EPDCCH (DCI format) transmitted using the primary cell) by cross carrier scheduling. At that time, the terminal device 1 may support a function of performing cross carrier scheduling on the primary cells and the primary secondary cells.

When the secondary cells in the stopping stare are primary secondary cells, the terminal device 1 may monitor the PDCCH using the secondary cells when the configuration of the EPDCCH set is not configured with respect to secondary cells.

When the secondary cells in the stopping state are primary secondary cells, the terminal device 1 may monitor the PDCCH with respect to the secondary cells when the downlink grant or the uplink grant, the CSI request or the SRS request, the random access response grant, and the like are transmitted with respect to the secondary cells from the primary cell (PDCCH/EPDCCH (DCI format) transmitted using the primary cell) by cross carrier scheduling. At that time, in only a case in which the configuration of the EPDCCH set is not performed with respect to the terminal device 1, or a function in which the DCI is received using the EPDCCH in the terminal device 1 is not supported, the terminal device 1 may perform monitoring of the PDCCH with respect to the secondary cells.

The terminal device 1 may monitor the PDCCH using the secondary cells in the stopping state when the cross carrier scheduling is not valid with respect to the secondary cells in the stopping state.

The terminal device 1 may monitor the PDCCH using the secondary cells in the stopping state when the cross carrier scheduling is not valid with respect to the secondary cells in the stopping state and various configurations related to the EPDCCH is not received.

The terminal device 1 may monitor the PDCCH in the secondary cells in the stopping state when there is no EPDCCH configuration and/or configuration of the EPDCCH set with respect to the secondary cells in the stepping state. Furthermore, the base station device 3 may determine whether or not the PDCCH in the secondary cells in the stopping state is transmitted according to whether or not the EPDCCH configuration and/or the configuration of the EPDCCH set with respect to the secondary cells in the stopping state are set in the terminal device 1.

When the secondary cells in the stopping state are primary secondary cells, the terminal device 1 may perform uplink transmission based on information related to uplink scheduling when information related to uplink scheduling is transmitted with respect to the secondary cells from the primary cells by cross carrier scheduling. At that time, the terminal device 1 may support a function of performing cross carrier scheduling on the primary cells and the primary secondary cells.

When the terminal device 1 is configured to receive the PDSCH data transmission according to the transmission modes 1 to 9 by higher layer signalling with respect to a certain serving cell and the terminal device 1 is configured to monitor the EPDCCH, the terminal device 1 assumes that antenna ports 0 to 3 and 107 to 110 of the serving cell are quasi co-located regarding Doppler shift, Doppler spread, average delay, and delay spread.

When the terminal device 1 is configured to receive the PDSCH data transmission according to the transmission modes 10 by higher layer signalling with respect to a certain serving cell and the terminal device 1 is configured to monitor the EPDCCH with respect to each EPDCCH-ERB set, and farther when the terminal device 1 is configured, by the higher layer, to decode the PDSCH according to a Quasi Co-Location (QCL) type A, the terminal device 1 assumes that antenna ports 0 to 3 and antenna ports 107 to 110 of the serving cell are quasi co-located regarding Doppler shift, Doppler spread, average delay, and delay spread. On the other hand, when the terminal device 1 is configured to decode the PDSCH according to a Quasi Co-Location type B by the higher layer, the terminal device 1 assumes that antenna ports 15 to 22 and antenna ports 107 to 110 corresponding to the higher layer parameter (qcl-CSI-RS-ConfigNZPId) are quasi co-located regarding Doppler shift Doppler spread, average delay, and delay spread.

The terminal device 1 configured by the QCL type A may assume a Quasi Co-Location with resources corresponding to antenna ports 0 to 3 and antenna ports 107 to 110 of the serving cells regarding Doppler shift, Doppler spread, average delay, and delay spread.

The terminal device 1 configured by the QCL type B may assume a Quasi Co-Location with resources corresponding to antenna ports 15 to 22 and antenna ports 107 to 110 corresponding to the higher layer parameter (qcl-CSI-RS-ConfigNZPId) regarding Doppler shift, Doppler spread, average delay, and delay spread.

That is, the terminal device 1 assumes a Quasi Co-Location of the antenna ports 0 to 3 and the antenna ports 107 to 110 of the serving cells when the type A is set based on the higher layer parameter QCL operation, and the terminal device 1 assumes a Quasi Co-Location of the antenna ports 15 to 22 and the antenna ports 107 to 110 corresponding to the higher layer parameter (qcl-CSI-RS-ConfigNZPId), when the type B is set. In other words, the terminal device 1 configured to monitor the EPDCCH assumes a Quasi Co-Location of the CRS and the EPDCCH when the type A is set, based on the higher layer parameter QCL operation, and the terminal device 1 assumes a Quasi Co-Location of the CSI-RS and the EPDCCH when the type B is set.

When the terminal device 1 is configured to receive the PDSCH data transmission according to the transmission modes 10 by higher layer signalling with respect to a certain serving cell and the terminal device 1 is configured to monitor the EPDCCH with respect to each EPDCCH-ERB set, a parameter set (PDSCH-RE-MappingQCL-Config) is used that is instructed by the higher layer parameter (re-MappingQCL-ConfigId, or PDSCH-RE-MappingQCL-ConfigId) in order to determine EPDCCH resource element mapping and EPDCCH antenna port Quasi Co-Location. Various parameters (Crs-PortsCount, crs-FreqShift, mbsfn-SubframeConfigList, csi-RS-ConfigZPId, pdsch-Start and qc1-CSI-RS-ConfigNZPId) are included in that parameter set for determining EPDCCH resource element mapping and EPDCCH antenna port Quasi Co-Location.

In a certain serving cell (secondary cell), the higher layer parameter (qc1-D S-ConfigID) may be configured in order to determine the DS, EPDCCH resource element mapping, and EPDCCH antenna port Quasi Co-Location when the terminal device 1 is configured to receive the DS by higher layer signalling and the terminal device 1 is configured to monitor the EPDCCH.

In a certain serving cell (secondary cell), the terminal device 1 assumes that one or more antenna port that corresponds to the higher layer parameter (qc1-DS-ConfigID) and the antenna ports 107 to 110 are quasi co-located when the terminal device 1 is configured to receive the DS by higher layer signalling and the terminal device 1 is configured to monitor the EPDCCH.

With respect to the DS, various parameters (ds-PortsCount, ds-FreqShift, ds-ConfigZPId, qc1-DS-ConfigNZPId, qd-DS-ConfigID, and the like) may be set in order to determine EPDCCH resource element mapping and EPD-CCH antenna port Quasi Co-Location. That is, the DS antenna port number (ds-PortsCount) may be included in the configuration of the Quasi Co-Location of the EPDCCH and the DS. Furthermore, DS frequency shift (ds-FreqShift) may be included in the configuration of the Quasi Co-Location of the EPDCCH and the DS. Furthermore, zero power DS-ID (ds-ConfigZPId) may be included in the configuration of the Quasi Co-Location of the EPDCCH and the DS. Furthermore, the ID (qd-DS-ConfigNZPId) of the quasi co-located non-zero power DS may be included in the configuration of the Quasi Co-Location of the EPDCCH and the DS.

The Quasi Co-Location with the EPDCCH may change the object signal according to the activation/deactivation state of the serving cells (secondary cells). For example, the terminal device 1 may assume a Quasi Co-Location of the DS and the EPDCCH in the stopping state of the serving cells, and may assume a Quasi Co-Location of the CRS and the EPDCCH in the activated state of the serving cells. Furthermore, the terminal device 1 may assume a Quasi Co-Location of the CSI-RS and the EPDCCH in the stopping state of the serving cells, and may assume a Quasi Co-Location of the CRS and the EPDCCH in the activated state of the serving cells. Furthermore, the terminal device 1 may assume a Quasi Co-Location of the CSI-RS and the EPDCCH in the stopping state of the serving cells, and may assume a Quasi Co-Location of the CSI-RS, the CRS and the EPDCCH in the activated state of the serving cells. That is, the terminal device 1 determines the Quasi Co-Location of the EPDCCH (resource dement mapping and antenna ports) based on the set configuration information. The base station device 3 may transmit information related to a plurality of QCL configurations when the Quasi Co-Location of the EPDCCH is modified in the activated state and the stopping state.

Next, DRX (discontinuous reception) will be described.

The terminal device 1 may configure DRX by RRC involving the DRX function in order to control activation of the PDCCH monitor ring of the terminal device 1 with respect to the C-RNTI of the terminal device 1, the TPC-PUCCH-RNTI, the TPC-PUS CH-RNTI, and the SPS-RNTI (whether or not the PDCCH monitoring is performed). The terminal device 1 continuously monitors the PDCCH if the DRX is not configured. In order to perform the DRX, a plurality of timers (OnDurationTimer, drx-InactivityTimer, drx-RetransmissionTimer, and the like) are configured in the terminal device 1.

Furthermore, the subframe that monitors the PDCCH is configured during the DRX by configuring the cycle (longDRX-Cycle, or shortDRX-Cycle) and the start offset (drxStartOffset). A parameter (drxShortCycleTimer; or shortDRX-Cycle) related to short DRX may be configured as an option. A HARQ RTT timer is defined in every DL HARQ process (excluding the broadcast process). Note that the period in which it is possible to monitor the PDCCH during the DRX is referred to as an active time.

The active time may be a time in which at least one timer is activated out of the plurality of timers (onDurationTimer, drx-InactivityTimer, drx-RetransmissionTimer, and mac-ContentionResolutionTimer). Furthermore, the active time may be a time at which the scheduling request is transmitted using the PUCCH and p ended. Furthermore, the active time may be a time that has an uplink grant with respect to pending HARQ transmission and has data in a corresponding HARQ buffer. Furthermore, the active time may be a time at which the PDCCH that instructs new transmission according to the C-RNTI of the terminal device 1 is not received after successful reception of the random access response with respect to the preamble that is not selected by the terminal device 1. Furthermore, the active time may be a subframe number that is configured as a DRX active time (drx-Activetime).

After the DRX is configured, and when the HARQ RTT timer expires in the subframe with respect to each subframe, or when decoding of the data of the corresponding HARQ process is not successful, the terminal device 1 starts a DRX retransmission timer (drx-RetransmissionTimer) with respect to the corresponding HARQ process.

After the DRX is configured, and when a DRX command MAC control element (MAC CE) is received with respect to each subframe, the terminal device 1 stops a duration timer (onDurationTimer) and a DRX inactivity timer (dix-InactivityTimer).

The duration timer (onDurationTimer) is used in order to specify contiguous PDCCH subframes in an initial stage of the DRX cycle.

The DRX inactivity timer (drx-InactivityTimer) is used to specify the contiguous PDCCH subframe number after the subframe in which the PDCCH that instructs the initial uplink/downlink user data transmission with respect to a certain terminal device 1 is transmitted.

The DRX retransmission timer (drx-RetransmissionTimer) is used to specify the maximum number of contiguous PDCCH subframes until reception of the downlink transmission.

The HARQ RTT timer is used to specify the minimum number (minimum quantity) of the subframes prior to the downlink HARQ transmission being anticipated by the terminal device 1.

A MAC contention resolution timer (mac-ContentionResolutionTimer) is used to specify the number of contiguous subframes in which the terminal device 1 monitors the PDCCH after the message 3 (PUSCH corresponding to the random access response grant) is transmitted.

A DRX short cycle timer (drxShortCycleTimer) is used by the terminal device 1 to specify the number of contiguous subframes that follow the short DRX cycle.

A DRX start offset (drxStartOffset) is used to specify the subframe in which the DRX cycle starts.

The active time is a time that is associated with the DRX operation, to define the period (time) during which the PDCCH is monitored in the PDCCH monitoring subframes by the terminal device 1.

The PDCCH monitoring subframes are fundamentally the same as the PDCCH subframes. However, when it is possible for the terminal device 1 to perform eIMTA in a certain serving cell, the PDCCH monitoring subframes are downlink subframes that are determined according to the TDD UL-DL configuration that are instructed by L1 signalling related to eIMTA (for example, the DCI format in which the eIMTA-RNTI is scrambled) and subframes that include DwPTS.

After the DRX is configured, the terminal device 1 starts (restarts) the DRX short cycle timer (drxShortCycleTimer) and utilizes the short DRX cycle, when, with respect to each subframe, the DRX inactivity timer expires or the DRX command MAC CE is received in the subframe, and furthermore, the short DRX cycle is configured. Otherwise, a long DRX cycle is utilized.

When the DRX is configured, with respect to each subframe, the terminal device 1 utilizes the long DRX cycle if the DRX short cycle timer expires.

When the DRX is configured, with respect to each subframe, the terminal device 1 starts the duration timer when an expression satisfies a prescribed condition based on the system frame number, the subframe number, the short DRX cycle (and/or the long DRX cycle), and the DRX start offset (drxStartOffset).

When the DRX is configured, with respect to each subframe, the terminal device 1 monitors the PDCCH when in an active tune with respect to the PDCCH subframe, the subframe is not necessary with respect to the uplink transmission with respect to the HD-FDD terminal device operation, or there is no part of the measurement gap that is configured by the subframe. Furthermore, the HARQ RTT timer is started with respect to the corresponding HARQ process and the DRX retransmission timer is stopped with respect to corresponding HARQ process when the PDCCH instructs the downlink transmission or when the downlink assignment is configured with respect to the subframe. Furthermore, the DRX inactivity timer starts (or restarts) when the PDCCH instructs new transmission (downlink or uplink).

When the DRX is configured, with respect to each subframe, in the latest subframe n, the terminal device 1 does not transmit the trigger type 0 SRS when the terminal device 1 is not in the active time considering the scheduling request and the grant/assignment/DRX command MAC CE that is received up to the subframe n-5 in which all DRX active time conditions are evaluated (including the subframe n-5).

When the DRX is configured, with respect to each subframe, the terminal device 1 does not report the CQI/PMI/RI/PTI using the PUCCH when the terminal device 1 sets up a CQI mask (cqi-Mask) using the higher layer and when the terminal device 1 is not in the active time considering the grant/assignment/DRX command MAC CE that is received up to the subframe n-5 in which the duration timer evaluates all DRX active time conditions (including the subframe n-5) in the latest subframe n. Otherwise, the terminal device 1 does not report the CQI/PMI/RI/PTI (that is, CSI) using the FUCCH when the terminal device 1 is not in the active time considering the grant/assignment/DRX command MAC CE that is received up to the subframe n-5 in which all DRX active time conditions (including the subframe n-5) are evaluated in the latest subframe n.

The terminal device 1 may receive/transmit the HARQ feedback and transmit the trigger type 1 SRS when there is a possibility of occurrence regardless of whether or not the PDCCH is monitored.

The same active time may be applied to all activated serving cell(s).

In the case of downlink spatial multiplexing, when the transport block is received while the HARQ RTT timer is activated and while the transmission prior to the same transport block is received in the subframe prior to at least N subframes from the latest subframe, the terminal device 1 may carry out the processes for the transport block and restart the HARQ RTT timer. Here, N corresponds to the HARQ RTT timer or a value that is set to the HARQ RTT timer.

The terminal device 1 may perform DS measurement and monitoring of the PDCCH in overlapping subframes and in secondary cells in the stopping state, when the DRX is configured in the primary cells and the configuration of the DS with respect to the secondary cells is set, and when the measurement subframes that are set based on the configuration of the DS overlaps with the PDCCH subframes that are set based on the DRX configuration. The active time of the DRX is applied to the activated serving cells, that is, all serving cells in the activated state, but is not applied to the inactive serving cells, that is, the serving cells in the stopping state. The DRX active time may be applied even if inactive (deactivation, off state, or dormant mode) in the serving cells (or secondary cells) when the DS configuration is set. At that time, the subframe configuration may not be included in the DS configuration. That is, the base station device 3 may transmit the DS based on the DRX active time.

The terminal device 1 may measure the DS in the subframes that are in the active time due to the DRX in the small cells in the stopped state that is set by the DS configuration when the DRX is configured in all activated serving cells.

The terminal device 1 may not perform the DS measurement even if measurement is possible based on the DS measurement subframe with respect to the subframes after expiration when the DRX inactivity timer or the duration timer has expired. That is, the terminal device 1 does not anticipate transmission of the DS in the following DS measurement subframes when the DRX inactivity timer or the duration timer has expired.

The terminal device 1 may perform RRM (RSRP/RSRQ/RSSI) measurement of the DS in the DS transmission subframe of the secondary cells that overlap the DRX active time when the DS configuration with respect to the secondary cells in the stopping state (as small cells) are notified (provided or given) using higher layer signalling in the terminal device 1 that is configured by the DRX The configuration of the DRX (drx-Config) may be individually set for the MCG and the SCG, the primary cell and the primary secondary cell, or the MeNB and the SeNB. The DRX in the SCG may be indicated by the activation/deactivation state of the primary secondary cells. The DS and PDCCH may be transmitted in the DRX subframes when the DRX are configured with respect to the SCG Here, the DRX is configured, but various parameters that are set in the DRX configuration may be set as a configuration of discontinuous transmission (DTX).

The timer (for example, deactivationTimer) that instructs the active time may be activated using L1 signalling with respect to the LAA cells. The RLM may be performed in the cells in which the timer that instructs the active time is configured. That is, in synchronization and out of synchronization may be detected in the cells in which the active time is instructed. That is, the DRX active time may be instructed by L1 signalling when the terminal device 1 supports an L1 level DRX (dynamic DRX). The dynamic DRX may be configured as parameters that are different from the long DRX or the short DRX.

The terminal device 1 is considered to be deactivated and does not perform reception of the downlink signal other than DS when the timer has expired. Note that the terminal device 1 may not perform reception of all downlink signals until the activation command is received when the DS is not configured.

In the present embodiment, the terminal device 1 may notify to the base station device 3 that the function related to dynamic DRX is supported.

The dynamic DRX may be controlled in every cell, and may be commonly controlled between cells. Note that the dynamic DRX may not be applied to the PCell and/or the LTE secondary cells.

Cell search, timing synchronization, and timing with respect to the SCell activation/deactivation may be included in the synchronization procedure in the terminal device 1. Furthermore, RLM, inter-cell synchronization, and transmission timing adjustment may be included in timing synchronization.

The cell search is a procedure in which the terminal device 1 acquires a cell time and frequency synchronization and detects the physical layer cell ID of the cells. The E-UTRA cell search supports all transmission bandwidths that are modifiable corresponding to six resource blocks or more. The PSS/SSS is transmitted in the downlink in order to facilitate the cell search. The terminal device 1 may be quasi co-located (QCL) regarding Doppler shift and average delay by the antenna ports 0 to 3 and the antenna ports with respect to the PSS/SSS of the serving cells.

Next, radio link monitoring (RLM) will be described.

In the RLM, the terminal device 1 monitors the downlink radio link quality of the primary cell to indicate "in synchronization (in-sync)" or "out of synchronization (out-of-sync)" to the higher layer.

In a non-DRX operation, the physical layer of the terminal device 1 evaluates the radio link quality that is evaluated across the previous time period with respect to the thresholds ($Q_{in}$, $Q_{out}$ that are defined based on the tests associated with the RLM in every radio frame (subframe number that constitutes the radio frame).

In the DRX operation, the physical layer of the terminal device 1 evaluates the radio link quality that is evaluated across the previous time period with respect to the thresholds ($Q_{in}$, $Q_{out}$) that are defined based on the tested associated with the RLM in each of at least one DRX cycle (subframe number that constitutes the DRX cycle).

The radio link quality may be monitored in the subframes other than the subframes that are instructed by higher layer signalling when higher layer signalling instructs a certain subframe in order to restrict the RLM. That is, radio link monitoring is performed only in the restricted subframes when the terminal device 1 restricts the subframes that perform RLM by higher layer signalling.

The physical layer of the terminal device 1 indicates out of synchronization (out-of-sync) to the higher layer when the radio link quality is worse than the threshold $Q_{out}$ in the radio frame for the evaluation of the radio link quality: Furthermore, the physical layer of the terminal device 1 indicates in synchronization (in-sync) to the higher layer in the radio frame for the evaluation of the radio link quality, when the radio link quality is better than the threshold $Q_{in}$.

The physical layer of the terminal device 1 that supports dual connectivity may perform RLM with respect to each of the PCells and the PSCells. Furthermore, the threshold according to the radio link quality may be defined with respect to each of the PCells and the PSCells.

The physical layer of the terminal device 1 that supports dual connectivity may individually monitor the radio link quality (out of synchronization, in synchronization) using the PCells and the PSCells.

The physical layer of the terminal device 1 that supports dual connectivity activates the protective timer when out of synchronization is repeated for a prescribed number of times while the radio link quality is evaluated. The physical layer of the terminal device 1 notifies the higher layer that out of synchronization occurs (in other words, a physical layer problem is detected) in the cells, when the protective timer has expired. The higher layer of the terminal device 1 recognizes that radio link failure (RLF) is detected when cells for which the physical layer problem is detected are PCells. At that time, the higher layer of the terminal device 1 may notify to the base station device 3 that RLF is detected in the PCells. Note that the higher layer of the terminal device 1 may not recognize the RLF when the cells for which the physical layer problem is detected are PSCells. Furthermore, the higher layer of the terminal device 1 may perform the similar processes to the PCells when the cells for which the physical layer problem is detected are PSCells.

The terminal device 1 may perform the RLM with respect to the LAA cells when the LAA cells are configured. That is, the terminal device 1 may monitor the downlink radio link quality of the LAA cells.

The downlink radio link quality may be monitored based on the DS when the RLM is performed on the deactivated LAA cells. Furthermore, the downlink radio link quality may be monitored based on the CRS when the RLM is performed on the activated LAA cells.

Next, semi-persistent scheduling (SPS) will be described.

The following information is provided in the terminal device 1 when the semi-persistent scheduling is configured to be valid by the RRC layer (higher layer signalling, or higher layer). The information provides an uplink semi-persistent scheduling interval (semiPersistSchedIntervalUL) and a number of empty transmissions prior to implicit release (implicitReleaseAfter) when semi-persistent scheduling C-RNTI and uplink semi-persistent scheduling are valid, and the information provides a downlink semi-persistent scheduling interval (semiPersistSchedIntervalDL) and a number of HARQ processes that are configured with respect to semi-persistent scheduling (numberOfConfSPS-Processes) when whether or not a two interval configuration (twoIntervalConfig) in only the TDD is valid with respect to uplink is valid in downlink semi-persistent scheduling.

The corresponding configured grant or the configured assignment is ignored when uplink or downlink semi-persistent scheduling is configured to be invalid by the RRC layer (higher layer signalling, or higher layer).

The semi-persistent scheduling is supported only in the primary cells.

The semi-persistent scheduling is not supported in RN communication of the E-UTRAN of a combination involving the RN subframe configuration.

After the semi-persistent downlink assignment is configured, when N assignments are generated, the terminal device 1 considers the assignments to be continuous in the subframes with the system frame number that satisfies a certain condition. Here, a certain condition may be determined based on the system frame number ($SFN_{start\_time}$) and the subframe ($subframe_{start\_time}$) when the downlink assignment that is configured in the terminal device 1 is initialized (or reinitialized).

After the semi-persistent uplink grant is configured, the terminal device 1 sets the subframe offset (Subframe_Offset) based on a certain table when two interval configurations are configured to be valid in the higher layer, and otherwise, sets the subframe offset to 0.

After the semi-persistent scheduling uplink grant is configured, when N grants are generated, the terminal device 1 considers the assignments to be continuous in the subframes with the system frame number that satisfies a certain condition. Here, a certain condition may be determined based on the system frame number ($SFN_{start\_time}$) and the subframe ($subframe_{start\_time}$) when the uplink grant that is configured in the terminal device 1 is initialized (or reinitialized).

The configured uplink grant is clear by the terminal device 1 immediately after the number of empty transmissions prior to implicit release of a continuous MAC protocol data unit (PDU) that includes a zero MAC service data unit (SDU) is given by being constituted by multiple entities.

SPS may be performed in the primary secondary cells and not only the primary cells when the function of performing dual connectivity in the terminal device 1 is supported. That is, the SPS configuration may be set even with respect to the primary secondary cell and not only the primary cells.

Only the SPS may be applied with respect to the primary cells when only one SPS configuration is set in the terminal device 1 that supports the function of performing dual connectivity.

The same configuration may be applied to the primary cells and the primary secondary cells when only one SPS configuration is set in the terminal device 1 that supports the function of performing dual connectivity.

The downlink SPS configuration and/or the uplink SPS configuration may be individually set in each of the primary cells and the primary secondary cells in the terminal device 1 that supports the function of performing dual connectivity. That is, the downlink SPS configuration and/or the uplink SPS configuration may be common and may be respectively individually set in the primary cells and the primary secondary cells. Whether or not the downlink and/or uplink SPS are individually performed in the primary cells and the primary secondary cells may be determined based on the function information that is transmitted from the terminal device 1.

The number of empty transmissions may indicate OFDM symbol units with respect to LAA cells or the cells in which a parameter related to the LBT are configured. Furthermore, the number of empty transmissions may indicate the maximum transmission symbol number.

Next, the PDCCH and the EPDCCH that are transmitted using the primary secondary cells will be described.

The PDCCH that is transmitted using the primary secondary cells may be scrambled using the parameter that is common to the plurality of terminal devices and/or a parameter that is specified in advance. Note that scrambling is carried out using the physical cell identifier when the common parameter to the plurality of terminal devices is not configured.

The PDCCH that is transmitted using the primary secondary cells may be cyclically shifted at the REG unit based on the parameter that is common to the plurality of terminal devices and/or a parameter that is specified in advance. Note that cyclical shifting is carried out based on the value of the physical cell identifier when the common parameter to the plurality of terminal devices is not configured.

The USS and the search space that is different from the USS are arranged in the primary secondary cells. The search space that is different from the USS is a search space that monitors a common region to the plurality of terminal devices. The CSS that are allocated to the primary cells may also be referred to as first CSS, and a search space that is different from the USS that are allocated to the primary secondary cells may also be referred to as second CSS.

The second CSS is a search space that is configured using a parameter common to a plurality of terminal devices and/or a parameter that is specified in advance. The parameter that is common to the plurality of terminal devices is notified from the higher layer. As an example of the parameter that is common to the plurality of terminal devices, a parameter specific to the base station device 3 (cells or transmission points) is used. For example, the virtual cell identifier, TPID, and the like are used as the parameter that is specific to the transmission points. As an example of the parameter that is common to the plurality of terminal devices, there is a parameter that is configured by a value common to a plurality of terminals that have parameters that are individually configurable in the terminal devices. For example, the RNTI and the like are used as the parameter for which the value common to the plurality of terminal devices is configured.

The PDCCH may be allocated to the second CSS. In this case, for the second CSS, the CCE that is started by a search space is determined by using a parameter common to the plurality of terminal devices and/or the parameter that is specified in advance. Specifically, the RNTI (for example, UE-group-RNTI or CSS-RNTI) that is common to the plurality of terminals is configured in the initial value of $Y_k$ that is used in expression (1) in FIG. 14. Furthermore, the CEE that is started by the search space of the second CSS may be designated in common to a terminal by the higher layer parameter: Specifically, $Y_k$ that is used in expression (1) in FIG. 14 is a value that is always fixed and is set by the higher layer parameter (for example, a parameter that designates the CCE index). Furthermore, $Y_k$ may always be set to 0.

The aggregation level of the second CSS that is allocated to the PDCCH supports 4 and 8. Furthermore, four PDCCH candidates are defined at the aggregation level 4 and two PDCCH candidates are defined at the aggregation level 8. Note that the aggregation levels 1, 2, 16, and 32 may be supported. In this case, a blind decoding number is not raised in the second CSS by restricting the PDCCH candidate number. For example, when 2, 4, and 8 are supported at the aggregation level of the second CSS, two PDCCH candidates are defined at each aggregation level.

The EPDCCH may be allocated to the second CSS. In this case, for the second CSS, the ECCE that is started by a search space is determined by using a parameter common to the plurality of terminal devices and/or the parameter that is specified in advance. Specifically, the RNTI (for example, UE-group-RNTI or CSS-RNTI) that is common to the plurality of terminals is configured in the initial value of $Y_{p,k}$ that is used in expression (2) in FIG. 14. Furthermore, the ECEE that is started by the search space of the second CSS may be designated in common to a terminal by the higher layer parameter. Specifically, $Y_{p,k}$ that is used in expression (2) in FIG. 14 is a value that is always fixed and is set by the higher layer parameter (for example, a parameter that designates the ECCE index). Furthermore, $Y_{p,k}$ may always be set to 0.

The EPDCCH set that is allocated to the second CSS may be configured when the EPDCCH is allocated to the second CSS. For example, the EPDCCH set 0 may allocated to the USS, and the EPDCCH set 1 may be allocated to the second CSS. Furthermore, one EPDCCH set may be allocated to the USS and the second CSS. For example, the EPDCCH set 0 may be allocated to the USS and the second CSS.

The aggregation level of the second CSS that is allocated to the EPDCCH supports 4 and 8. Furthermore, four EPDCCH candidates are defined at the aggregation level 4 and two EPDCCH candidates are defined at the aggregation level 8. Note that the aggregation levels 1, 2, 16, and 32 may be supported. In this case, a blind decoding number is not raised in the second CSS by restricting the PDCCH candidate number. For example, when 2, 4, and 8 are supported at the aggregation level of the second CSS, two PDCCH candidates are defined at each aggregation level.

An example of the type of RNTI that is used in the PDCCH monitoring in the second CSS will be described.

It is possible to allocate a PDCCH that performs notification of at least a random access response, a PDCCH that instructs the TPC command with respect to a specific terminal device 1, or a PDCCH that performs notification of the TDD UL/DL configuration, in the second CSS. Furthermore, it is necessary to perform transmission from the SeNB even during RRC reconfiguration when a backhaul delay between the MeNB and the SeNB is large. That is, the terminal device 1 monitors the PDCCH that is allocated to the second CSS using a RA-RNTI, a TPC-PDCCH-RNTI, a TPC-PUSCH-RNTI, an eIMTA-RNTI, a C-RNTI, an SPS C-RNTI, and a temporary C-RNTI.

Meanwhile, it is not necessary to allocate the PDCCH to which system information or information related to paging is allocated in the second CSS. Furthermore, it is not necessary to allocate the PDCCH to which the downlink/uplink grant is allocated for transmission using a lower transmission method that is necessary during reconfiguration of the RRC since the primary secondary cells are used in the RRC connection mode. That is, the terminal device 1 may not monitor the PDCCH that is allocated to the second CSS using the SI-RNTI and the P-RNTI An example of the type of RNTI that is used in the PDCCH monitoring in the second CSS will be described.

It is possible to allocate a PDCCH that performs notification of at least a random access response, a PDCCH that instructs the TPC command with respect to a specific terminal device 1, or a PDCCH that performs notification of the TDD UL/DL configuration, in the second CSS. That is, the terminal device 1 monitors the PDCCH that is allocated to the second CSS using at least the RA-RNTI, the TPC-PDCCH-RNTI, the TPC-PUSCH-RNTI, and a TDD-ModeA-RNTI.

Meanwhile, it is not necessary to allocate the PDCCH to which system information or information related to paging is allocated in the second CSS. Furthermore, it is not necessary to allocate the PDCCH to which the downlink/uplink grant is allocated for transmission using a lower transmission method that is necessary during reconfiguration of the RRC since the primary secondary cells are used in the RRC connection mode. That is, the terminal device 1 may not monitor the PDCCH that is allocated to the second CSS using the SI-RNTI, the P-RNTI, the C-RNTI, the SPS C-RNTI, and the temporary C-RNTI.

Note that the PDCCH that includes information that instructs the activation/deactivation state of the cells in the second CSS may be allocated. That is, the terminal device 1 monitors the PDCCH that is allocated to the second CSS using the RNTI (SCE-RNTI) associated with the small cell on/off.

The terminal device 1 raises the blind decoding number in the primary secondary cells using the second CSS. Specifically, both of the USS and the second CSS are allocated to the primary secondary cells, while only the USS is allocated to the secondary cells. The blind decoding number of 12 times is raised and the load on the terminal device 1 increases when the blind decoding number of the second CSS is equal to the blind decoding number of the first CSS.

An example of reducing the blind decoding number in the second CSS will be described.

It is possible to reduce the blind decoding number in the second CSS by not allocating the DCI format 0/1A to the second CSS when the PDCCH that is allocated to the second CSS is not monitored using the C-RNTI, the SPS C-RNTI, and the temporary C-RNTI.

At this time, the DCI format 3/3A is padded in accordance with a payload size of the DCI format 1C. Or a new DCI format (DCI format 3B) at which the TPC command is transmitted is configured.

The DCI format 3B is used for transmission of the TPC command with respect to the PUCCH and the PUSCH according to power adjustment of one bit. The terminal devices 1 are able to detect the value of the transmit power control command that corresponds to the PUSCH or the PUCCH by detecting the bit information that corresponds to the index (TPC-index) that is assigned to the local station. Furthermore, the DCI format 3B discriminates whether the transmit power control command related to the PUSCH is indicated or the transmit power control command related to the PUCCH is indicated according to the scrambled RNTI type. The DCI format 3B is padded in accordance with the payload size of the DCI format 1C.

Thereby, it is possible to reduce the blind decoding number since only the control information of the same payload size as the DCI format 1C is allocated to the second CSS. Specifically, in the second CSS, decoding of the DCI format of six PDCCH candidates and one type of bit size in aggregation 4 is attempted or decoding of the DCI format of two PDCCH candidates and one type of bit size in the aggregation 8 is attempted. That is, the terminal device 1 attempts decoding six times in the second CSS. Thereby, it is possible to halve the blind decoding number in the CSS.

An example of reducing the blind decoding number in the second CSS will be described.

The DCI format 1C inserts a padding bit until the payload size is the same as in the DCI format 0 in the second CSS. Thereby, it is possible to reduce the blind decoding number since only the control information of the same payload size as the DCI format 0 is allocated to the second CSS. Specifically, in the second CSS, decoding of the DCI format of six PDCCH candidates and one type of bit size in aggregation 4 is attempted or decoding of the DCI format of two PDCCH candidates and one type of bit size in the aggregation 8 is attempted. That is, the terminal device 1 attempts decoding six times in the second CSS. Thereby, it is possible to halve the blind decoding number in the CSS.

From the viewpoint of raising the blind decoding number, it is not necessary for all terminal devices 1 to support monitoring of the second CSS. Therefore, information (capability) that indicates the capability of whether or not it is possible for the terminal device 1 to monitor the second CCS may be notified to the base station device 3.

The terminal device 1 with high process capability notifies information that indicates that monitoring of the second CSS is possible to the base station device 3. Meanwhile, the terminal device 1 with low process capability notifies information that indicates that monitoring of the second CSS is not possible to the base station device 3. The base station device 3 acquires information that indicates the capability of whether or not it is possible to monitor the second CSS from each terminal device 1 and performs configuration of the second CSS in only the terminal device 1 that is able to monitor the second CSS. Here, the base station device 3 may configure the terminal device 1 that is able to monitor the second CSS as the UE group.

The base station device 3 allocates the PDCCH to the second CSS with respect to the terminal device 1 that is able to monitor the second CSS and performs notification of a random access response, notification of the TDD UL/DL configuration, and the like.

The base station device 3 allocates the PDCCH to the USS with respect to the terminal device 1 that is not able to monitor the second CSS and performs notification of a random access response, notification of the TDD UL/DL configuration, and the like. At this time, from the viewpoint of the blind decoding number, notification of the random access response uses the DCI format 1A, or the DCI format 1C that is used in notification of the TDD UL/DL configuration is padded up to the same payload size as the DCI format 0.

Thereby, it is possible to perform notification of the random access response, notification of the TDD UL/DL configuration, and the like with respect to the terminal device 1 with a low process capability such that it is not possible to monitor the second CSS.

Note that information that indicates the capability of whether or not it is possible to monitor the second CSS may be notified in association with information that indicates whether or not it is possible to operate in the dual connectivity mode. That is, it may be possible to monitor the second CSS if the operation is possible in the dual connectivity mode.

A process of the terminal device 1 and the base station device 3 when information that instructs the activation/deactivation state with respect to the secondary cells of the small cells is transmitted using the DCI format (PDCCH/EPDCCH that accompanies the DCI format), will be described.

1 bit may be set that instructs the activation/deactivation state with respect to each of the plurality of cells (small cells, secondary cells, and serving cells) in a certain DCI format. For example, when the DCI format including information that instructs the activation/deactivation state is constituted by 15 bits, 15 cells of information that instructs the activation/deactivation state may be included. That is, the activation/deactivation state may be indicated using one bit. Furthermore, when the activated state is indicated using that one bit, a CSI request may be recognized with respect to the cells that correspond to that one bit simultaneously. When the activated state is indicated using that one bit, the CSI that corresponds to that one bit is transmitted on an initial uplink subframe a prescribed subframe after reception. Furthermore, the position of bits that constitute the DCI format and the cell index (for example, the serving cell index, the small cell index, the on/off cell index, and the like) may be associated in advance.

Note that only the activated state may be instructed in the DCI formal. For example, in one bit, "1" indicates activation and "0" indicates that the state is the same as the previous state. In this case, preferably another method is used in combination that instructs the stopping state of the deactivation timer and the like.

Note that only the stopping state may be instructed in the DCI format. For example, in one bit, "1" indicates stop and "0" indicates that the state is the same as the previous state. In this case, preferably another method that instructs the activated state such as notification of activation by the MAC CE and the like is used in combination.

n bits may be set that instructs the activation/deactivation state with respect to each of the plurality of cells (small cells, secondary cells, and serving cells) in a certain DCI format. For example, when the DCI format including information that instructs the activation/deactivation state is constituted by 15 bits, 15/n cells of information that instructs the activation/deactivation state may be included. That is, the activation/deactivation state may be indicated using n bits. For example, information that is notified using n bits is information an the activation/deactivation state of the cells of n subframes. Each bit in n bits corresponds to the subframe. Specifically, information that is notified using eight bits is information that instructs the activation/deactivation state of eight subframes. For example, information that is notified using n bits is information that indicates a subframe pattern in the activation/deactivation state. The subframe pattern of the activation/deactivation state may be defined in advance. The subframe pattern of the activation/deactivation state may b e notified in the higher layer. Specifically, information that is notified using two bits indicates four subframe patterns. The length of the bit that instructs the activation/deactivation state is determined according to the maximum number of the type of subframe pattern. The maximum number of types of subframe patterns may be configured by the higher layer.

The PDCCH/EPDCCH including information that instructs the activation/deactivation state is scrambled by the RNTI (for example, the SCE-RNTI) for indicating the activation/deactivation state. The terminal device 1 recognizes that information is included that indicates the activation/deactivation state in the PDCCH/EPDCCH when a certain PDCCH/EPDCCH is successfully decoded by the SCE-RNTI. Thereby, the terminal device 1 can recognize that there is information for indicating the activation/deactivation state even if the information that indicates the activation/deactivation state is included in the same DCI format as other control information.

Note that information that instructs the activation/deactivation state with respect to the secondary cells of the small cells may be bundled in the DCI that includes other control information that is scrambled using another RNTI. For example, the stopping state of the cells may be indicated using the state of the UL/DL configuration 7 in the dynamic TDD. In other words, UL/DL configurations 1 to 6 may indicate the activated state of the cells. Furthermore, for example, the activation/deactivation state of the cells may be instructed using extra bits other than information that indicates the UL/DL configuration in the dynamic TDD. Furthermore, for example, the activation/deactivation state of the cells may be instructed using extra bits other than information that notifies the TFC command.

Note that information that instructs the activated state with respect to the secondary cells may be notified by configuring the field in the DCI format that instructs the downlink grant/uplink grant. For example, the field of three bits that instructs the serving cells are configured in the DCI format 4 or the DCI format 2. The terminal device 1 recognizes that the serving cells that are instructed in the DCI format of the downlink grant/uplink grant are in the activated state.

Note that information that instructs the stopping state with respect to the secondary cells may be notified by configuring the field in the DCI format that instructs the downlink grant/uplink grant. For example, the field of three bits that instructs the serving cells are configured in the DCI format 4 or the DCI format 2. The terminal device 1 recognizes that the serving cells that are instructed in the DCI format of the downlink grant/uplink grant are in the stopping state.

Preferably the activation/deactivation state is not instructed across a plurality of cell groups in the DCI format including information that instructs the activation/deactivation state. For example, information that instructs the activation/deactivation state that corresponds to the secondary cells that belong to a master cell group and information that instructs the activation/deactivation state that corresponds to the secondary cells that belong to a secondary cell group are not included in one DCI format. In other words, information that instructs the activation/deactivation state that is included in one DCI format corresponds to only the serving cells that belong to one cell group.

The DCI format including information that instructs the activation/deactivation state of the cells that belong to the master cell group is allocated to the first CSS of the primary cells. From the viewpoint of the blind decoding process load, preferably the DCI format including information that instructs the activation/deactivation state has the same bit number as another DCI format that is allocated to the first CSS. Specifically, i the DCI format including information that instructs the activation/deactivation state is allocated to the first CSS by padding by the bit such that the payload size is the same as in the DCI format 0/1A/3/3A or the DCI format 1C. The terminal device 1 monitors the CSS of the primary cells and acquires the activation/deactivation state of a plurality of secondary cells (small cells) of the cell group to which the primary cells belong using the DCI format. Thereby, it is easy to notify to a plurality of terminal devices using one PDCCH and an overhead is reduced.

The DCI format including information that instructs the activation/deactivation state of the cells that belong to the secondary cell group is allocated to the SS of the primary secondary cells. Preferably the DCI format including information that instructs the activation/deactivation state of the cells that belong to the secondary cell group is allocated to the SS that it is possible for the plurality of terminal devices of the primary secondary cells to monitor. For example, the DCI format including information that instructs the activation/deactivation state of the cells that belong to the secondary cell group is allocated to the second CSS. From the viewpoint of the blind decoding process load, preferably the DCI format including information that instructs the activation/deactivation state has the same bit number as another DCI format that is allocated to the second CSS. Specifically, the DCI format including information that instructs the activation/deactivation state is allocated to the CSS by padding by the bit such that due payload size is the same as in the DCI format 0/1A/3/3aA or the DCI format 1C. The terminal device 1 monitors the second CSS of the primary secondary cells and acquires the activation/deactivation state of a plurality of secondary cells (small cells) of the cell group to which the primary secondary cells belong using the DCI format. Thereby, it is easy to notify to a plurality of terminal devices using one PDCCH/EPDCCH and an overhead is reduced.

Note that the DCI format in which, information that instructs the activation/deactivation state of the cells is included may be allocated to the USS of the cells, hi this case, information of one bit that instructs the activation/deactivation state may be notified.

The terminal device 1 may continue to recognize the activation/deactivation state that is instructed by the previously transmitted DCI format until instruction by the subsequent DCI format that instructs the activation/deactivation state of the cells. In this case, preferably the DCI format that instructs the activation/deactivation state of the cells is cyclically transmitted. The cycle and timing (subframe) at which the DCI format is transmitted that instructs the activation/deactivation state is notified to the terminal device 1. The cycle at which the DCI format is transmitted that instructs the activation/deactivation state is, for example, one radio frame (10 subframes) or one half frame (five subframes). The timing at which the DCI format is transmitted that instructs the activation/deactivation state is, for example, the subframe 0 or the subframe 5. By cyclically transmitting, it is possible to explicitly recognize a period in which the terminal device 1 recognizes the activation/deactivation state.

The terminal device 1 may modify so as to recognize the stopping state prior to instructing by the subsequent DCI format that instructs the activation/deactivation state of the cells. In this case, for example, a timer (small cell deactivation timer) is set for transitioning to the stopping state, and when the tinier is exceeded, the terminal device 1 recognizes the stopping state prior to receiving an instruction from the base station device 3.

The instruction of the activation/deactivation state with respect to each of the serving cells and the cells in which the transmission points are different (neighbor cells and transmission points) may be performed using the DCI format. In this case, preferably the serving cells and the cells in which the transmission points are different are connected using a low delay backhaul such as optical fiber.

The PDCCH with respect to the LAA cells is used to define the RNTI and the index for indicating the activation/deactivation state of the small cells (or secondary cells/serving cells that are equivalent to small cells). The function of the small cells on/off may be set up or released with the configuration.

The RNTI (for example, the SCE-RNTI and LAA-RNTI) that indicates that the DCI format is a DCI format that instructs the activation/deactivation state of the small cells (serving cells) may be included in the PDCCH configuration with respect to the LAA cells.

Furthermore, a list of the index of the small cells indicating the activation/deactivation state in the DCI format may be included in the PDCCH configuration with respect to the LAA cells. According to the list, the activation/deactivation state may be notified to a specific small cell. For example, the terminal device 1 may not check the activation/deactivation state with respect to all bits and may check the activation/deactivation state of only the bit that corresponds to the index that is indicated by the list when a certain DCI format is constituted by 15 bits. All other bits may be recognized as being in the stopping state.

The terminal device 1 recognizes that the cells are in the activated state in subframe i+k (k is a prescribed value) when the DCI format is detected that includes information that indicates the activated state in a certain cell in a certain subframe i (i=0, 1, 2, . . . ). The same process may be performed for the stopping state. Note that the value of k may be different between the activated state and the stopping state.

The first DCI format size may be the same as other DCI format sizes when the information that instructs the activation/deactivation state is included in the first DCI format. It is possible to configure new instruction information without raising the blind decoding number by matching the size of the DCI format. A bit that is not used as control information may be padded when the transmitted control information number (type), necessary bit number, and the like are different between the first DCI format and the second DCI format.

Furthermore, bits other than bits that are necessary in information that instructs the activation/deactivation state may be removed when information that instructs the activation/deactivation state is included in the first DCI format. That is, the first DCI format size may be increased and decreased according to need.

When the activated state is instructed according to information that instructs the activation/deactivation state, the terminal device 1 may perform the CSI measurement with respect to the cells in which the activated state is indicated and perform CSI reporting in the initial uplink subframe after the prescribed subframe.

URS (or DMRS) may be transmitted in the same subframe in order to demodulate and decode the PDCCH/EPDCCH when the PDCCH/EPDCCH and DS are transmitted in the same subframe.

The terminal device 1 may demodulate and decode the PDCCH/EPDCCH using the DS (one out of a plurality of signals that constitute the DS) when the PDCCH/EPDCCH and DS are transmitted in the same subframe.

When the configuration of the DS is set with respect to a certain cell by higher layer signalling, and when the measurement result are not satisfied in the measurement subframe of the DS with respect to a certain cell the prescribed number of times, reconfiguration of the DS may be requested using the primary cells.

The value that is configurable in the deactivation timer may be a subframe unit with respect to the LAA cells.

A first deactivation timer and a second deactivation timer may be configured with respect to the LAA cells. The first deactivation timer and the second deactivation timer may be configured to have different values.

A plurality of duration timers may be configured with respect to the LAA cells. A first duration timer corresponds to the DRX cycle and the second duration timer may be activated when activation is instructed by L1 signalling. The first duration timer and the second duration timer may be configured in every LAA cell group, may be configured in every serving cell, and may be configured in every terminal device 1.

Next, the CSI measurement of the terminal device 1 and the CSI report will be described in detail.

The CSI is constituted by a channel quality indicator (CQI), a preceding matrix indicator (PMI), a precoding type indicator (PTI), and/or a rank indicator (R3). The RI indicates the number (rank number) of transmission layers. The PMI is information that indicates a precoding matrix specified in advance. The PMI indicates one precoding matrix using one set of information or two sets of information. The PMI when using two sets of information is also referred to as first PMI and second PMI. The CQI is information that indicates combination of a modulation scheme and a coding rate specified in advance. A recommended CSI is reported to the base station device 3. A terminal device 2 reports CQI that satisfies a prescribed reception quality to every transport block (codeword).

The subframes that are able to cyclically report the CSI (reporting instances) are determined by the report cycle and the subframe offset based on the information that is configured by the higher layer (CQIPMI index and RI index). Note that information that is configured by the higher layer is configurable in every subframe set that is configured to measure the CSI. The information may be considered to be common between subframe sets when only one set of information is configured with respect to the plurality of subframes sets.

One P-CSI report with respect to each serving cell is configured by higher layer signalling with respect to the terminal device 2 that is configured by transmission modes 1 to 9.

One or more P-CSI reports with respect to each serving cell is configured by higher layer signalling with respect to the terminal device 2 that is configured by transmission mode 10.

Eight CSI-RS ports are configured with respect to the terminal device 2 that is configured by the transmission mode 9 or 10, and a single PMI report mode (mode 1-1) in a wide band CQI is configured in a submode 1 or submode 2 using a certain parameter (PUCCH_format 1-1_CSI_reporting_mode) by higher layer signalling.

The CQI report in a certain subframe of a certain serving cell is a channel quality report in a specific part (portion) of a bandwidth of the serving cells that are indicated as the bandwidth part with respect to a terminal selection subband CQI (UE-selected subband CQI).

The CSI report type supports the PUCCH CSI report mode. The CSI report type may also be referred to as the PUCCH report type (PUCCH reporting type). A type 1 report supports CQI feedback with respect to the terminal selection subband A type 1a report supports the subband CQI and second PMI feedback. A type 2, a type 2b, and a type 2c report support a wideband CQI and PMC feedback. The type 2a report supports wideband PMI feedback. The type 3 report supports RI feedback. A type 4 report supports the wideband CQI. A type 5 report supports the RI and the wideband PMI feedback. A type 6 report supports RI and FIT feedback.

Next, CSI measurement and the CSI report of the terminal device 1 in the base station device 3 that supports the activation state and the deactivation state will be described in detail.

The terminal device 1 is configured by information related to the CSI measurement and the CSI report from the base station device 3. The CSI measurement is performed based on the reference signal and/or the reference resource (for example, the CRS, the CSI-RS, the CSI-IM resource, and/or the DS). The reference signal that is used in the CSI measurement is determined based on the configuration and the like of the transmission mode. The CSI measurement is performed based on the channel measurement and interference measurement. For example, the channel measurement measures desired cell power. The interference measurement measures power other than a desired cell and noise power.

For example, the terminal device 1 performs the channel measurement and the interference measurement based on the CRS. As another example, the terminal device 1 performs the channel measurement based on the CSI-RS and performs the interference measurement based on the CRS. As another example, the terminal device 1 performs the channel measurement based on the CSI-RS and performs the interference measurement based on the CSI-IM resource. As another example, the terminal device 1 performs the channel measurement and the interference measurement based on the DS.

The terminal device 1 is able to perform CSI measurement considering the activation state and the deactivation state of the base station device 3. For example, the terminal device 1 is able to consider the activation state and the deactivation state of the base station device 3 with respect to the reference signal and/or the reference resource for performing CSI measurement. Note that the reference signal in the CSI measurement including the reference resource is described below, hi particular, the reference signal for interference measurement is interchangeably used with the resource that is referenced for the interference measurement. That is, the resource for interference measurement may not map the signal. Therefore, it is possible to determine whether the resource for interference measurement is valid or invalid according to the activation state and the deactivation state of the base station device 3.

For example, in CSI measurement, the terminal device 1 assumes that the reference signal for channel measurement is transmitted only when the base station device 3 is in the activation state, and the reference signal for interference measurement is transmitted only when the base station device 3 is in the activation state. That is, the terminal device 1 assumes that the reference signal for channel measurement is transmitted by a subframe when the base station device 3 is in the activation state, and the reference signal for channel measurement is not transmitted by a subframe when the base station device 3 is in the deactivation state. The terminal device 1 assumes that the reference signal for interference measurement is transmitted by a subframe when the base station device 3 is in the activation state, and the reference signal for interference measurement is not transmitted by a subframe when the base station device 3 is in the deactivation state. In other words, the terminal device 1 performs channel measurement based on the reference signal transmitted by a prescribed subframe out of the subframes when the base station device 3 is in the activation state, and performs interference measurement based on the reference signal transmitted by a prescribed subframe out of the subframes when the base station device 3 is in the activation state. Thereby, the base station device 3 in the deactivation state can stop the reference signal for CSI measurement in the terminal device 1.

As another example, in CSI measurement, the terminal device 1 assumes that the reference signal for channel measurement is transmitted only when the base station device 3 is in the activation state, and the reference signal for interference measurement is transmitted when the base station device 3 is in the activation state and in the deactivation state. That is, the terminal device 1 assumes that the reference signal for channel measurement is transmitted by a subframe when the base station device 3 is in the activation state, and the reference signal for channel measurement is not transmitted by a subframe when the base station device 3 is in the deactivation state. The terminal device 1 assumes that the reference signal for interference measurement is transmitted by a subframe when the base station device 3 is in the activation state and the deactivation state. In other words, the terminal device 1 performs channel measurement based on the reference signal transmitted by a prescribed subframe out of the subframes when the base station device 3 is in the activation state, and performs interference measurement based on the reference signal transmitted by a prescribed subframe out of the subframes when the base station device 3 is in the activation state and in the deactivation state. Thereby, the base station device 3 in the deactivation state can stop the reference signal for channel measurement in the terminal device 1. Furthermore, the terminal device 1 can perform interference measurement regardless of the state of the base station device 3 (i.e., the activation state or the deactivation state), and thus, precision of processes such as averaging in the time direction in the interference measurement performed by the terminal device 1 may be improved.

As another example, in CSI measurement, the terminal device 1 assumes that the reference signal for channel measurement is transmitted when the base station device 3 is in the activation state and in the deactivation state, and the reference signal for interference measurement is transmitted only when the base station device 3 is in the activation state. That is, the terminal device 1 assumes that the reference signal for channel measurement is transmitted by a subframe when the base station device 3 is in the activation state and the deactivation state. The terminal device 1 assumes that the reference signal for interference measurement is transmitted by a subframe when the base station device 3 is in the activation state, and the reference signal for interference measurement is not transmitted by a subframe when the base station device 3 is in the deactivation state. In other words, the terminal device 1 performs channel measurement based on the reference signal transmitted by a prescribed subframe out of the subframes when the base station device 3 is in the activation state and in the deactivation state, and performs interference measurement based on the reference signal transmitted by a prescribed subframe out of the subframes when the base station device 3 is in the activation state. Thereby, the base station device 3 in the deactivation state can stop the reference signal for interference measurement in the terminal device 1. Furthermore, the terminal device 1 can perform channel measurement regardless of the state of the base station device 3 (i.e., the activation state or the deactivation state), and thus, precision of processes such as averaging in the time direction in the channel measurement performed by the terminal device 1 may be improved.

As another example, in CSI measurement, the terminal device 1 assumes that the reference signal for channel measurement is transmitted when the base station device 3 is in the activation state and in the deactivation state, and the reference signal for interference measurement is transmitted when the base station device 3 is in the activation state and in the deactivation state. That is, the terminal device 1 assumes that the reference signal for channel measurement is transmitted by a subframe when the base station device 3 is in the activation state and the deactivation state. The terminal device 1 assumes that the reference signal for interference measurement is transmitted by a subframe when the base station device 3 is in the activation state and the deactivation state. In other words, the terminal device 1 performs channel measurement based on the reference signal transmitted by a prescribed subframe out of the subframes when the base station device 3 is in the activation state and in the deactivation state, and performs interference measurement based on the reference signal transmitted by a prescribed subframe out of the subframes when the base station device 3 is in the activation state and in the deactivation state. Thereby, the terminal device 1 can perform CSI measurement even when the base station device 3 in the deactivation state stops transmission of the signal other than a reference and the channel. Furthermore, the terminal device 1 can perform interference measurement regardless of the state of the base station device 3 (i.e., the activation state or the deactivation state), and thus, precision of processes such as averaging in the time direction in the CSI measurement performed by the terminal device 1 may be improved.

Next, a specific example of the reference signal for channel measurement and interference measurement will be described.

The terminal device 1 configured in the prescribed transmission mode performs channel measurement for calculating the CQI value. The CQI value is reported using the prescribed subframe and corresponds to a certain CSI process. The channel measurement is performed based on only a non-zero power CSI-RS in the configuration of the CSI-RS resource that is associated in the CSI process. When the RRC parameter related to the activation state and the deactivation state is configured using the higher layer with respect to the terminal device 1 that is configured in the prescribed transmission mode in the CSI process, the CSI-RS resource in the subframe in the activation state is used to perform channel measurement.

The terminal device 1 configured in the prescribed transmission mode performs channel measurement for calculating the CQI value. The CQI value is reported using the prescribed subframe and corresponds to a certain CSI process. The channel measurement is performed based on only a non-zero power CSI-RS in the configuration of the CSI-RS resource that is associated in the CSI process. When the RRC parameter related to the activation state and the deactivation state is configured using the higher layer with respect to the terminal device 1 that is configured in the prescribed transmission mode in the CSI process, the CSI-RS resource in the subframe in the activation state and in the deactivation state is used to perform channel measurement.

The terminal device 1 configured in the prescribed transmission mode performs interference measurement for calculating the CQI value. The CQI value is reported using the prescribed subframe and corresponds to a certain CSI process. The interference measurement is performed based on only a zero power CSI-RS in the configuration of the CSI-IM resource that is associated in the CSI process. When the CSI subframe set is configured using the higher layer with respect to the terminal device 1 that is configured in the prescribed transmission mode in the CSI process, the CSI-IM resource in a subset of the subframe that belongs to the CSI reference resource is used to perform interference measurement. When the RRC parameter related to the activation state and the deactivation state is configured using the higher layer with respect to the terminal device 1 that is configured in the prescribed transmission mode in the CSI process, the CSI-RS resource in the subframe in the activation state is used to perform interference measurement.

The terminal device 1 configured in the prescribed transmission mode performs interference measurement for calculating the CQI value. The CQI value is reported using the prescribed subframe and corresponds to a certain CSI process. The interference measurement is performed based on only a zero power CSI-RS in the configuration of the CSI-IM resource that is associated in the CSI process. When the CSI subframe set is configured using the higher layer with respect to the terminal device 1 that is configured in the prescribed transmission mode in the CSI process, the CSI-IM resource in a subset of the subframe that belongs to the CSI reference resource is used to perform interference measurement. When the RRC parameter related to the activation state and the deactivation state is configured using the higher layer with respect to the terminal device 1 that is configured in the prescribed transmission mode in the CSI process, the CSI-RS resource in the subframe in the activation state and in the deactivation state is used to perform interference measurement.

Note that in the description of the present embodiment, the RRC parameter related to the activation state and the deactivation state is configured using the higher layer. The configuration of the RRC parameter related to the activation state and the deactivation state is also referred to as a configuration for cell state information. The configuration for the cell state information is used for cell state information that is implicitly or explicitly notified in the physical layer. For example, the configuration for the cell state information includes information that is necessary for receiving cell state information that is implicitly or explicitly notified in the physical layer. The configuration for the cell state information can be individually configured in every CSI process. The configuration for the cell state information can be individually configured in every CSI subframe set.

The CSI process is configured as information specific to the terminal device 1 in the higher layer. The terminal device 1 is configured by one or more CSI processes, and the CSI measurement and CSI reporting are performed based on the configuration of the CSI process. For example, when the plurality of CSI processes are configured, the terminal device 1 independently reports a plurality of CSI based on the CSI processes. The respective CSI processes include the configuration for cell state information, an identifier for the CSI process, configuration information related to the CSI-RS, configuration information related to the CSI-IM, the subframe pattern that is configured for CSI reporting, configuration information related to the cyclical CSI reporting, and/or configuration information related to non-cyclic CSI reporting. Note that the configuration for cell state information may be common to the plurality of CSI processes.

Next, the CSI reference resource in a certain serving cell will be described in detail.

The CSI reference resource is a resource used by the terminal device 1 to perform CSI measurement. For example, the terminal device 1 measures the CSI when the PDSCH is transmitted using the group of the downlink physical resource block that is indicated in the CSI reference resource. When the CSI subframe set is configured by a higher layer, the respective CSI reference resources belong to any one of the CSI subframe sets and do not belong to both CSI subframe sets.

In the frequency direction, the CSI reference resource is defined by a group of downlink physical resource blocks corresponding to a band to which the value of a CQI to be obtained relates.

The CSI reference resource is defined by the RI and the PMI with the condition of an obtained CQI in the layer direction (space direction). In other words, the CSI reference resource is defined by the RI and the PMI that are assumed or generated when obtaining the CQI in the layer direction (space direction).

In the time direction, the CSI reference resource is defined by one prescribed downlink subframe. Specifically, the CSI reference resource is defined by the subframe located before the subframe for CSI reporting by the prescribed subframe number. The prescribed subframe number that defines the CSI reference resource is determined based cm the transmission mode, the frame structure type, the number of configured CSI processes, the CSI reporting mode, and/or the like. For example, the prescribed subframe number that defines the CSI reference resource has four or more minimum values out of valid downlink subframes when one CSI process and the mode of the cyclical CSI report are configured with respect to the terminal device 1.

Next, the valid downlink subframe will be described in detail.

The downlink subframe in a certain serving cell is considered to be valid when a part or all of the following conditions are met. As one condition, the valid downlink subframe is a subframe with the activation state in the terminal device 1 that is configured by the RRC parameter related to the activation state and the deactivation state. As one condition, the valid downlink subframe is configured as a downlink subframe in the terminal device 1. As one condition, the valid downlink subframe is not a Multimedia Broadcast multicast service Single Frequency Network (MBSFN) subframe in the prescribed transmission mode. As one condition, the valid downlink subframe is not included in a range of a measurement gap that is configured in the terminal device 1. As one condition, the valid downlink subframe is an element or a part of the CSI subframe set that linked to the cyclical CSI report when the CSI subframe set is configured in the terminal device 1 in the cyclical CSI report. As one condition, the valid downlink subframe is an element or a part of the CSI subframe set that linked to the downlink subframe involving the CSI request that corresponds to the uplink DCI format in a non-cyclical CSI report with respect to the CSI process. In the condition, the prescribed transmission mode, the plurality of CSI processes, and the CSI subframe set with respect to the CSI process are configured in the terminal device 1.

Furthermore, when there is not valid downlink subframe for the CSI reference resource in a saving cell, the CSI report in the serving cell is excluded in the corresponding uplink subframe. That is, the terminal device 1 assumes that the subframe with the deactivation state is not a valid downlink subframe when there is a condition in which the valid downlink subframe is a subframe with the activation state.

Furthermore, when the base station device 3 (serving cells) is in the deactivation state, the terminal device 1 may assume that all subframes that include a previous subframe in the activation state is not a valid downlink subframe. That is, when the base station device 3 (serving cells) are in the deactivation state, the terminal device 1 may assume that the valid downlink subframe is a subframe that transits into the activation state thereafter, or a prescribed subframe following the subframe when the activation state is notified.

Furthermore, the terminal device 1 may have a condition for a valid downlink subframe even in a subframe in the deactivation state. That is, the terminal device 1 may determine whether there is a valid downlink subframe regardless of the subframe being in the activation state or the deactivation state.

Furthermore, the terminal device 1 may have a condition for the subframe in the activation state and a partial subframe in the deactivation state to be a valid downlink subframe. The partial subframe in the deactivation state is the prescribed subframe specified in advance, the prescribed subframe that is configured specifically to the base station device 3, or a subframe that is configured specifically to the terminal device 1. For example, the partial subframe in the deactivation state is a subframe between the predetermined subframe and the subframe prior to a prescribed number from the prescribed subframe. For example, the prescribed subframe is a subframe that in the activation state or a subframe in which the activation state is notified. The prescribed subframe is a subframe that receives the DCI format in which the CSI request is included. The prescribed subframe is a subframe in which CSI reporting is performed.

A specific example of a notification method of the cell state (activation state or deactivation state) of the base station device 3 will be described below.

The base station device 3 performs configuration related to cell state information through RRC signalling with respect to the terminal device 1. The base station device 3 notifies the cell state using a prescribed method based on the configuration related to the cell state information that is configured in the terminal device 1. The terminal device 1 is configured related to cell state information through RRC signalling from the base station device 3. The terminal device 1 recognizes the cell state using a prescribed method based on the configuration related to the cell state information that is configured from the base station device 3.

The method to notify the cell state is an explicit method or an implicit method. For example, the cell state is explicitly notified based on the cell state information that is notified using the DCI that is transmitted using the PDCCH or the EPDCCH. For example, the terminal device 1 recognizes the activation state when the cell state information indicates 1 and the deactivation state when the cell state information indicates 0. As another example, the cell state is implicitly notified based on presence or absence of the reference signal. The presence or absence of the reference signal is determined by a comparison of received power or received level of the reference signal and a prescribed threshold. As another example, the cell state is implicitly notified based on the DRX configuration or procedure. For example, the terminal device 1 recognizes the activation state in the non-DRX period and the deactivation state in the DRX period. As another example, the cell state is implicitly notified based on activation or deactivation of the cell that is notified in the MAC layer. For example, the terminal device 1 recognizes the activation state in the period of activation of the cells and the deactivation state in the period of activation of the cells.

The configuration related to the cell state information is configured by information that is used for the terminal device 1 to recognize the cell state. For example, the configuration related to the cell state information includes subframe information, information related to the search space, information related to the RNTI, and the like as information that is used for receiving or monitoring the PDCCH or the EPDCCH that is notified by the cell state information. The configuration related to the cell state information includes information related to the reference signal, a virtual cell identifier, a prescribed threshold, subframe information, and the like as information that is used for recognizing presence or absence of the reference signal.

Recognition of the notification of the cell state in the terminal device 1 will be described in detail below.

For example, the notification of the cell state in the terminal device 1 is recognized based on a cyclic redundancy check (CRC) that is added to the PDCCH or EPDCCH that includes the DCI that notifies the cell state information. For example, the terminal device 1 determines that notification of the cell state cannot be recognized (detected) when the value that is obtained by the cyclic redundancy check is incorrect.

As another example, recognition of the notification of the cell state in the terminal device 1 is performed based on whether the received power or reception level of the reference signal is in the range of the prescribed threshold. For example, a first threshold and a second threshold that is larger than the first threshold are specified or configured, and the terminal device 1 determines that the notification of the cell state cannot be recognized (detected) when the received power or reception level of the reference signal is in the range from the first threshold to the second threshold. Furthermore, the terminal device 1 determines the state as deactivation state when the received power or reception level of the reference signal is lower than the first threshold. The terminal device 1 determines the state as activation state when the received power or reception level of the reference signal is higher than the second threshold.

Next, the processes (operations) when notification of the cell state cannot be recognized (detected) by the terminal device 1 will be described.

For example, when the terminal device 1 cannot recognize (detect) notification of the cell state in a subframe, the terminal device 1 assumes a deactivation state until reception of a subsequent subframe to notify the cell state. That is, the terminal device 1 performs the same processes as when the deactivation state is notified until the subframe in which notification of the subsequent cell state is performed.

For example, when the terminal device 1 cannot recognize (detect) notification of the cell state in a subframe, the terminal device 1 assumes an activation state until reception of a subsequent subframe to notify the cell state. That is, the terminal device 1 performs the same processes as when the activation state is notified until the subframe in which notification of the subsequent cell state is performed.

For example, when the terminal device 1 cannot recognize (detect) notification of the cell state in a subframe, the terminal device 1 assumes a different state from the activation state or the deactivation state until reception of a subsequent subframe to notify the cell state. That is, the terminal device 1 performs different processes from when the activation state or the deactivation state is notified until the subframe in which notification of the subsequent cell state is performed.

For example, in the terminal device 1, it is assumed that the downlink subframe is in the activation state and the uplink subframe is in the deactivation state in a subframe that has a different state from the activation state or the deactivation state. That is, the terminal device 1 receives or monitors apart or the all of downlink signals and/or channels and does not transmit a pan or the all of uplink signals and/or channels. For example, the terminal device 1 receives the reference signal and monitors the PDCCH and/or monitors the EPDCCH and does not transmit the cyclical CSI report and/or the SRS.

For example, in the terminal device 1, it is assumed that the downlink subframe is in the deactivation state and the uplink subframe is in the activation state in a subframe that has a different state from the activation state or the deactivation state. That is, the terminal device 1 does not receive or monitor a part or the all of downlink signals and/or channel and transmit a part or the all of uplink signals and/or channels. For example, the terminal device 1 does not receive the reference signal and monitor the PDCCH and/or monitor the EPDCCH and, the terminal device 1 transmit the cyclical CSI report and/or the SRS.

For example, the terminal device 1 monitors the prescribed PDCCH and/or the EPDCCH that is different from the activation state in the subframe that is in a state different from the activation state or the deactivation state. The prescribed PDCCH and/or EPDCCH is monitored in a prescribed search space that is different from the activation state. The prescribed PDCCH and/or EPDCCH is added with the CRC that is scrambled by a prescribed RNTI that is different from the activation state.

In the description above, when the terminal device 1 cannot recognize (detect) notification of the cell state in a subframe, the terminal device 1 assumes a certain state until reception of a subsequent subframe to notify the cell state, but the present invention is not limited thereto. For example, when the terminal device 1 cannot recognize (detect) notification of the cell state in a subframe, the terminal device 1 may assume a certain state until reception of subframe to apply the cell state indicated by the notification of the subsequent cell state. Thereby, it is possible to independently specify or configure the subframe in which notification of the cell state is performed and the subframe to which the cell state that is indicated by the notification is applied.

Various methods, procedures, configurations and/or processes that are described in the present embodiment may be independent between the Pcell and the PScell in dual connectivity.

The terminal device 1 in the embodiment described above may support a function that performs uplink CoMP (ul-CoMP).

The terminal device 1 in the embodiment described above may support a function (supportedBandCombination, supportedBandListEUTRA) that performs the band combination (CA, or non-CA).

The terminal device 1 in the embodiment described above may support a function that performs cross carrier scheduling (crossCarrierScheduling).

The terminal device 1 in the embodiment described above may support a function (multipleTimingAdvance) of performing a plurality of timing advances.

The terminal device 1 in the embodiment described above may support a function of performing the CSI process.

The terminal device 1 in the embodiment described above may support a function of performing communication using the cells (plurality of cells) of different TDD UL-DL configurations.

The terminal device 1 in the embodiment described above may support a function of performing eIMTA.

The terminal device 1 in the embodiment described above may support a function of performing communication using the small cells.

The terminal device 1 in the embodiment described above may support a function (dual-connectivity) of performing communication simultaneously with a plurality of base station devices.

The terminal device 1 in the embodiment described above may support a function of performing communication using the cells (plurality of cells) of different frame structure types.

The terminal device 1 in the embodiment described above may support a function of simultaneously performing transmission and reception.

The terminal device 1 in the embodiment described above may support a function of receiving the EPDCCH.

The terminal device 1 in the embodiment described above may support a function of activating a Wi-Fi receiver and receiving a request to send (RTS)/clear to send (CTS) with respect to the LAA cells when the Wi-Fi function is supported. That is, the terminal device 1 may not receive the RTS/CTS using the LAA reception unit.

The terminal device 1 in the embodiment described above may transmit information (UE-EUTRA-capability or FeatureGroupIndicator) that indicates the function that is supported above to the base station device 3.

In the embodiment described above, the PDCCH subframe is not only defined as a subframe involving the PDCCH, and may be defined as a subframe involving the enhanced PDCCH (EPDCCH) or a relay-PDCCH (R-PDCCH).

According to the details of the embodiment above, it is possible to improve transmission efficiency in a radio communication system in which the base station device 3 and the terminal device 1 communicate.

A program running on each of the base station device 3 and the terminal device 1 according to the present invention may be a program that controls a central processing unit (CPU) and the like (a program for causing a computer to operate) in such a manner as to realize the functions according to the above-described embodiment of the present invention. The information handled in these devices is temporarily stored in a random access memory (RAM) while being processed. Thereafter, the information is stored in various types of read only memory (ROM) such as a flash ROM or a hard disk drive (HDD) and when necessary, is read by the CPU to be modified or rewritten.

Note that the terminal device 1 and the base station device 3 according to the above-described embodiment may be partially realized by the computer. This configuration may be realized by recording a program for realizing such control functions on a computer-readable recording medium and causing a computer system to read the program recorded on the recording medium for execution.

Note that the "computer system" here is defined as a computer system built into the terminal device 1 or the base station device 3, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system.

Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a certain period of time, such as a volatile memory within the computer system which functions as a server or a client. Furthermore, the program may be configured to realize some of the functions described above, and additionally may be configured to be capable of realizing the functions described above in combination with a program already recorded in the computer system.

Furthermore, the base station device 3 according to the above-described embodiment can be realized as an aggregation (a device group) constituted of a plurality of devices. Devices constituting the device group may be each equipped with some or all portions of each function or each functional block of the base station device 3 according to the above-described embodiment. It is only required that the device group itself include general functions or general functional blocks of the base station device 3. Furthermore, the terminal device 1 according to the above-described embodiments can also communicate with the base station device 3 as the aggregation.

Furthermore, the base station device 3 according to the above-described embodiment may be an evolved universal terrestrial radio access network (E-UTRAN). Furthermore, the base station device 3 according to the above-described embodiment may have some or all portions of a function of a node higher than an eNodeB.

Furthermore, some or all parts of each of the terminal device 1 and the base station device 3 according to the above-described embodiment may be realized as an LSI that is a typical integrated circuit or may be realized as a chip set. The functional blocks of each of the terminal device 1 and the base station device 3 may be individually realized as a chip, or some or all of the functional blocks may be integrated into a chip. Furthermore, a circuit integration technique is not limited to the LSI, and may be realized with a dedicated circuit or a general-purpose processor. Furthermore, if an advances in semiconductor technology, a circuit integration technology with which an LSI is replaced appears, it is also possible to use an integrated circuit based on the technology.

Furthermore, according to the above-described embodiment, the terminal device is described as one example of a terminal device or a communication device, but the present invention is not limited to this, and can be applied to a terminal apparatus or a communication apparatus, such as a fixed-type electronic apparatus installed indoors or outdoors, or a stationary-type electronic apparatus, for example, an AV apparatus, a kitchen apparatus, a cleaning or washing machine, an air conditioner, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of claims, and embodiments that are made by suitably combining technical means disclosed according to the different embodiments are also included in the technical scope of the present invention. Furthermore, a configuration in which a constituent element that achieves the same effect is substituted for the one that is described according to the embodiments is also included in the technical scope of the present invention.

From the above, the present invention may provide the following characteristics.

A base station device according to an aspect of the present invention is a base station device communicating with a terminal device, the base station device including a transmission unit, in which, the transmission unit transmits a discovery signal (DS) with a preamble inserted between a first signal and a second signal belonging to the DS, when the DS has a plurality of structures, and when the DS is transmitted to cells in which listen before talk (LBT) is performed.

The base station device according to an aspect of the present invention is the base station device described above, in which the transmission unit initializes a pseudo-random sequence generator for the preamble using an initial value initially in an OFDM symbol.

The base station device according to an aspect of the present invention is the base station device described above, in which the transmission unit determines the initial value based on a cell ID, a parameter according to a cyclic prefix (CP), and a slot number.

The base station device according to an aspect of the present invention is the base station device described above, in which the transmission unit determines the initial value based on the OFDM symbol number.

The base station device according to an aspect of the present invention is the base station device described above, in which the transmission unit determines a mapping resource with respect to the preamble based on a cell ID and an antenna port number.

The terminal device according to an aspect of the present invention is a terminal device communicating with a base station device, the terminal device including a channel measurement unit performing auto gain control (AGC) on a preamble when receiving via higher layer signalling a configuration related to the preamble with respect to a cell in which a parameter related to listen before talk (LBT) is configured.

The terminal device according to an aspect of the present invention is the terminal device described above, including a transmission unit reporting a measurement result of the preamble.

A method according to an aspect of the present invention is a method in a base station device communicating with a terminal device, the method including a step of: transmitting a discovery signal (DS) with a preamble inserted between a first signal and a second signal belonging to the DS, when the DS has a plurality of structures, and when the DS is transmitted to cells in which listen before talk (LBT) is performed.

A method according to an aspect of the present invention is a method in a terminal device communicating with abase station device, the method including a step of performing auto gain control (AGC) on a preamble when receiving via higher layer signalling a configuration related to the preamble with respect to a cell in which a parameter related to listen before talk (LBT) is configured.

A terminal device according to an aspect of the present invention is a terminal device communicating with a base station device, the terminal device including: a higher layer processing unit configured to expand a Ci field based on a medium access control layer control element (MAC CE) upon expansion of a secondary cell list via radio resource control (RRC) signalling.

A base station device according to an aspect of the present invention is a base station device communicating with a terminal device, the base station device including: a higher layer processing unit configured to expand a Ci field based on a medium access control layer control element (MAC CE) and configure activation or deactivation upon expansion of a secondary cell list via radio resource control (RRC) signalling.

A method according to an aspect of the present invention is a method in a terminal device communicating with abase station device, the method including the step of: expanding a Ci field based on a medium access control layer control element (MAC CE) upon expansion of a secondary cell list via radio resource control (RRC) signalling.

A method according to an aspect of the present invention is a method in a base station device communicating with a terminal device, the method including the step of: expanding a Ci field based on a medium access control layer control element (MAC CE) and configuring activation or deactivation upon expansion of a secondary cell list via radio resource control (RRC) signalling.

A base station device according to an aspect of the present invention is a base station device communicating with a terminal device, the base station device including a transmission unit transmitting first information that indicates whether or not downlink transmit power control is valid via higher layer signalling, in which the transmission unit sets a field instructing a value of a first parameter related to downlink transmit power control with respect to certain downlink control information format when the first information is configured to be valid.

The base station device according to an aspect of the present invention is the base station device described above, in which the transmission unit scrambles the certain downlink control information format by a specific radio network temporary identifier (RNTI) when the first information is configured to be valid.

The base station device according to an aspect of the present invention is the base station device described above, in which the first parameter is a power offset with respect to transmit power of a cell-specific reference signal (CRS).

A terminal device according to an aspect of the present invention is a terminal device communicating with a base station device, the terminal device including a reception unit receiving first information indicating whether or not downlink transmit power control is valid via higher layer signalling, in which the reception unit detects a first parameter value from a first field corresponding to the downlink transmit power control from a certain downlink control information format when downlink transmit power control is configured as valid in the first information.

The terminal device according to an aspect of the present invention is the terminal device described above, in which the reception unit recognizes that the first field is set when the certain downlink control information format is scrambled by a specific RNTI, and recognizes that the first field is not set when the certain downlink control information format is not scrambled by a specific RNTI.

A method according to an aspect of the present invention is a method in the base station device communicating with a terminal device, the method including the steps of: transmitting first information that indicates whether or not downlink transmit power control is valid via higher layer signalling, and setting a field instructing a value of a first parameter related to downlink transmit power control with respect to certain downlink control information format when the first information is configured to be valid.

A method according to an aspect of the present invention is a method in the terminal device communicating with abase station device, the method including the steps of receiving first information indicating whether or not downlink transmit power control is valid via higher layer signalling; detecting a first parameter value from a first field corresponding to the downlink transmit power control from a certain downlink control information format when downlink transmit power control is configured as valid in the first information.

DESCRIPTION OF REFERENCE NUMERALS 1 (1A, 1B, 1C) Terminal device
3 Base station device
101 Higher layer processing unit
103 Control unit
105 Reception unit
107 Transmission unit
301 Higher layer processing unit
303 Control unit
305 Reception unit
307 Transmission unit
1011 Radio resource control unit
1013 subframe setting unit
1015 Scheduling information interpretation unit
1017 CSI report control unit
3011 Radio resource control unit
3013 subframe setting unit
3015 Scheduling unit
3017 CSI report control unit
1301 Measurement unit
13011 First layer filtering unit
13012 Third layer filtering unit
13013 Report reference evaluation unit

The invention claimed is:

1. A terminal device comprising:
a higher layer processor configured to perform an addition of one or more secondary cells through a radio resource control (RRC) signaling,
receive an activation/deactivation medium access control control element (MAC CE), the activation/deactivation MAC CE including a plurality of C-fields and one R-field, the respective C-fields indicating secondary cells for respective secondary cell indices i to be activated or deactivated,
perform activation or deactivation for the respective secondary cells according to the respective C-fields; wherein
a number of the C-fields increases such that the size of the activation/deactivation MAC CE increases from one octet to two or more octets in a case that a number of the secondary cell(s) is increased over a predetermined number due to the addition.

2. A communication method for a terminal device comprising:
performing an addition of one or more secondary cells through a radio resource control (RRC) signaling;
receiving an activation/deactivation medium access control control element (MAC CE), the activation/deactivation MAC CE including a plurality of C-fields and one R-field, the respective C-fields indicating secondary cells for respective secondary cell indices i to be activated or deactivated; and
performing activation or deactivation for the respective secondary cells according to the respective C-fields; wherein
a number of the C-fields increases such that the size of the activation/deactivation MAC CE increases from one octet to two or more octets in a case that a number of the secondary cell(s) is increased over a predetermined number due to the addition.

* * * * *